(12) United States Patent
Ogawa

(10) Patent No.: US 11,922,687 B2
(45) Date of Patent: Mar. 5, 2024

(54) INFORMATION PROCESSING APPARATUS, INFORMATION PROCESSING METHOD, AND PROGRAM

(71) Applicant: Sony Group Corporation, Tokyo (JP)

(72) Inventor: Tetsu Ogawa, Tokyo (JP)

(73) Assignee: Sony Group Corporation, Tokyo (JP)

( * ) Notice: Subject to any disclaimer, the term of this patent is extended or adjusted under 35 U.S.C. 154(b) by 325 days.

(21) Appl. No.: 16/973,269

(22) PCT Filed: Jul. 5, 2019

(86) PCT No.: PCT/JP2019/026913
§ 371 (c)(1),
(2) Date: Dec. 8, 2020

(87) PCT Pub. No.: WO2020/013102
PCT Pub. Date: Jan. 16, 2020

(65) Prior Publication Data
US 2021/0247313 A1  Aug. 12, 2021

(30) Foreign Application Priority Data
Jul. 13, 2018  (JP) .................................. 2018-133725

(51) Int. Cl.
*G01N 21/63*  (2006.01)
*B64C 39/02*  (2023.01)
(Continued)

(52) U.S. Cl.
CPC .......... *G06V 20/188* (2022.01); *B64C 39/024* (2013.01); *G01N 21/3151* (2013.01);
(Continued)

(58) Field of Classification Search
CPC .... G01N 21/3151; G01N 21/84; G01N 21/63; G01N 2021/8466; G01N 2021/635;
(Continued)

(56) References Cited

U.S. PATENT DOCUMENTS

2012/0262600 A1* 10/2012 Velarde .............. H04N 23/6811
348/223.1
2014/0320610 A1* 10/2014 Oigawa ................ H04N 13/239
348/47
(Continued)

FOREIGN PATENT DOCUMENTS

CN  103518223 A  1/2014
CN  105308436 A  2/2016
(Continued)

OTHER PUBLICATIONS

International Search Report (PCT/ISA/210), International Application No. PCT/JP2019/026913, dated Sep. 27, 2019.
(Continued)

*Primary Examiner* — Sang H Nguyen
(74) *Attorney, Agent, or Firm* — Michael Best & Friedrich LLP

(57) ABSTRACT

An information processing apparatus, an information processing method, a non-transitory computer-readable medium, an a storage device for quantitatively analyzing and storing a relationship between an environment of a measurement target and a response of the measurement target with respect to the environment. The information processing apparatus includes a storage circuitry and an operation circuitry configured to acquire a first physical value by analyzing captured image information, the first physical value being indicative of an environment of a measurement target associated with a first pixel of the plurality of pixels, acquire a second physical value by analyzing the captured image information, the second physical value being indicative of a response of the measurement target with respect to the environment, and control the storage circuitry to store the first physical value and the second physical value in correlation with each other.

21 Claims, 48 Drawing Sheets

(51) Int. Cl.
    *G01N 21/31* (2006.01)
    *G01N 21/84* (2006.01)
    *G06V 20/10* (2022.01)
    *B64U 101/30* (2023.01)
    *G06V 10/58* (2022.01)

(52) U.S. Cl.
    CPC ............ *G01N 21/63* (2013.01); *G01N 21/84* (2013.01); *B64U 2101/30* (2023.01); *G01N 2021/3155* (2013.01); *G01N 2021/635* (2013.01); *G01N 2021/8466* (2013.01); *G06V 10/58* (2022.01)

(58) Field of Classification Search
    CPC ......... G01N 2021/3155; G06V 20/188; G06V 10/58; B64C 39/024; B64C 2201/127; B64U 2101/30; G06K 2009/4657; G06K 9/0657
    See application file for complete search history.

(56) References Cited

U.S. PATENT DOCUMENTS

| | | | |
|---|---|---|---|
| 2015/0015697 A1 | 1/2015 | Redden et al. | |
| 2016/0283791 A1 | 9/2016 | Ogura et al. | |
| 2017/0223334 A1* | 8/2017 | Nobayashi | H04N 13/128 |
| 2017/0359534 A1* | 12/2017 | Li | H04N 5/265 |

FOREIGN PATENT DOCUMENTS

| | | | |
|---|---|---|---|
| JP | 2004003878 A | 1/2004 | |
| JP | 2008275477 A | 11/2008 | |
| JP | 2017026495 A | 2/2017 | |
| JP | 2017-83207 A | 5/2017 | |
| WO | WO-2017179378 A1 | 10/2017 | |

OTHER PUBLICATIONS

Notification of Transmittal of the International Search Report and the Written Opinion of the International Searching Authority, or the Declaration (PCT/ISA/220), International Application No. PCT/JP2019/026913, dated Oct. 8, 2019.

Written Opinion of the International Search Authority (PCT/ISA/237), International Application No. PCT/JP2019/026913, dated Aug. 10, 2019.

Uwe Rascher et al: "Spatio-temporal variations of photosynthesis: the potential of optical remote sensing to better understand and scale light use efficiency and stresses of plant ecosystems", Precision Agriculture, Kluwer Academic Publishers, BO, vol. 9, No. 6, Sep. 2, 2008 (Sep. 2, 2008), pp. 355-366.

J. Grace et al: "Can we measure terrestrial photosynthesis from space directly, using spectral reflectance and fluorescence?", Global Change Biology, vol. 13, No. 7, Jul. 1, 2007 (Jul. 1, 2007), pp. 1484-1497.

Damm A et al: "Remote sensing of plant-water relations: An overview and future perspectives", Journal of Plant Physiology, Elsevier, Amsterdam, NL, vol. 227, Apr. 25, 2018 (Apr. 25, 2018), pp. 3-19.

Katsoulas Nikolaos et al: "Crop reflectance monitoring as a tool for water stress detection in greenhouses: A review," Biosystems Engineering, Academic Press, UK, vol. 151, Oct. 24, 2016 (Oct. 24, 2016), pp. 374-398.

* cited by examiner

FIG. 16

| PHYSICAL SET ID, PHYSICAL ID 1, PHYSICAL VALUE 1, PHYSICAL ID 2, PHYSICAL VALUE 2, ....., IMAGE SET ID, CLASSIFICATION ID, IMAGE POSITION ID |
|---|
| #00000001, #1000 , 550.0, #1100 , -0.031, , #0001 , #0 , 0, 0 |
| #00000002, #1000 , 500.0, #1100 , -0.033, , #0001 , #0 , 0, 60 |
| #00000003, #1000 , 650.0, #1100 , -0.028, , #0001 , #0 , 57, 60 |
| . . . . . |

FIG. 17

| MEASUREMENT CONDITION / PLANT | SAME (SAME TIME) | DIFFERENT |
|---|---|---|
| SAME INDIVIDUAL | LIGHT INTENSITY IS EQUAL TO OR GREATER THAN CONSTANT VALUE, OR LIGHT INTENSITY IS EQUAL TO OR GREATER THAN CONSTANT VALUE AND IS WITHIN CONSTANT RANGE | LIGHT INTENSITY IS EQUAL TO OR GREATER THAN CONSTANT VALUE AND IS WITHIN CONSTANT RANGE |
| DIFFERENT INDIVIDUALS | | LIGHT INTENSITY IS EQUAL TO OR GREATER THAN CONSTANT VALUE AND IS WITHIN CONSTANT RANGE |

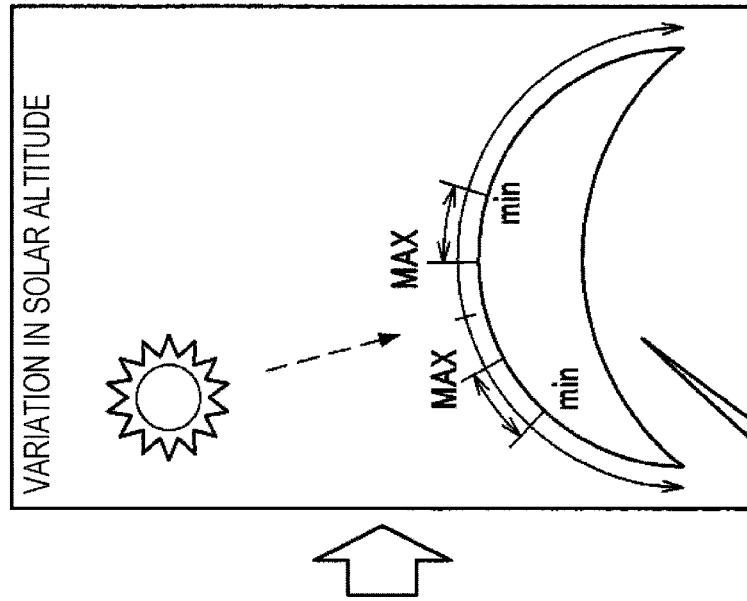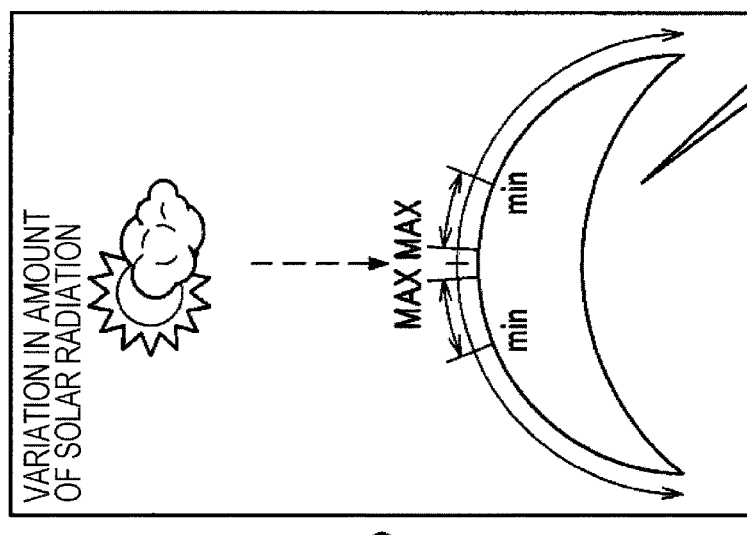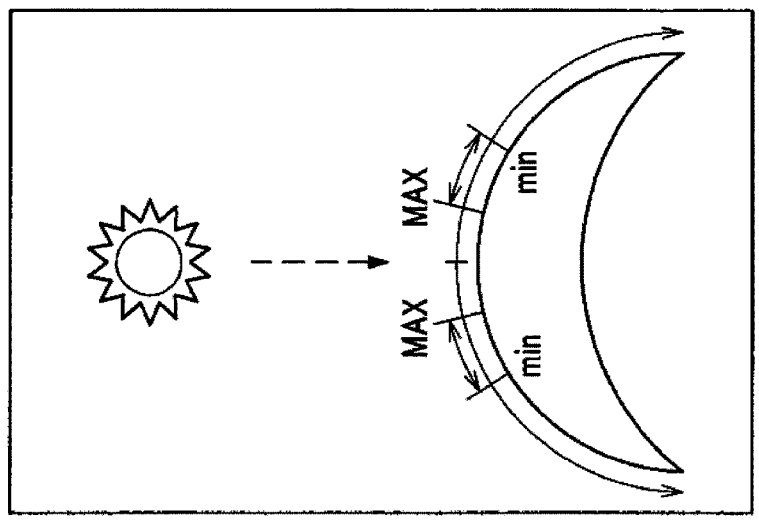

FIG. 25

| PHYSICAL SET ID, | PHYSICAL ID 1, | PHYSICAL VALUE 1, | PHYSICAL ID 2, | PHYSICAL VALUE 2, | PHYSICAL ID 3, | PHYSICAL VALUE 3, | ..., | IMAGE SET ID, | CLASSIFICATION ID, | IMAGE POSITION ID |
|---|---|---|---|---|---|---|---|---|---|---|
| #00000001, | #1000 | 550.0, | #1100 | −0.031, | #2000 | #−0.031 | , | #0001 | , #0 | , 0, 0 |
| #00000002, | #1000 | 500.0, | #1100 | −0.033, | | , | , | #0001 | , #0 | , 0, 60 |
| #00000003, | #1000 | 650.0, | #1100 | −0.028, | | , | , | #0001 | , #0 | , 57, 60 |
| . . . . | | | | | | | | | | |

FIG. 41

| PHYSICAL SET ID, PHYSICAL ID 1, PHYSICAL VALUE 1, PHYSICAL ID 2, PHYSICAL VALUE 2, PHYSICAL ID 3, PHYSICAL VALUE 3, ...., IMAGE SET ID, CLASSIFICATION ID, IMAGE POSITION ID |
|---|
| #00000001, #1000 , 555.0, #1100 , -0.031, #1010 , 20.2 , #0001 , #0 , 0, 0 |
| #00000002, #1000 , 490.0, #1100 , -0.033, #1010 , 20.2 , #0001 , #0 , 0, 60 |
| #00000003, #1000 , 670.0, #1100 , -0.028, #1010 , 20.2 , #0001 , #0 , 57, 60 |
| . . . . . |

FIG. 46

| | | | | |
|---|---|---|---|---|
| PHYSICAL SET ID, | PHYSICAL ID 1, | PHYSICAL VALUE 1, | PHYSICAL ID 2, | PHYSICAL VALUE 2 |
| #00000001 , | #1000 , | 250.3, | #1200 , | 61.3 |
| #00000002 , | #1000 , | 251.4, | #1200 , | 59.2 |
| #00000003 , | #1000 , | 251.9, | #1200 , | 66.3 |
| . | | | | |
| . | | | | |
| . | | | | |
| (#00174933), | #1000 , | 314.2, | #1200 , | 70.9 |
| . | | | | |
| . | | | | |

| PHYSICAL SET ID, | PHYSICAL ID 1, | PHYSICAL VALUE 1, | PHYSICAL ID 2, | PHYSICAL VALUE 2 |
|---|---|---|---|---|
| #00000001 , | #1000 , | 200.0, | #1200 , | 48.6 |
| #00000002 , | #1000 , | 300.0, | #1200 , | 75.7 |
| #00000003 , | #1000 , | 400.0, | #1200 , | 90.3 |
| #00000004 , | #1000 , | 500.0, | #1200 , | 115.3 |
| #00000005 , | #1000 , | 600.0, | #1200 , | 120.0 |

FIG. 54

| PHYSICAL SET ID, | PHYSICAL ID 1, | PHYSICAL VALUE 1, | PHYSICAL ID 2, | PHYSICAL VALUE 2, | ..., | IMAGE SET ID, | CLASSIFICATION ID, | IMAGE POSITION ID |
|---|---|---|---|---|---|---|---|---|
| #00000001, | #1000, | 550.0, | #1100, | -0.031, | , | #0001, | #0, | 0, 0 |
| #00000002, | #1000, | 500.0, | #1100, | -0.033, | , | #0001, | #0, | 0, 60 |
| #00000003, | #1000, | 650.0, | #1100, | -0.028, | , | #0001, | #0, | 57, 60 |
| . . . . | | | | | | | | |

INFORMATION PROCESSING APPARATUS, INFORMATION PROCESSING METHOD, AND PROGRAM

TECHNICAL FIELD

Cross Reference to Related Applications

This application claims the benefit of Japanese Priority Patent Application JP 2018-133725 filed on Jul. 13, 2018, the entire contents of which are incorporated herein by reference.

The present disclosure relates to an information processing apparatus, an information processing method, and a program.

BACKGROUND ART

In recent years, an optical measurement technology of obtaining a relationship between an environment in which an arbitrary measurement target is left, and a response to the environment by the measurement target has been widely developed. For example, the measurement target is a plant, or the like, and PTL 1 discloses an optical measurement technology capable of accurately measuring a moisture amount of a leaf as a response to an environment by a plant that is a measurement target while excluding an influence by scattered light (external light scattering) from nearby leaves even in a leaf group in which a plurality of leaves grow thickly.

CITATION LIST

Patent Literature

PTL 1: JP 2017-83207A

SUMMARY

Technical Problem

However, in accordance with the technology described in PTL 1, and the like, it is difficult to quantitatively analyze a relationship an environment in which a measurement target (for example, a plant) is left and a response to the environment by the measurement target in a more appropriate manner. More specifically, typically, an optical measurement device in the related art performs an operation (for example, image processing that is performed in a two-dimensional direction (for example, a vertical direction and a horizontal direction) in a planar space of a captured image) relating to dimensions of a vertical direction and a horizontal direction, but it is difficult to perform an operation relating to a dimensional relationship of physical values such as an environment and a response. Accordingly, the optical measurement device in the related art does not include a mechanism that manages each of a light quantity, a reflectance, and the like (or fluorescent intensity and the like) which are physical values, and thus it is difficult to appropriately express a relationship between physical values such as an increase and a decrease of the reflectance that is a measurement target, or an increase and a decrease of the fluorescent intensity in correspondence with the light quantity.

Here, the present disclosure has been made in consideration of such circumstances, and it is desirable to provide an information processing apparatus, an information processing method, a program which are capable of quantitatively analyzing a relationship between an environment in which a measurement target is left, and a response to the environment by the measurement target in a more appropriate manner, and are new and improved.

Solution to Problem

According to an aspect of the present disclosure, there is provided an information processing apparatus. The information processing apparatus includes a storage circuitry and an operation circuitry. The operation circuitry is configured to acquire a first physical value by analyzing captured image information, the captured image information based on information from a plurality of pixels, and the first physical value being indicative of an environment of a measurement target associated with a first pixel of the plurality of pixels. The operation circuitry is configured to acquire a second physical value by analyzing the captured image information, the second physical value being indicative of a response of the measurement target with respect to the environment. The operation circuitry is also configured to control the storage circuitry to store the first physical value and the second physical value in correlation with each other.

In addition, according to another aspect of the present disclosure, there is provided an information processing method. The method includes acquiring, with an electronic processor, a first physical value by analyzing captured image information, the captured image information based on information from a plurality of pixels, and the first physical value being indicative of an environment of a measurement target associated with a first pixel of the plurality of pixels. The method includes acquiring, with the electronic processor, a second physical value by analyzing the captured image information, the second physical value being indicative of a response of the measurement target with respect to the environment. The method also includes controlling, with the electronic processor, a storage circuitry to store the first physical value and the second physical value in correlation with each other.

In addition, according to still another aspect of the present disclosure, there is provided a non-transitory computer-readable medium comprising instructions that, when executed by an electronic processor, causes the electronic processor to perform a set of operations. The set of operations includes acquiring a first physical value by analyzing captured image information, the captured image information based on information from a plurality of pixels, and the first physical value being indicative of an environment of a measurement target associated with a first pixel of the plurality of pixels. The set of operations includes acquiring a second physical value by analyzing the captured image information, the second physical value being indicative of a response of the measurement target with respect to the environment. The set of operations also includes controlling a storage circuitry to store the first physical value and the second physical value in correlation with each other.

In addition, according to yet another aspect of the present disclosure, there is provided a storage device. The storage device includes a storage circuitry and an interface circuitry. The interface circuitry is configured to receive a first physical value indicative of an environment of a measurement target associated with a first pixel of the plurality of pixels. The interface circuitry is configured to receive a second physical value indicative of a response of the measurement target with respect to the environment. The interface circuitry is configured to receive a correlation indicator that indicates the first physical value is correlated to the second physical value. The interface circuitry is also configured to output the first physical value and the second physical value to the storage circuitry based on the correlation indicator.

Advantageous Effects of Invention

As described above, according to the aspects of the present disclosure, it is possible to quantitatively analyze a relationship between an environment in which a measurement target is left and a response to the environment by the measurement target in a more appropriate manner.

Furthermore, the above-described effect is not limited, and any effect described in this specification or an effect that can be understood from this specification may be provided in combination with the above-described effect or instead of the above-described effect.

BRIEF DESCRIPTION OF DRAWINGS

FIG. 16 is a view illustrating an example of a data state in a stage in which the removal operation and the correction operation are terminated.

FIG. 17 is a table illustrating a relationship between a condition of the intensity of light with which a leaf is irradiated, and analysis content that can be carried out.

FIG. 19A to FIG. 19C are views illustrating analysis images of the same individual physical values which are measured at different times.

FIG. 25 is a view illustrating an example of a data state in a stage in which the analysis operation is completed.

FIG. 41 is a view illustrating an example of a data state in a stage in which the correction operation according to the second embodiment is terminated.

FIG. 46 is a view illustrating an example of a data state in a stage in which a removal operation and a correction operation according to the third embodiment are terminated.

FIG. 54 is a view illustrating an example of a data state in a stage in which resolution adjustment according to the fourth embodiment is terminated.

DESCRIPTION OF EMBODIMENTS

Figure 1:
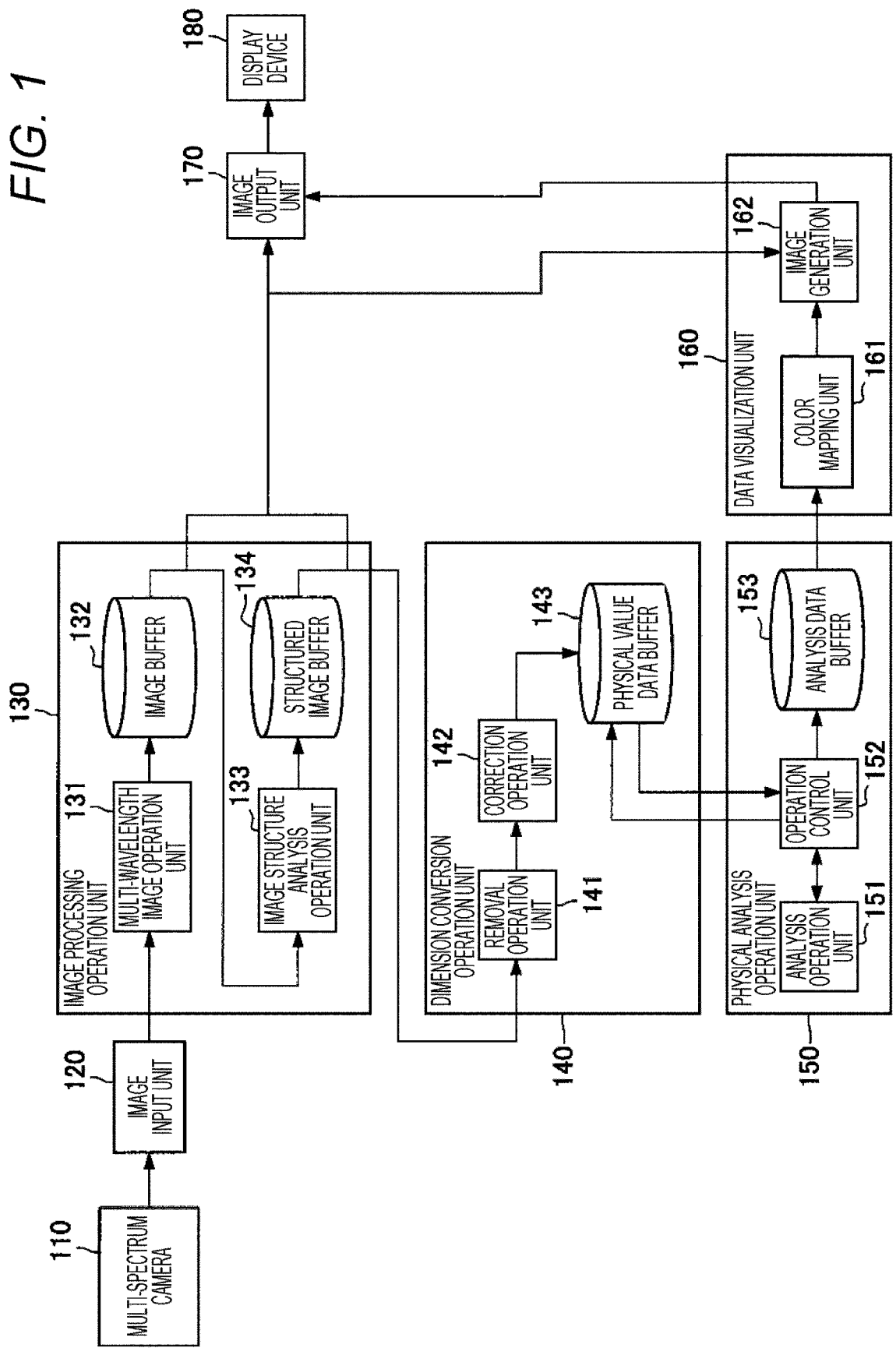
FIG. 1 is a block diagram illustrating a functional configuration example of an information processing apparatus 100 according to a first embodiment.

Hereinafter, preferred embodiments of the present disclosure will be described in detail with reference to the accompanying drawings. Furthermore, in this specification and the drawings, the same reference numeral will be given to constituent elements having substantially the same configuration, and redundant description thereof will be omitted.

Furthermore, description will be given in the following order.

1. Outline
2. First Embodiment
3. Second Embodiment
4. Third Embodiment
5. Fourth Embodiment
6. Fifth Embodiment
7. Hardware Configuration Example
8. Summary 1. Outline First, an outline of the present disclosure will be described.

A normalized difference vegetation index (NDVI) is widely used as an index indicating a composition (biomass) of a plant in an optical measurement by remote sensing. The NDVI is an index that takes an advantage of properties in which chlorophylls included in a chloroplast absorb red wavelength light well, and hardly absorb wavelength light in an infrared region and reflects the wavelength light. Currently, in a large-sized farm field, an NDVI image acquired from an unmanned aerial vehicle (UAV: including a drone and the like), a satellite, or the like is used in management of the farm field, and a camera capable of measuring the NDVI is commercially available. Furthermore, a camera capable of measuring a vegetation index (for example, a green normalized difference vegetation index (GNDVI) or the like) other than the NDVI are also commercially available. However, the vegetation index other than the NDVI has not been spreading widely in a farm field.

A background of the circumstance in which the vegetation index other than the NDVI has not been spreading widely is as follows. A variation of a composition (biomass) corresponds to acclimation and growth due to accumulation of photosynthesis product of a plant for a constant period. Accordingly, it is difficult to say that any index quickly grasps the variation of the composition, and the vegetation index is not suitable for a use for carrying out an improvement in correspondence with the variation.

In addition, even though the variation of the composition is rapidly grasped, and thus a problem is detected early, it is necessary to perform determination of a cause to cope with the problem, but it may be difficult to determination of the cause only with a measured value of the composition, or the like in some cases. For example, even though "presence" of a composition such as a chlorophyll is detected, only a photosynthesis capability of a plant as a potential is revealed, and whether or not photosynthesis is actually performed sufficiently, and a cause thereof (for example, environmental factors such as light, a temperature, a humidity, a soil moisture, and disease and inspect pest, and the like) are not clear. In addition, even though whether or not photosynthesis is actually performed sufficiently, and the causes thereof are revealed, from the viewpoints of efficiency and improvement of a farm field, it cannot be said that analysis is sufficiently utilized as long as an improvement method based on the cause is not presented.

With regard to an additional viewpoint, a method of clarifying a mechanism of an environment response by a plant has been developed. For example, a clarifying method using the mechanism of the environment response by a plant in a measurement protocol has been put into practical use. Specifically, a method in which an environment response of a plant is measured by a gas exchange measurement method or the like while changing an environment in which a plant is left (for example, while changing light intensity or a concentration of $CO_2$), and parameters of a functional model are derived from a relationship between the environment and the response with model fitting, and the like can be exemplified, and detailed physical analysis of a state or characteristics of a plant can be performed by the method. However, it is necessary for a person who executes the method to measure the environment response while changing the environment in which a plant is left, and thus a great burden is placed on the person who executes the method.

In addition, the environment response by a plant is measured on the basis of a fluctuation of fluorescence or reflected light, and function parameters or the like are calculated. For example, as a method of irradiating a plant with active light to measure chlorophyll fluorescence, a method called a pulse modulation fluorescence measurement is exemplified, and the method can obtain a physical amount corresponding to a photosynthesis speed, for example, an electron transport rate (ETR) in photosynthesis, a quantum yield ratio ($\varphi PS2$) of an electron transport system, and the like. An optical measurement device using the method has also been put into practical use, but strong light (artificial light) that saturates photosynthesis is necessary for the optical measurement device, and thus it is difficult to apply the optical measurement device to the remote sensing.

A person who discloses the disclosure accomplished the technology according to the present disclosure in consideration of such circumstances. An information processing apparatus 100 according to an aspect of the present disclosure measures a variation of an operational function of a plant in real time by using the remote sensing, and can improve management of plants, particularly, in a large-sized farm field. More specifically, the information processing apparatus 100 according to an aspect of the present disclosure analyzes captured image information of a plant that is a measurement target to acquire a first physical value corresponding to an environment in which the plant is left, and a second physical value corresponding to a response to the environment by the plant, and stores the first physical value and the second physical value in correlation with each other. In addition, the information processing apparatus 100 performs an analysis operation by using the first physical value and the second physical value to output a third physical value indicating a state or a property of the plant.

Typically, an optical measurement device in the related art performs an operation (for example, image processing that is performed in a two-dimensional direction (for example, a vertical direction and a horizontal direction) in a planar space of a captured image) relating to dimensions of a vertical direction and a horizontal direction, but it is difficult to perform an operation relating to a dimensional relationship of physical values such as an environment and a response. Accordingly, the optical measurement device in the related art does not include a mechanism that manages each of a light quantity, a reflectance, and the like (or fluorescent intensity and the like) which are physical values, and thus it is difficult to appropriately express a relationship between physical values such as an increase and a decrease of the reflectance that is a measurement target, or an increase and a decrease of the fluorescent intensity in correspondence with the light quantity. On the other hand, the information processing apparatus 100 according to an aspect of the present disclosure includes a mechanism that converts captured image information into a physical value, and manages each of a light quantity, a reflectance, and the like (or fluorescent intensity and the like) in a physical-value dimension, for example, for each pixel, and thus it is possible to appropriately express a relationship between the physical values.

In addition, the intensity of solar light with which individual leaves of a plant are irradiated is different in accordance with an inclination of a leaf, a shadow state, and the like, with regard to an "environment" in a case where a plant group is photographed in one sheet of captured image information, a plurality of the environments exist in the captured image information (for example, it can be considered that a different "environment" exists for each pixel). Here, the information processing apparatus 100 according to an aspect of the present disclosure acquires the first physical value corresponding to the "environment" and the second physical value corresponding to a "response" in the same grain size (for example, a pixel unit), and manages the first physical value and the second physical value in correlation with each other. Furthermore, it should be understood that "correlation of the first physical value and the second physical value" includes not only application of information (ID or the like) that directly links the first physical value and the second physical value but also an indirect method of applying any information capable of indicating any relationship between the first physical value and the second physical value.

In addition, there is a limitation in a model that can be used in an operation of physical analysis. For example, when analyzing an environment response of a plant, if an object such as soil other than the plant is included in the captured image information, analysis accuracy may be lowered. In addition, with regard to a shadow region in the captured image information, reflection or absorption of light by the plant becomes complicated, and thus analysis by a model may be difficult. Here, to perform analysis of the environment response of the plant in a more appropriate manner, the information processing apparatus 100 according to aspect of the present disclosure has a function of removing data that is not suitable for an operation in a data set acquired as captured image information (or a function of extracting data that is suitable for the operation) (for example, removal of a region having optical complexity such as a region in which an image of a shadow is captured in the captured image information or a region in which an accurate model in terms of plant physiology is not present, extraction of captured image information that is captured under environment conditions for which the environment response by the plant is activated (for example, strong light or the like), and the like).

Furthermore, description has been given of the background of the present disclosure, the outline of the technology, or the like, according to the present disclosure, and a technical range according to the present disclosure is not limited by the description. For example, the object of the present disclosure is not limited to the description, and the technology of the present disclosure is applicable to various apparatus, methods, systems, and programs in which analysis of a state or a property of the plant, and the like is necessary.

2. First Embodiment

Next, a first embodiment according to the present disclosure will be described. The first embodiment is aimed to measure a stress reaction of a plant due to various stress factors (furthermore, the object is not limited thereto).

In a case of receiving various stresses, it is difficult for a plant to sufficiently exhibit photosynthesis capability that can be originally exhibited with respect to received light, and the plant perform heat radiation. The information processing apparatus 100 according to this embodiment measures a stress reaction of the plant with respect to various stress factors on the basis of the degree of heat radiation. Here, as the "stress", for example, an environment stress such as strong light, weak light, a low humidity, a low temperature, a high humidity, high temperature, dry of soil, and an excessive humidity of the soil (anaerobic stress), occurrence of disease and inspect pest, a variation of a soil component, an influence of agricultural chemicals including some herbicides, and the like are assumed, but there is no limitation thereto (in a case where photosynthesis capability of the plant is lowered, it can be said that the plant receives an arbitrary stress). Hereinafter, the stress may be referred to as "environment stress".

Here, the photosynthesis includes a photochemical system that generates adenosine triphosphate (ATP) and nicotinamide adenine dinucleotidephosphate (NADPH) after converting light into electrons, and a Calvin cycle that assimilates $CO_2$ by using energy of the ATP and the NADPH to generate $CH_2O$. For example, the plant is faced with an environment such as a dry soil, the plant closes pores to reduce evaporation of water. At this time, when the plant is not able to absorb sufficient $CO_2$ from the outside, efficiency of the Calvin cycle deteriorates, and an energy amount that is received from the front-stage photochemical system is limited. In this case, to remove excessive energy, the photochemical system dissipates excessive energy by using a mechanism called a xanthophyll cycle that is linked to a photochemical system 2.

When measuring a stress reaction of a plant respect to various stress factors, typically, the information processing apparatus 100 according to this embodiment uses PRI that is calculated by the following Equation 1. Furthermore, "$\lambda_{531}$" in Equation 1 represents captured image information of which a wavelength is approximately 531 [nm], and "$\lambda_{570}$"

represents captured image information of which a wavelength is approximately 570 [nm].

[Math. 1]
$$PRI = \frac{\lambda_{531} - \lambda_{570}}{\lambda_{531} + \lambda_{570}} \quad \text{(Equation 1)}$$

It is considered that the degree of epoxidation/de-epoxidation of the xanthophyll cycle is optically detected by the PRI, and thus it is expected that the PRI can be used as an index that measures the stress reaction of the plant with respect to various stress factors in consideration of the mechanism.

(2.1. Functional Configuration Example)

First, a functional configuration example of the information processing apparatus 100 will be described with reference to FIG. 1.

As illustrated in FIG. 1, the information processing apparatus 100 includes a multi-spectrum camera 110, an image input unit 120, an image processing operation unit 130, a dimension conversion operation unit 140, a physical analysis operation unit 150, a data visualization unit 160, an image output unit 170, and a display device 180.

The multi-spectrum camera 110 includes a plurality of kinds of multi-spectrum filters through which light beams having wavelength bands different from each other can be transmitted, and is configured to separate incident light into light beams of a plurality of wavelength bands to generate multi-wavelength image information (captured image information) including information of the plurality of wavelength bands through the subsequent signal processing. For example, the multi-spectrum camera 110 can generate captured image information by visible light, ultraviolet light, near infrared light, infrared light, or the like. Here, it should be understood that the "captured image information" includes not only a captured image itself but also a measured value that is not visualized as an image, or image information that is generated by synthesizing a plurality of pieces of captured image information through stitching processing. In addition, as the captured image information in this embodiment, information of an image captured from a UAV in flight is assumed, but there is no limitation thereto. For example, the captured image information may be obtained by simply capturing an image of a plant from an arbitrary position. Furthermore, the kinds of wavelength bands capable of being grasped by the multi-spectrum camera 110 and the number thereof are not particularly limited, and can be flexibly modified in accordance with analysis content in a rear stage. In addition, a plurality of the multi-spectrum cameras 110 may be provided.

The image input unit 120 is configured to function as an interface that acquires the captured image information generated by the multi-spectrum camera 110. Furthermore, the image input unit 120 may perform various kinds of image processing such as adjustment of resolution of the acquired captured image information, pixel matching, and various kinds of correction (for example, atmospheric correction, geometrical correction, ortho-correction, and the like) (particularly, in a case where the plurality of multi-spectrum cameras 110 are provided, for example) in addition the simple acquisition of the captured image information. Furthermore, the content of the image processing performed by the image input unit 120 is not particularly limited.

The image processing operation unit 130 is configured to perform an operation (for example, image processing that is performed in a two-dimensional direction (for example, a vertical direction and a horizontal direction) in a planar space of a captured image) relating to dimensions of a vertical direction and a horizontal direction with respect to multi-wavelength image information (captured image information). As illustrated in FIG. 1, the image processing operation unit 130 includes a multi-wavelength image operation unit 131, an image buffer 132, an image structure analysis operation unit 133, and a structured image buffer 134.

The multi-wavelength image operation unit 131 performs an operation using a signal of each wavelength band in captured image information to generate additional captured image information (the processing is referred to as "multi-wavelength image operation"). For example, the multi-wavelength image operation unit 131 generates RGB image information or NIR image information by using captured image information, or generates captured image information (for example, NDVI image information, PRI image information, or the like) indicating various vegetation indexes. Furthermore, the kind of the captured image information generated by the multi-wavelength image operation unit 131 is not particularly limited.

The image buffer 132 is configured to temporarily store the captured image information generated by the multi-wavelength image operation unit 131.

The image structure analysis operation unit 133 classifies the captured image information stored in the image buffer 132 into a plurality of regions (the processing is also referred to as "image structure analysis operation"). For example, the image structure analysis operation unit 133 simply classifies the captured image information into a right side and a left side, or finely classifies the captured image information. Furthermore, the image structure analysis operation unit 133 may analyze the captured image information by using a predetermined image recognition technology to recognize objects (for example, plant portions or the like including leaves (an upper leaf, an intermediate leaf, a lower leaf, and the like), flowers, fruits, stems, and the like) included in the captured image information, and may classify the captured image information for each object. At this time, the image structure analysis operation unit 133 may perform image recognition (feature extraction) by using the captured image information (for example, captured image information indicating a vegetation index, and the like) generated by the multi-wavelength image operation unit 131.

The structured image buffer 134 is configured to temporarily store the captured image information after being classified by the image structure analysis operation unit 133.

The dimension conversion operation unit 140 is configured to analyze information of a specific wavelength band in the captured image information (multi-wavelength image information) stored in the structured image buffer 134 to acquire a first physical value corresponding to an environment in which a plant is left and a second physical value corresponding to a response to the environment by the plant, and to store the first physical value and the second physical value in correlation with each other. In other words, the dimension conversion operation unit 140 is configured to analyze dimensional information of a vertical direction and a horizontal direction to convert the dimensional information into dimensional information of physical values of the environment and the response (the processing is referred to as "dimension conversion operation"). As illustrated in FIG. 1, the dimension conversion operation unit 140 includes a removal operation unit 141, a correction operation unit 142, and a physical value data buffer 143.

The removal operation unit 141 is configured to remove a region that is not suitable for an operation in the captured image information stored in the structured image buffer 134 (furthermore, it should be understood that removal of the region that is not suitable for an operation is equivalent to extraction of a region that is suitable for an operation). The processing is referred to as "removal operation". More specifically, the removal operation unit 141 determines that a predetermined condition region is a region that is not suitable for an operation on the basis of the captured image information, and removes the region. Examples of the predetermined condition include a condition in which NDVI is a value that out of a constant range, a condition in which an Nn value (pixel value) is a value that is out of a constant range, and the like. A region in which an image of an object (for example, soil or the like) other than a plant is captured, and the like are removed in accordance with the condition in which the NDVI is a value that is out of a constant range, and a region in which an image of a shadow is captured and the like are removed in accordance with the condition in which the Nn value (pixel value) is a value that is out of a constant range. Furthermore, the regions removed by the removal operation unit 141 are not limited to the above-described regions. In addition, the analysis method by the removal operation unit 141 is not particularly limited. Furthermore, the removal operation is performed to remove information that is not dealt by the physical analysis operation unit 150, and content of the removal operation can be flexibly modified in accordance with content of a physical analysis operation. For example, in a case where the physical analysis operation is also capable of appropriately processing a soil image capturing region, the removal operation may not remove the soil image capturing region.

The correction operation unit 142 is configured to perform conversion or correction of the captured image information, and the like. For example, in this embodiment, the correction operation unit 142 converts the Nn value (pixel value) into PAR of a leaf surface (hereinafter, an operation performed by the correction operation unit 142 is referred to as "correction operation"). In addition, the correction operation unit 142 stores the PAR of the leaf surface which is the first physical value, and the PRI that is the second physical value corresponding to the first physical value in the physical value data buffer 143 in correlation with each other. Detailed description of a specific example of the correlation will be described.

The physical value data buffer 143 is configured to temporarily store data that is output in the correction operation by the correction operation unit 142. More specifically, the physical value data buffer 143 temporarily stores the PAR and the PRI which are correlated with each other by the correction operation unit 142. Furthermore, the physical value data buffer 143 may store data other than the PAR and the PRI.

The physical analysis operation unit 150 is configured to perform an analysis operation, model fitting, or the like by using data (for example, the first physical value, the second physical value, and the like) which is stored in the physical value data buffer 143 (the processing is referred to as "physical analysis operation"). Furthermore, content of the physical analysis operation is not limited thereto. As illustrated in FIG. 1, the physical analysis operation unit 150 includes an analysis operation unit 151, an operation control unit 152, and an analysis data buffer 153.

The analysis operation unit 151 is configured to perform a physical analysis operation such as the analysis operation and the model fitting on the basis of control by the operation control unit 152. Details of the physical analysis operation by the analysis operation unit 151 will be described later.

The operation control unit 152 is configured to collectively control the physical analysis operation by the analysis operation unit 151. For example, the operation control unit 152 acquires data that is used in the physical analysis operation from the physical value data buffer 143, and provides the data to the analysis operation unit 151, or stores data output in the physical analysis operation by the analysis operation unit 151 in the analysis data buffer 153.

The analysis data buffer 153 is configured to temporarily store the data output in the physical analysis operation by the analysis operation unit 151.

The data visualization unit 160 is configured to perform various kinds of processing for visualization of data stored in the analysis data buffer 153 (in this embodiment, it is assumed that the data visualization unit 160 visualizes at least any one among the first physical value, the second physical value, and the third physical value). As illustrated in FIG. 1, the data visualization unit 160 includes a color mapping unit 161 and an image generation unit 162.

The color mapping unit 161 performs, for example, mapping of a color to a physical value by using RGB three primary colors for visualization of the data (particularly, respective physical values and the like) stored in the analysis data buffer 153, and the like (in other words, the color mapping unit 161 performs conversion of the physical value into colors, and the like. The processing is referred to as "color mapping").

The image generation unit 162 converts the physical value converted into colors by the color mapping unit 161 into image information (imaging), or generates image information that is overlaid (superimposition displayed) on RGB image information or the like.

The image output unit 170 is configured to output image information generated by the image generation unit 162 to the display device 180, or to output the image information to a predetermined external device (for example, an external display device, a storage device, and the like) through a network. Furthermore, the image output unit 170 may perform predetermined image processing (for example, filing processing and the like) with respect to the image information in accordance with an output.

The display device 180 is configured to provide the image information output by the image output unit 170 to a user by displaying the image information on a display or the like. Furthermore, a display aspect of the image information is not particularly limited. For example, the display device 180 may function as a projector to project the image information to a wall or the like.

Hereinbefore, the functional configuration example of the information processing apparatus 100 according to this embodiment has been described. Furthermore, with regard to the respective configurations which are described above, the image processing operation unit 130, the dimension conversion operation unit 140, the physical analysis operation unit 150, and the data visualization unit 160 can function as an operation unit that performs acquisition of a physical value and the like alone or in cooperation with each other. The physical value data buffer 143 can function as a storage unit that stores the first physical value and the second physical value in correlation with each other. In addition, the functional configuration described with reference to FIG. 1 is illustrative only, and the functional configurations of the information processing apparatus 100 according to this embodiment are not limited to the example. For example, all or some of the functional configurations of the information processing apparatus 100 may be provided in an external device. The functional configurations of the information processing apparatus 100 according to this embodiment may be flexibly modified in accordance with specifications or management.

(2.2. Example of Processing Flow)

The functional configuration example of the information processing apparatus 100 has been described. Next, an example of a flow of processing by the respective functional configurations of the information processing apparatus 100 will be described.

(Flow of Entirety of Processing by Information Processing Apparatus 100)

Figure 2:
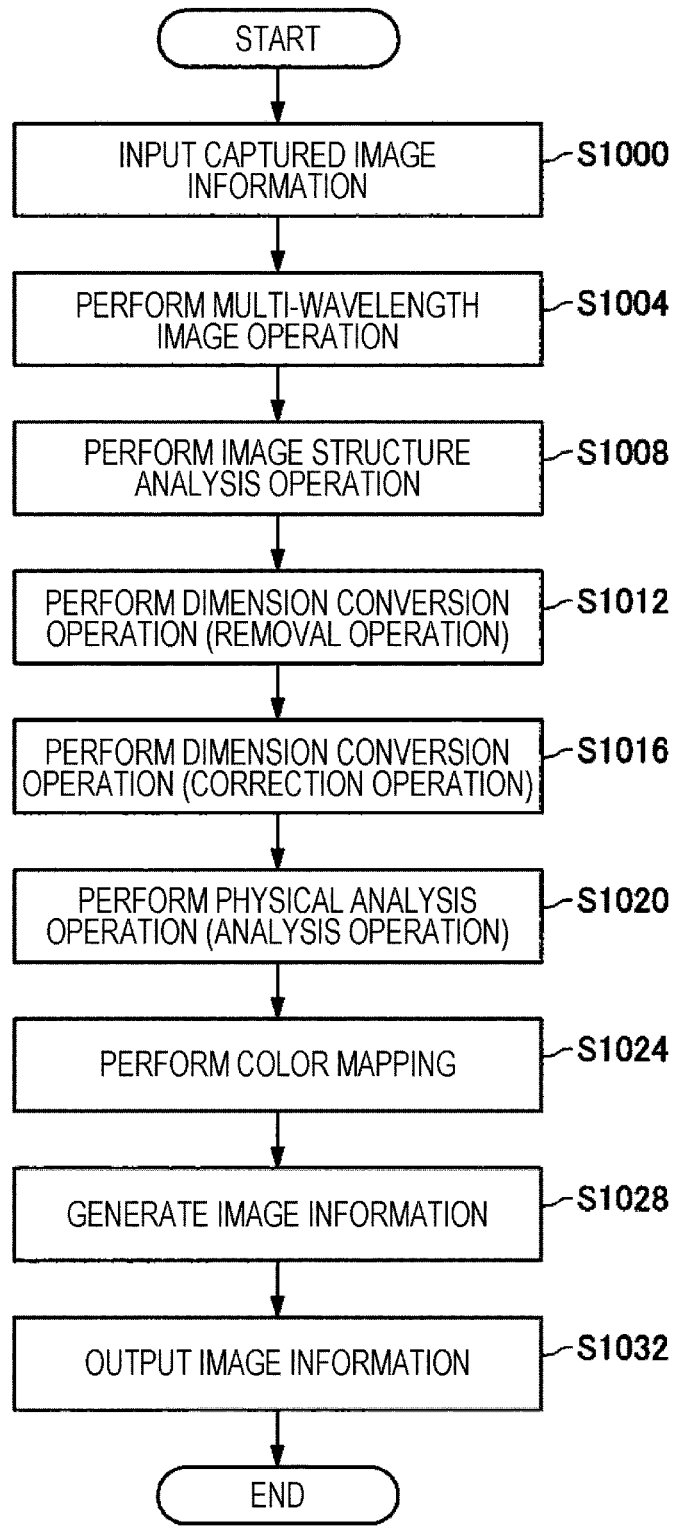
FIG. 2 is a flowchart illustrating an example of a flow of the entirety of processing by the information processing apparatus 100 according to the first embodiment.

First, an example of a flow of the entirety of processing by the information processing apparatus 100 will be described with reference to FIG. 2.

In step S1000, input of captured image information is performed. More specifically, the multi-spectrum camera 110 captures an image of a plant to generate multi-wavelength image information (captured image information), and the image input unit 120 acquires the captured image information and performs input of the captured image information.

In step S1004, the multi-wavelength image operation unit 131 performs a multi-wavelength image operation. For example, the multi-wavelength image operation unit 131 generate RGB image information or NIR image information by using the captured image information, or generate captured image information (for example, NDVI image information, PRI image information, and the like) indicating various kinds of vegetation indexes.

In step S1008, the image structure analysis operation unit 133 performs an image structure analysis operation. For example, the image structure analysis operation unit 133 simply classifies the captured image information into a right side and a left side, or finely classifies the captured image information.

In step S1012, the removal operation unit 141 performs a removal operation in the dimension conversion operation. For example, the removal operation unit 141 analyzes the captured image information, and removes a region in which an image of an object (for example, soil or the like) other than a plant which is included in the captured image information is captured, a region in which an image of a shadow is captured, and the like.

In step S1016, the correction operation unit 142 performs the correction operation in the dimension conversion operation. For example, the correction operation unit 142 converts the Nn value (pixel value) into the PAR of a leaf surface.

In step S1020, the physical analysis operation unit 150 performs the physical analysis operation. For example, the physical analysis operation unit 150 performs the analysis operation, the model fitting, and the like by using the data (for example, the first physical value, the second physical value, and the like) stored in the physical value data buffer 143.

In step S1024, the color mapping unit 161 performs the color mapping. For example, the color mapping unit 161 maps colors to physical values by using RGB three primary colors.

In step S1028, the image generation unit 162 generates image information. For example, the image generation unit 162 generates image information by using the physical values which are converted into colors by the color mapping unit 161, or generates image information that is overlaid (superimposition displayed) on RGB image information or the like.

In step S1032, the image output unit 170 outputs the image information. For example, the image output unit 170 outputs the image information generated by the image generation unit 162 to the display device 180, and the display device 180 displays the image information on a display or the like. A series of processing is terminated as described above.

(Flow of Input Processing of Captured Image Information)

Next, an example of a flow of input processing of the captured image information as illustrated in step S1000 in FIG. 2 will be described with reference to FIG. 3 and FIG. 4.

Figure 3:
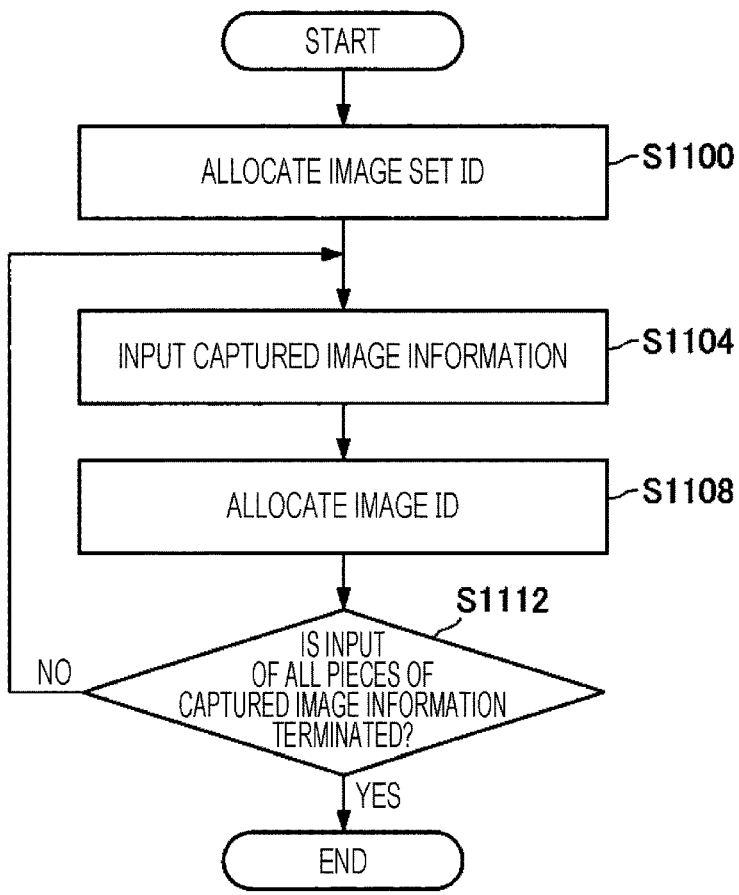
FIG. 3 is a flowchart illustrating an example of a flow of input processing of captured image information.

In step S1100 in FIG. 3, the image input unit 120 allocates an image set ID. Here, the "image set ID" is assumed as information capable of identifying a plurality of image sets which are considered to be obtained by capturing an image of the same site at the same time, but there is no limitation thereto. The image input unit 120 may allocate an image set ID that is designated by a user, or allocates a number counted from zero whenever image capturing is performed as the image set ID.

In step S1104, pieces of captured image information which are different in a wavelength band are input by the multi-spectrum camera 110. In this example, for example, pieces of captured image information of a near-infrared wavelength band (hereinafter, may be referred to as "Nn". A wavelength band is approximately 850 [nm] to approximately 870 [nm]), a red light wavelength band (hereinafter, may be referred to as "Rn". A wavelength band is approximately 650 [nm] to approximately 670 [nm]), a yellowish green light wavelength band (hereinafter, may be referred to as "Gr". A wavelength band is approximately 560 [nm] to approximately 580 [nm]), a green light wavelength band (hereinafter, may be referred to as "Gp". A wavelength band is approximately 525 [nm] to approximately 545 [nm]), and a blue light wavelength band (hereinafter, may be referred to as "B". A wavelength band is approximately 400 [nm] to approximately 440 [nm]) are sequentially input.

In step S1108, the image input unit 120 allocates an image ID to the captured image information of each wavelength band. The "image ID" is assumed as information capable of identifying captured image information of each wavelength band. An image ID of captured image information that is frequently used is defined in advance, and the image input unit 120 automatically allocates the image ID on the basis of the definition. Furthermore, the image input unit 120 may allocate the image ID by performing a predetermined operation. When the operations in step S1104 and step S1108 are performed with respect to pieces of captured image information of all wavelength bands which become a target (refer to step S1112), a series of input processing of the captured image information is terminated.

Figure 4:
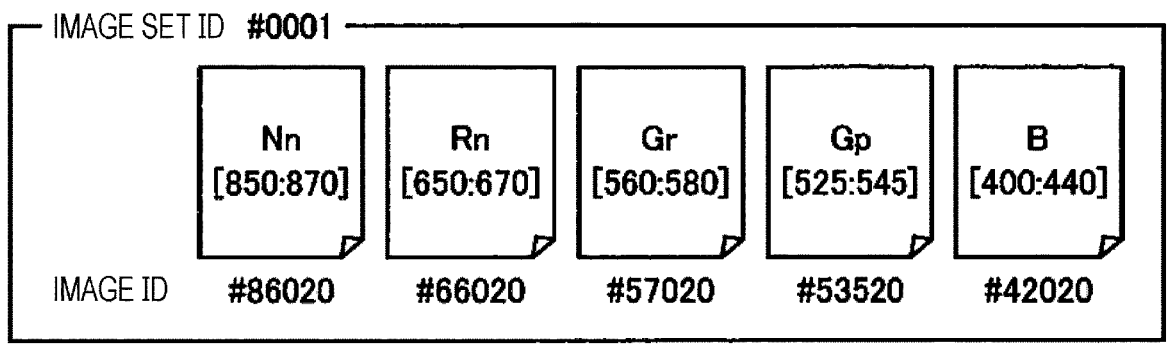
FIG. 4 is a view illustrating an example of a data state in a stage in which the input processing of the captured image information is terminated.

FIG. 4 illustrates a data state in a stage in which the input processing of the captured image information is terminated. "#0001" is allocated to the image set ID, and "#86020", "#66020", "#57020", "#53520", and "#42040" are allocated to image IDs of pieces of captured image information of Nn, Rn, Gr, Gp, and B.

(Flow of Multi-Wavelength Image Operation)

Next, an example of a flow of the multi-wavelength image operation illustrated in step S1004 in FIG. 2 will be described with reference to FIG. 5 to FIG. 8.

Figure 5:
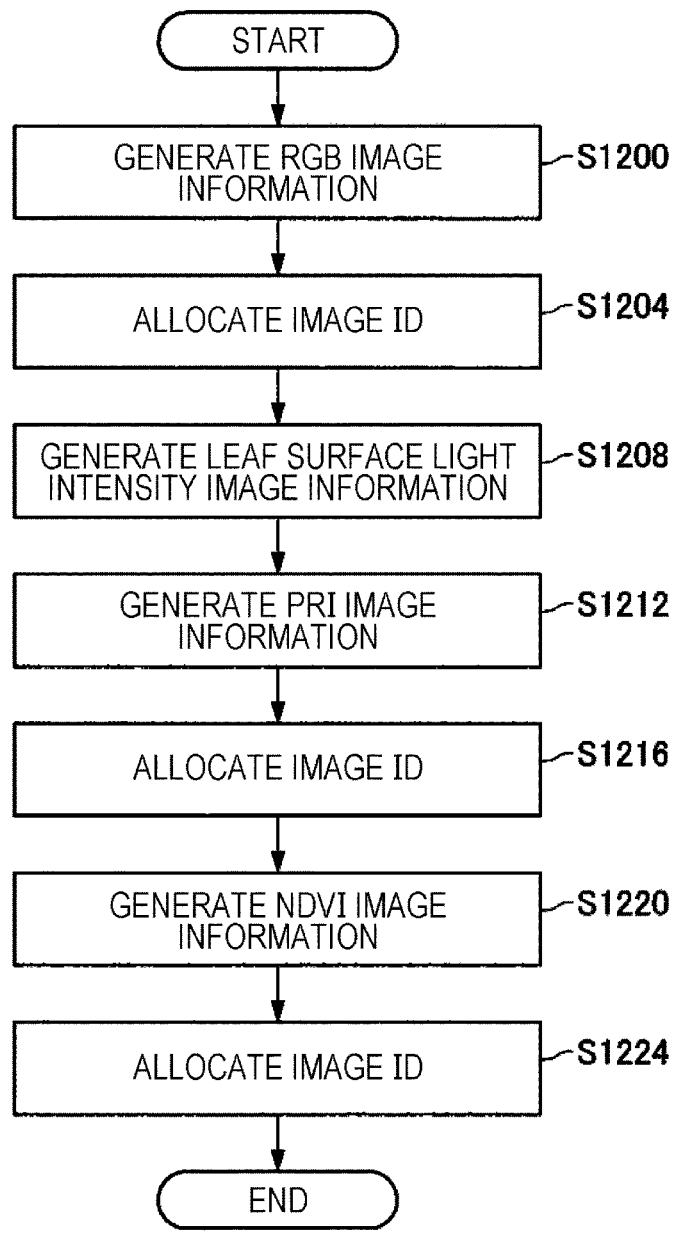
FIG. 5 is a flowchart illustrating an example of a flow of a multi-wavelength image operation.

In step S1200 in FIG. 5, the multi-wavelength image operation unit 131 generates RGB image information by using the captured image information that is input. In step S1204, the multi-wavelength image operation unit 131 allocates an image ID to the RGB image information that is generated. In step S1208, the multi-wavelength image operation unit 131 generates leaf surface light intensity image information by using the captured image information that is input. Here, in this example, it is assumed that the captured image information of Nn is used as the leaf surface light intensity image information as is, and thus the image ID is not newly allocated (the image ID of the captured image information of Nn is utilized). Furthermore, light of Nn is less likely to be absorbed by a leaf and is greatly reflected from the leaf, and thus the captured image information of Nn is used as the leaf surface light intensity image information. However, other pieces of information (for example, captured image information of visible light such as green light, and the like) may be used as the leaf surface light intensity image information.

In step S1212, the multi-wavelength image operation unit 131 generates PRI image information by using the captured image information that is input. Generation processing of the PRI image information will be described in detail in a rear stage. In step S1216, the multi-wavelength image operation unit 131 allocates the image ID to the PRI image information that is generated.

In step S1220, the multi-wavelength image operation unit 131 generates NDVI image information by using the captured image information that is input. Generation processing of the NDVI image information will be described in detail in a rear stage. In step S1224, the multi-wavelength image operation unit 131 allocates the image ID to the NDVI image information that is generated, and a series of the multi-wavelength image operations are terminated.

Figure 6:
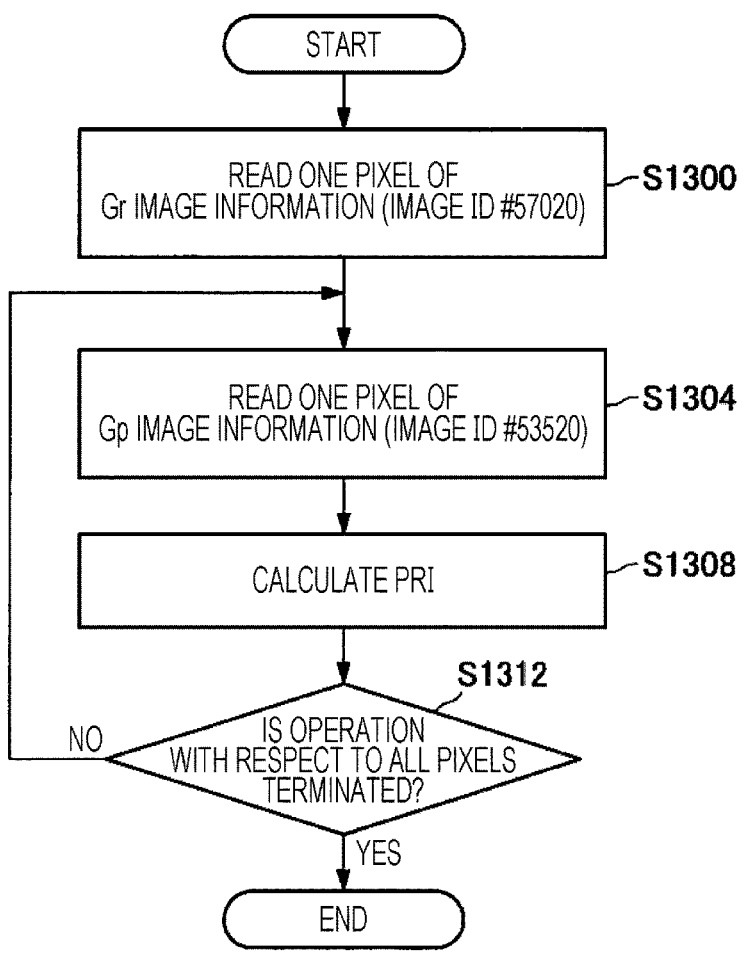
FIG. 6 is a flowchart illustrating an example of a flow of generation processing of PRI image information.

Here, a flow of the generation processing of the PRI image information as illustrated in step S1212 in FIG. 5 will be described with reference to FIG. 6. In step S1300 in FIG. 6, the multi-wavelength image operation unit 131 reads one pixel of the Gr image information (image ID: #57020). In step S1304, the multi-wavelength image operation unit 131 reads one pixel of the Gp image information (image ID: #53520) (one pixel corresponding to one pixel of the Gr image information). In step S1308, the multi-wavelength image operation unit 131 calculates the PRI by inputting the information of each pixel that is read by the multi-wavelength image operation unit 131 to the following Equation 2. Furthermore, a typical PRI is calculated by (Gp–Gr)/(Gp+Gr) as in Equation 1. However, in this example, the PRI is defined so that the PRI increases in a case where a stress reaction of a plant with respect to various stress factors is great, and thus the following Equation 2 is used.

[Math. 2]

$$PRI = \frac{Gr - Gp}{Gr + Gp} \quad \text{(Equation 2)}$$

When the operations in step S1300 to step S1308 are performed with respect to all pixels in the captured image information (refer to step S1312), a series of generation processing of the PRI image information is terminated.

Figure 7:
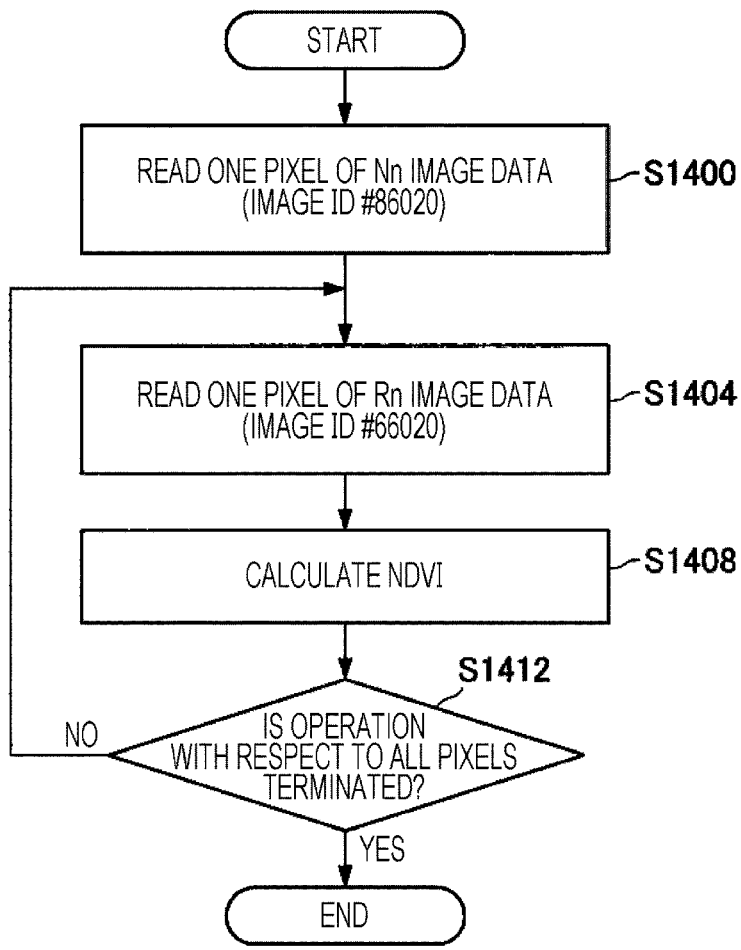
FIG. 7 is a flowchart illustrating an example of a flow of generation processing of NDVI image information.

Here, a flow of the generation processing of the NDVI image information as illustrated in step S1220 in FIG. 5 will be described with reference to FIG. 7. In step S1400 in FIG. 7, the multi-wavelength image operation unit 131 reads one pixel of the Nn image information (image ID: #86020). In step S1404, the multi-wavelength image operation unit 131 reads one pixel of the Rn image information (image ID: #66020) (one pixel corresponding to one pixel of the Nn image information). In step S1408, the multi-wavelength image operation unit 131 calculates the NDVI by inputting the information of each pixel that is read by the multi-wavelength image operation unit 131 to the following Equation 3.

[Math. 3]

$$NDVI = \frac{Nn - Rn}{Nn + Rn} \quad \text{(Equation 3)}$$

When the operations in step S1400 to step S1408 are performed with respect to all pixels in the captured image information (refer to step S1412), a series of generation processing of the NDVI image information is terminated.

Figure 8:
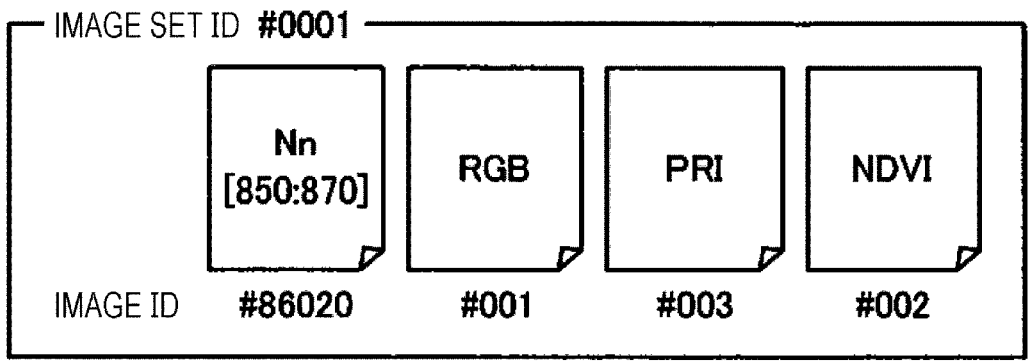
FIG. 8 is a view illustrating an example of a data state in a stage in which the multi-wavelength image operation is terminated.

FIG. 8 illustrates a data state in a stage in which the multi-wavelength image operation is terminated. "#001", "#003", and "#002" are allocated image IDs of RGB image information, PRI image information, and NDVI image information which are newly generated. Furthermore, description has been given of the gist of generating the PRI image information and the NDVI image information, but the image information generated in accordance with the purpose of physical analysis can be flexibly modified.

(Flow of Image Structure Analysis Operation)

Next, an example of a flow of the image structure analysis operation as illustrated in step S1008 in FIG. 2 will be described with reference to FIG. 9 to FIG. 13. The image structure analysis operation unit 133 classifies the captured image information into a plurality of regions through the image structure analysis operation.

Figure 9:
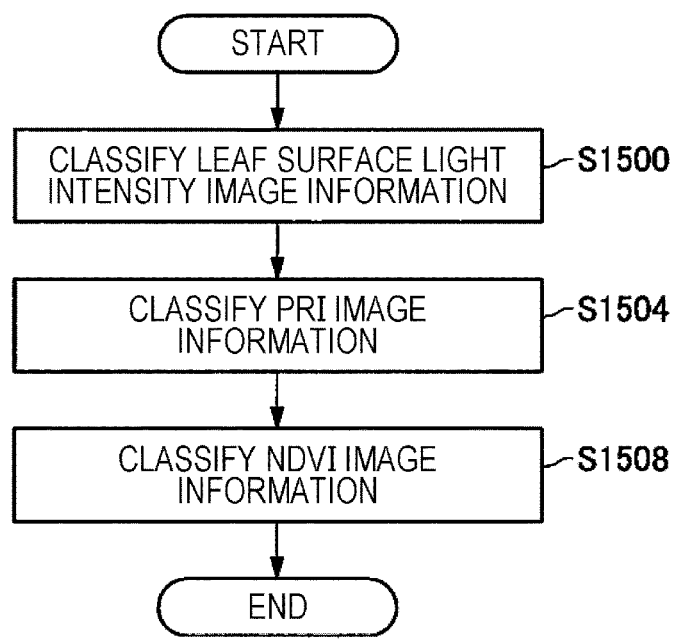
FIG. 9 is a flowchart illustrating an example of a flow of image structure analysis operation.

More specifically, in step S1500 in FIG. 9, the image structure analysis operation unit 133 classifies leaf surface light intensity image information. Details of the classification processing of the image information will be described in detail in a rear stage. In addition, as in the leaf surface light intensity image information, the image structure analysis operation unit 133 classifies the PRI image information in step S1504, and classifies the NDVI image information in step S1508. According to this, a series of image structure analysis operations are terminated.

Figure 10:
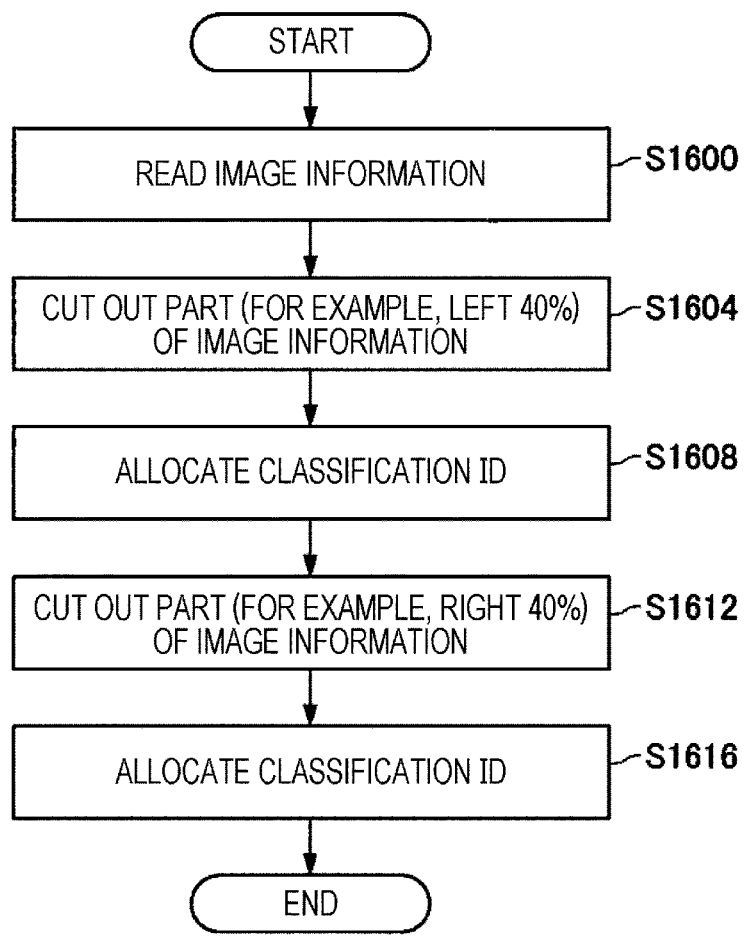
FIG. 10 is a flowchart illustrating a flow of classification processing of captured image information.
Figure 11:
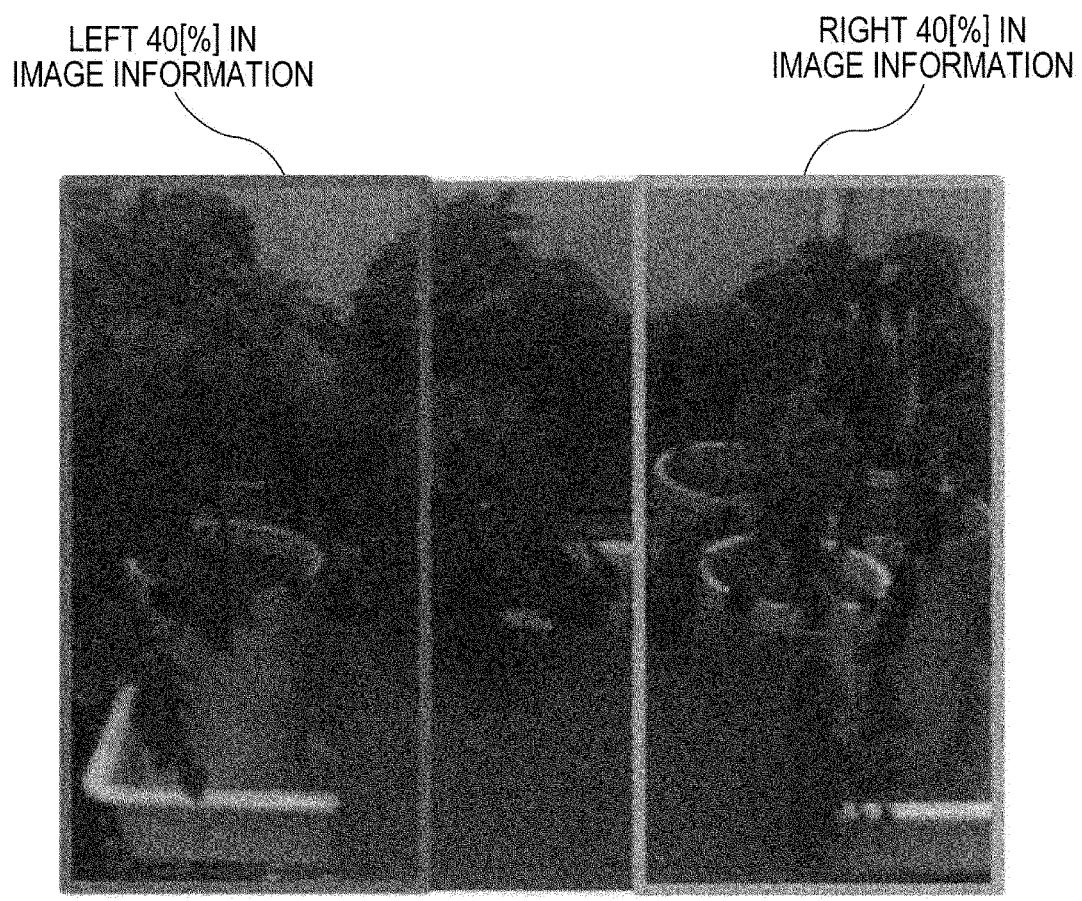
FIG. 11 is a view illustrating a specific example of classification of the captured image information.

Here, a flow of the classification processing of the image information will be described with reference to FIG. 10. In step S1600 in FIG. 10, the image structure analysis operation unit 133 reads each piece of image information. In step S1604, the image structure analysis operation unit 133 cuts out a part of the image information. For example, as illustrated in FIG. 11, the image structure analysis operation unit 133 cuts off left 40[%] in the image information. In step S1608, the image structure analysis operation unit 133 allocates a classification ID to the cut-out portion. The "classification ID" is information capable of identifying the cut-out portion, and is assumed as sub-classification of the image ID. In step S1612, the image structure analysis operation unit 133 cuts out another part of the image information. For example, as illustrated in FIG. 11, the image structure analysis operation unit 133 cuts out right 40[%] in the image information. In step S1616, the image structure analysis operation unit 133 allocates the classification ID to the cut-out portions. According to this, a series of classification processing of the image information is terminated.

Furthermore, the allocation method of the classification ID is not limited to the above-described configuration. For example, in a case where the image structure analysis operation unit 133 simply divides the image information into 64 pieces in vertical and horizontal directions, and the like, the classification ID may be automatically generated for each divided region. In addition, in a case where the image structure analysis operation unit 133 recognizes a portion (for example, a portion of a plant, or the like) that is specified by an image recognition technology, an ID corresponding to a recognized portion may be allocated to the classification ID (for example, in a case where a leaf is recognized, "Leaf" or the like may be allocated to the classification ID). In addition, the image structure analysis operation unit 133 may set a region of the classification ID on the basis of resolution of a display to which image information after being subjected to color mapping is finally output. For example, the image structure analysis operation unit 133 may set the classification ID for each region having a size corresponding to resolution of the display. In addition, the image structure analysis operation unit 133 may set a region of the classification ID on the basis of a physical value averaging unit in the color mapping (will be described in detail in a rear stage). For example, in a case where the image information is classified in a unit of several pixels in a vertical direction and a horizontal direction during color mapping, the image structure analysis operation unit 133 may set the classification ID for each region having a size corresponding to the classification unit. In addition, in a case where a defect is included in data of a region of the classification ID that is set for the first time, the image structure analysis operation unit 133 may dynamically set the classification ID to supplement an influence of the defect. For example, in a case where all pieces of data (all pieces of pixel data) of the region of the classification ID have a defect, the image structure analysis operation unit 133 may set the region of the classification ID so that defect-free data is included in the region. Here, for example, the "defect" represents a failure such as deficiency of data, so-called "halation" caused by an imaging environment, or the like, but the defect is not limited thereto. In addition, the image structure analysis operation unit 133 may set the region of the classification ID so that normal data in a number necessary for evaluation in physical analysis in a rear stage is included. Here, for example, the "normal" represents that leaf surface light intensity is equal to or greater than a constant value, or the like, but there is no limitation thereto. In addition, an ID designated by a user may be allocated to the classification ID.

Furthermore, the processing of cutting the right partial portion and the left partial portion in the captured image information is performed so that comparison of stress reactions of different individuals in measurement at the same time becomes easier, and thus it should be understood that the processing is the most simplified processing example. In addition, in a research experiment, different measurement targets are respectively disposed at a left portion and a right portion in the captured image information (for example, a case where a plant that has been subjected to an environment stress treatment is disposed on one side, and a plant that is not subjected to the environment stress treatment is disposed on the other side as a comparison target, and the like), and measurement and comparison of physical values, and the like are performed. Here, a ratio of the cut-out portion to the entirety of image information is not limited to 40[%]. In addition, as described above, the image structure analysis operation unit 133 may analyze the captured image information by using a predetermined image recognition technology to recognize objects (for example, plant portions or the like including leaves (an upper leaf, an intermediate leaf, a lower leaf, and the like), flowers, fruits, stems, and the like) included in the captured image information, and may classify the captured image information for each object. In addition, the image structure analysis operation unit 133 may three-dimensionally classify the captured image information in accordance with an image recognition technology (for example, a known three-dimensional image information analysis technology, and the like). In addition, the above-described various classification methods may be designated by a user.

Figure 12:
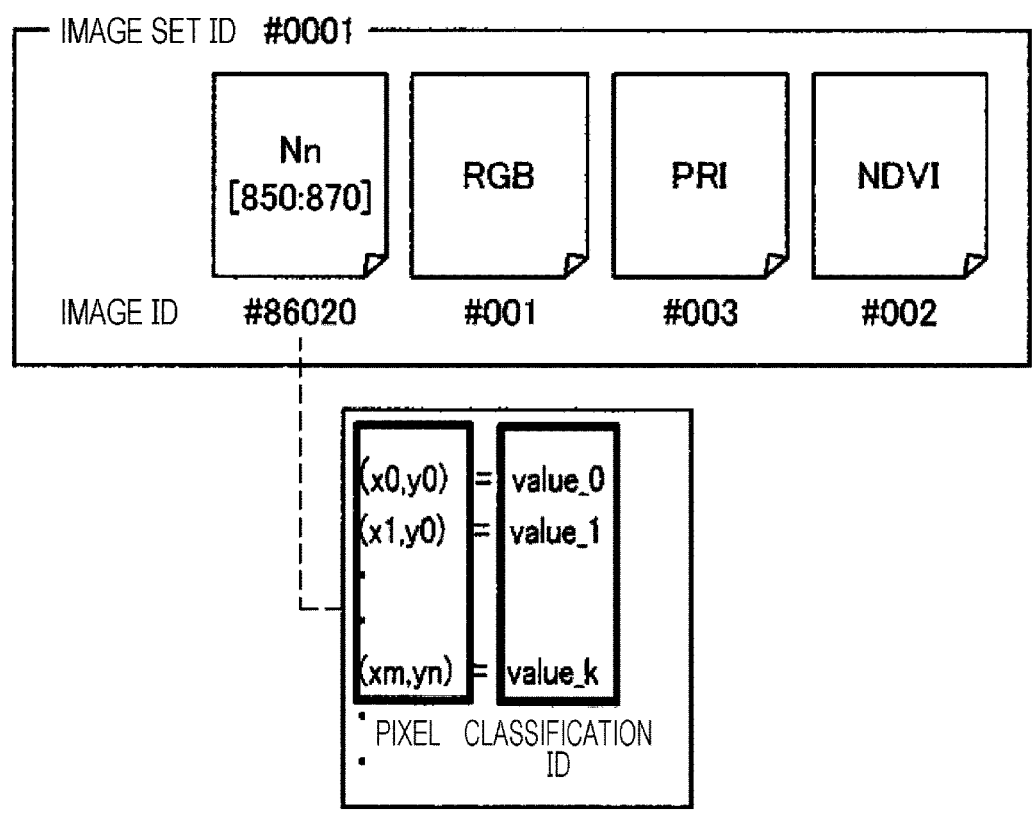
FIG. 12 is a view illustrating an example of a data state in a stage in which the image structure analysis operation is terminated.
Figure 13:
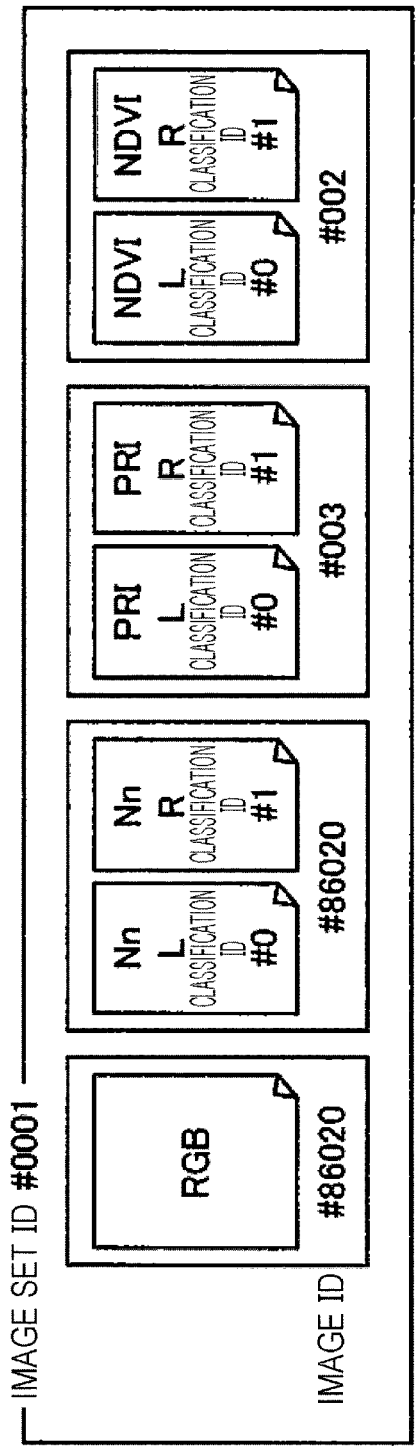
FIG. 13 is a view illustrating an example of a data state in a stage in which the image structure analysis operation is terminated.

FIG. 12 illustrates data state in a stage in which the image structure analysis operation is terminated. In the example of FIG. 12, the classification ID is allocated in pixel unit of the image information and is allocated to each pixel. Furthermore, as illustrated in FIG. 13, a file may be classified for each classification ID (in the example in FIG. 13, "L" represents left 40[%] in the image information, and "R" represents right 40[%] in the image information). As described above, the image structure analysis operation unit 133 divides the captured image information, and thus processing corresponding to classification can be performed in a rear stage. For example, the image structure analysis operation unit 133 classifies the upper leaf and the lower leaf from each other, and thus parameters which are used in operations related to classification corresponding to the upper leaf and classification corresponding to the lower leaf in a rear stage are changed to different parameters. In addition, the image structure analysis operation unit 133 classifies the kinds of plants, and thus in a case where presence of a plurality of kinds of plants in the captured image information is revealed, an algorithm that is used in an operation in a rear stage may be changed.

(Flow of Removal Operation)

Next, an example of a flow of the removal operation in the dimension conversion operation illustrated in step S1012 in FIG. 2 will be described with reference to FIG. 14. The removal operation unit 141 removes a region, in which analysis accuracy is predicted to be lower than a predetermined value among regions of the captured image information, from an operation target.

Figure 14:
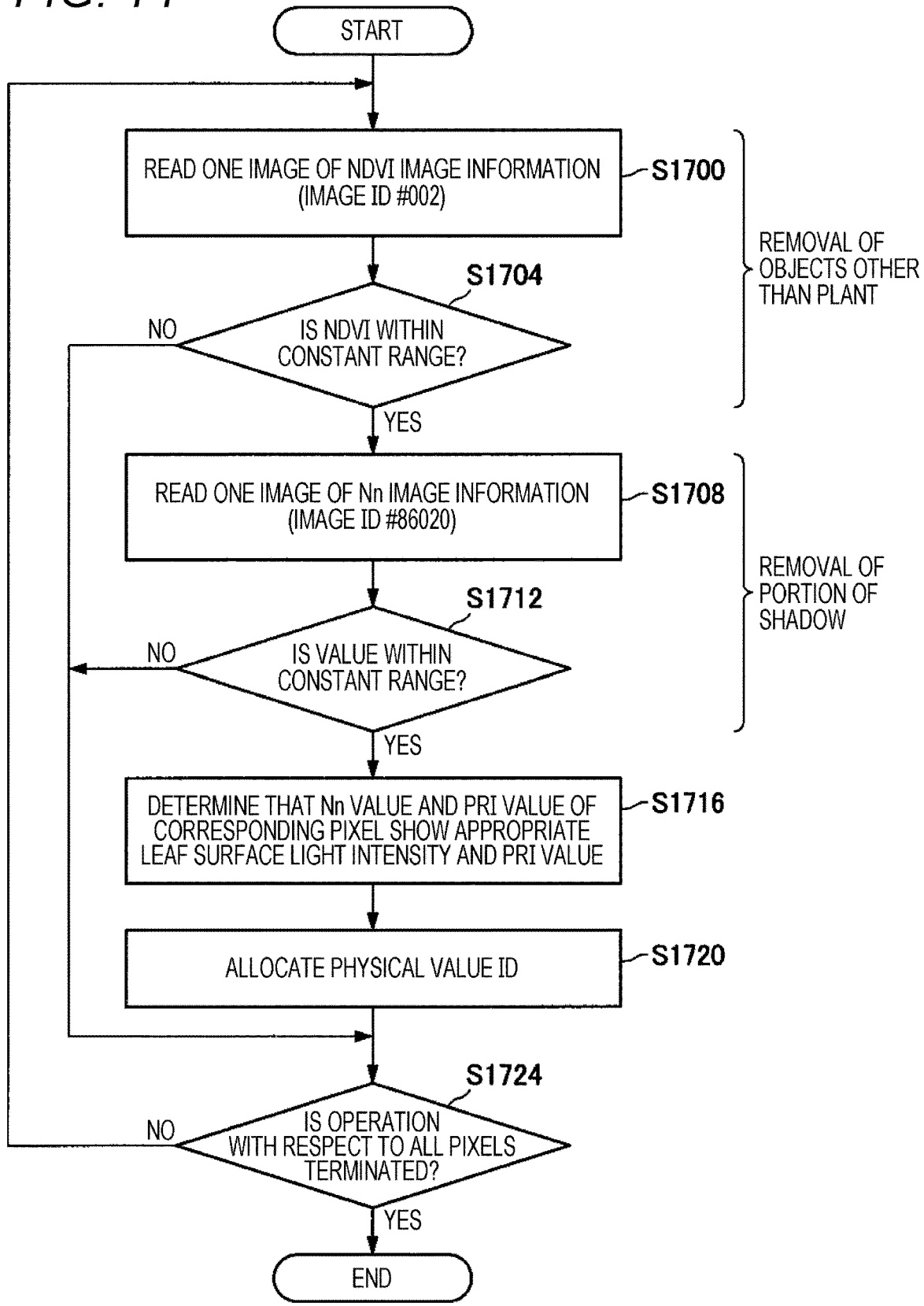
FIG. 14 is a flowchart illustrating an example of a flow of a removal operation.

More specifically, in step S1700 in FIG. 14, the removal operation unit 141 reads one pixel of the NDVI image information (image ID: #002). In step S1704, the removal operation unit 141 confirms whether or not the NDVI in the pixel is a value within a constant range. Here, the "constant range" represents a range capable of determining whether or not a region is a region including a plant in the NDVI image information, and in a case where the NDVI is a value within a constant range (for example, NDVI>0.5, or the like), it can be said that there is a high possibility that the plant is included in the region.

In a case where the NDVI is a value within a constant range (step S1704/Yes), in step S1708, the removal operation unit 141 reads one pixel of the Nn image information (image ID: #86020) (one pixel corresponding to one pixel of the NDVI image information). In step S1712, the removal operation unit 141 confirms whether or not the Nn value (pixel value) in the pixel is a value within a constant range. Here, the "constant range" represents a range capable of determining whether or not a region is a region in which an image of a shadow is captured in the Nn image information, and in a case where the Nn value is a value within a constant range, it can be said that there is a high possibility that a shadow is not included in the region. The shadow of a leaf of a plant or scattered reflection of the leaf has unique spectral characteristics (optical complexity), and it is difficult to appropriately evaluate that irradiation with light is performed in which manner. However, when confirming whether or not the Nn value is a value within a constant range, the removal operation unit 141 can set a site in which optical complexity caused by a shape of a plant is small as an analysis target.

In a case where the Nn value is a value within a constant range (step S1712/Yes), in step S1716, the removal operation unit 141 determines that the Nn value and the PRI value of a corresponding pixel show appropriate leaf surface light intensity and PRI value. In step S1720, the removal operation unit 141 allocates the physical value ID to the Nn value and the PRI value and stores the physical value ID. Furthermore, in a case where it is determined in step S1704 that the NDVI is not a value within a constant range (step S1704/No) or in a case where it is determined in step S1712 that the Nn value is not a value within a constant range (step S1712/No), the removal operation unit 141 does not perform allocation of the physical value ID to the Nn value and the PRI value, and the like. According to this, the removal operation unit 141 can remove a region, in which analysis accuracy is predicted to be lower than a predetermined value, among regions in the image information from an operation target. When the operations in step S1700 to step S1720 are performed with respect to all pixels (refer to step S1724), a series of the removal operations are terminated.

(Flow of Correction Operation)

Figure 15:
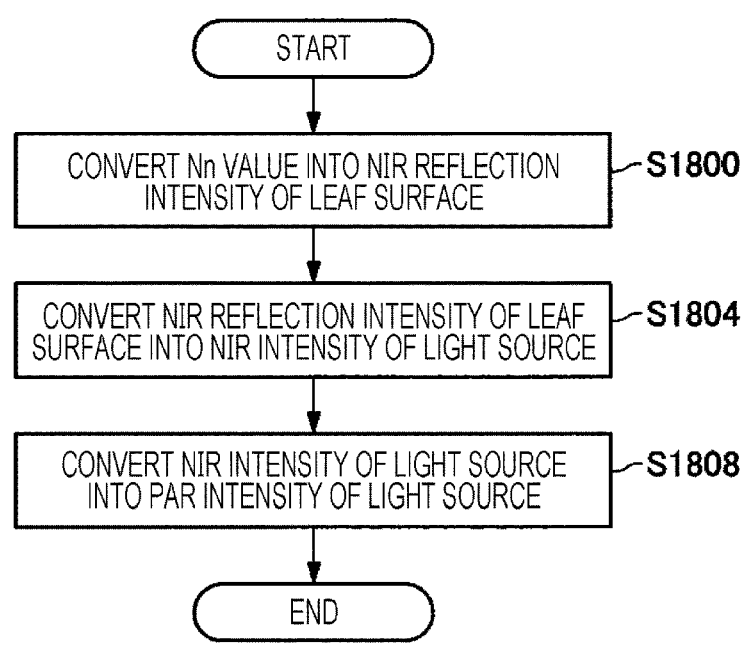
FIG. 15 is a flowchart illustrating an example of a flow of a correction operation.

Next, an example of a flow of the correction operation in the dimension conversion operation as illustrated in step S1016 in FIG. 2 will be described with reference to FIG. 15. The correction operation unit 142 performs processing of converting the Nn value (pixel value) into leaf surface light intensity (also referred to as photo synthetically active radiation (PAR)).

More specifically, in step S1800, the correction operation unit 142 converts the Nn value (pixel value) into actual NIR reflection intensity of a leaf surface by using a relationship between incident light intensity and the pixel value which are determined by sensitivity or gain setting of an imager of the multi-spectrum camera 110. In step S1804, the correction operation unit 142 converts the NIR reflection intensity of the leaf surface into NIR intensity of a light source by using a reflectance k (for example, approximately 0.8) of the NIR of a group vegetation. In step S1808, the correction operation unit 142 converts the NIR intensity of the light source into the PAR intensity of the light source by using a ratio of the PAR intensity and the NIR intensity of the light source. According to this, a series of processing is terminated. Furthermore, the correction operation unit 142 acquires the ratio of the PAR intensity and the NIR intensity of the light source from a sensor, or uses a representative value as the ratio. In addition, in a case where the information processing apparatus 100 calculates a relative value of stress reactions of a plant with respect to various stress factors (for example, in a case where it is advantageous to know a difference of physical values in respective region like a case where the information processing apparatus 100 desires to find an individual that receives a relatively strong stress in the captured image information, and the like), the conversion processing by the correction operation unit 142 may be omitted.

FIG. 16 illustrates a data state in a stage in which the removal operation and the correction operation are terminated. In FIG. 16, a "physical value 1 (first physical value)" represents the leaf surface light intensity (PAR), and an ID (in this example, #1000) that identifies the leaf surface light intensity (PAR) is set to a "physical value ID1". In addition, a "physical value 2 (second physical value)" represents the PRI, and an ID (in this example, #1100) that identifies the PRI is set to a "physical value ID2". Furthermore, a "physical set ID" in FIG. 16 is information capable of identifying one data set of physical values, and plays a role of correlating the physical value 1 (first physical value) and the physical value 2 (second physical value) with each other. In this manner, the dimension conversion operation unit 140 converts dimensional information of a vertical direction and a horizontal direction in the captured image information into dimensional information of physical values of an environment and a response, and can store the first physical value corresponding to the environment and the second physical value corresponding to the response in correlation with each other. Furthermore, as illustrated in FIG. 16, an image set ID, a classification ID, and an image position ID capable of identifying a position in the captured image information are included in the data that is output to the physical value data buffer 143, but the content of the data is not limited thereto.

(Flow of Analysis Operation and Details of Processing)

Next, the analysis operation as illustrated in step S1020 in FIG. 2 will be described. The analysis operation unit 151 outputs the third physical value indicating a stress reaction (state) of a plant due to various stress factors on the basis of the leaf surface light intensity (PAR) that is the first physical value corresponding to the environment, and the PRI that is the second physical value corresponding to the response. For example, in a case where an environment stress in which pores are closed due to dry of soil occurs, the magnitude of a stress which the plant actually receives is greatly influenced by the intensity of light which the plant receives. The reason for this is as follows. Since the pores are closed, efficiency of Calvin cycle decreases and the amount of energy that is received by the photochemical system 2 that converts light into electrons decreases, but the photochemical system 2 continuously converts light into electrons.

In this case, as the intensity of light that is received by a plant increases, the magnitude of surplus energy also increases, a photosynthesis rate decreases, and hydrogen peroxide occurs inside a plant according to circumstances, for example. That is, it is also considered that the plant is directly damaged. In contrast, even in a case where an environment stress is present, when intensity of light that is received by a plant is weak, the influence is small. In addition, it is difficult to perform comparison of states of different individuals or comparison when the environment stress varies if a value related to a stress that is measured does not corresponds to the same intensity of light.

Figure 18:
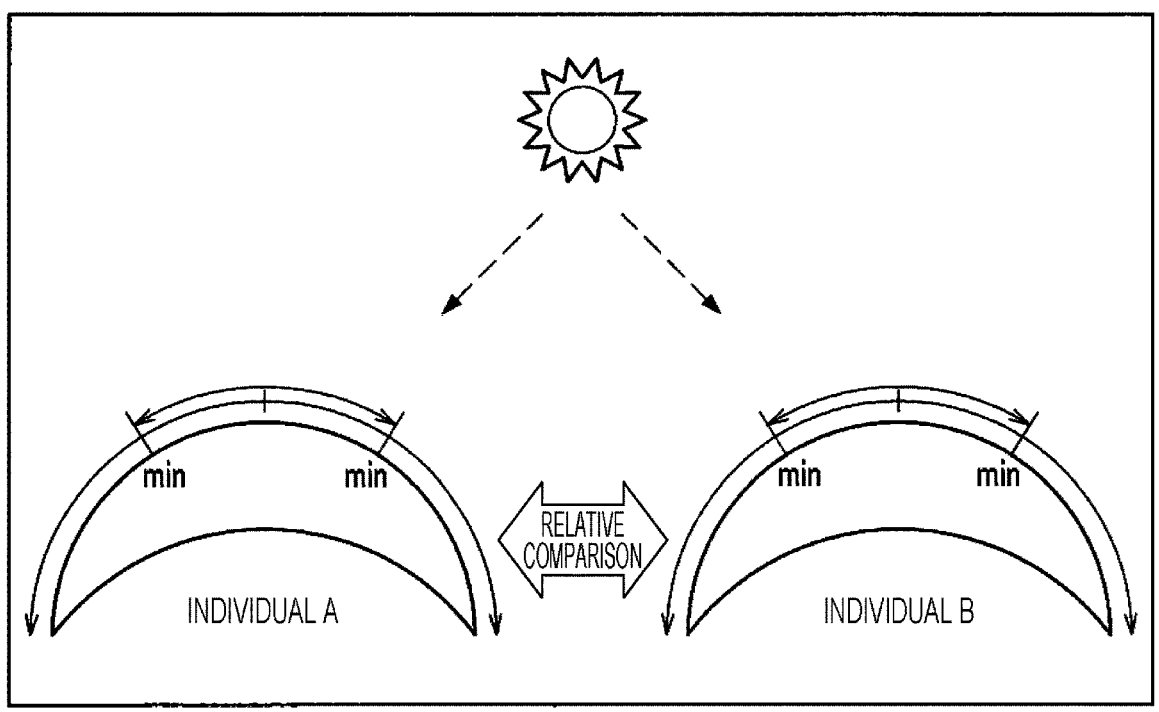
FIG. 18 is a view illustrating analysis images of different individual physical values which are measured at the same time.

Here, the analysis operation unit 151 extracts a physical value at least when the intensity of light with which a leaf is irradiated is equal to or greater than a constant value as a value corresponding to the environment stress of the plant. According to this, as illustrated in a table of FIG. 17, analysis of physical values of different individuals which are measured under the same measurement condition (the same time) can be performed by relative difference comparison of the physical values. For example, as illustrated in FIG. 18, analysis of physical values (stresses) of an individual A and an individual B, which are measured at the same time, can be performed by calculation of a relative difference between physical values. In addition, a physical value when the intensity of light with which a leaf is irradiated is equal to or greater than a constant value can be used in processing, and thus the analysis operation unit 151 can output an environment stress with respect to a portion in which excessive energy is great without being photosynthesized sufficiently. In addition, in comparison to a case where a physical value when the intensity of light with which a leaf is irradiated is within a constant range is used in analysis as described later, in a case where the physical value when the intensity of light with which a leaf is irradiated is equal to or greater than a constant value is used in analysis, the number of samples (the number of physical set IDs) of an analysis target increases, and thus more accurate comparison may be possible.

In addition, the analysis operation unit 151 extracts a physical value when the intensity of light with which a leaf is irradiated is within a constant range as the value corresponding to the environment stress of the plant as necessary. According to this, as illustrated in the table of FIG. 17, not only the analysis of the physical values of the different individuals which are measured under the same measurement condition (the same time), but also analysis of physical values of the same individual or different individual, which are measured under a different measurement condition (different time) is also possible. For example, as illustrated in FIG. 19A, FIG. 19B, and FIG. 19C, in a case where a measurement condition varies (in FIG. 19B, the amount of solar radiation varies due to an influence of cloud, and in FIG. 19C, the solar altitude varies), the analysis operation unit 151 can realize analysis by using a physical value of a part in which the intensity of light is within a constant range.

Figure 20A:
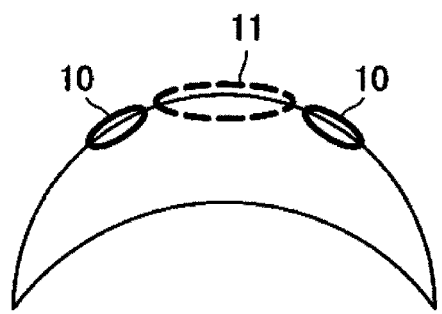
FIG. 20A is a view illustrating a case where a normal portion 10 and a portion 11 having an unusual shape state may exist in a leaf.
Figure 20B:
FIG. 20B is a view illustrating a case where a normal portion 10 and a portion 11 having an unusual shape state may exist in a leaf.

Furthermore, as illustrated in FIG. 20A and FIG. 20B, in a leaf, a normal portion 10 may be present and a portion 11 having an unusual shape state such as withering may be present. In the portion 11 having the unusual shape state, a distribution of the leaf surface light intensity is more likely to vary in comparison to a normal state. Accordingly, even in analysis of physical values of different individuals which are measured under the same measurement condition (the same time), it is more preferable to use physical values when the intensity of light with which the leaf is irradiated is within a constant range. Here, FIG. 18 to FIG. 20B illustrate a single leaf in a plant, but the single leaf illustrated in FIG. 18 to FIG. 20B may be dealt as the entirety of an individual of the plant. More specifically, after an inclination of the single leaf is analyzed in detail, an inclination distribution of the leaf when substituting the entirety of the individual with one sheet of leaf may be obtained on the basis of an inclination tendency of the single leaf included in the entirety of the individual. In an aspect of the present disclosure, it is not necessary to obtain image resolution in a single leaf level, and for example, it is not necessary for resolution in a portion such as an upper leaf that is considered to be approximately uniformly irradiated with light to be high. That is, when the single leaf illustrated in FIG. 18 to FIG. 20B is dealt as a model indicating the entirety of the individual of the plant, optimization of processing is possible.

Figure 21:
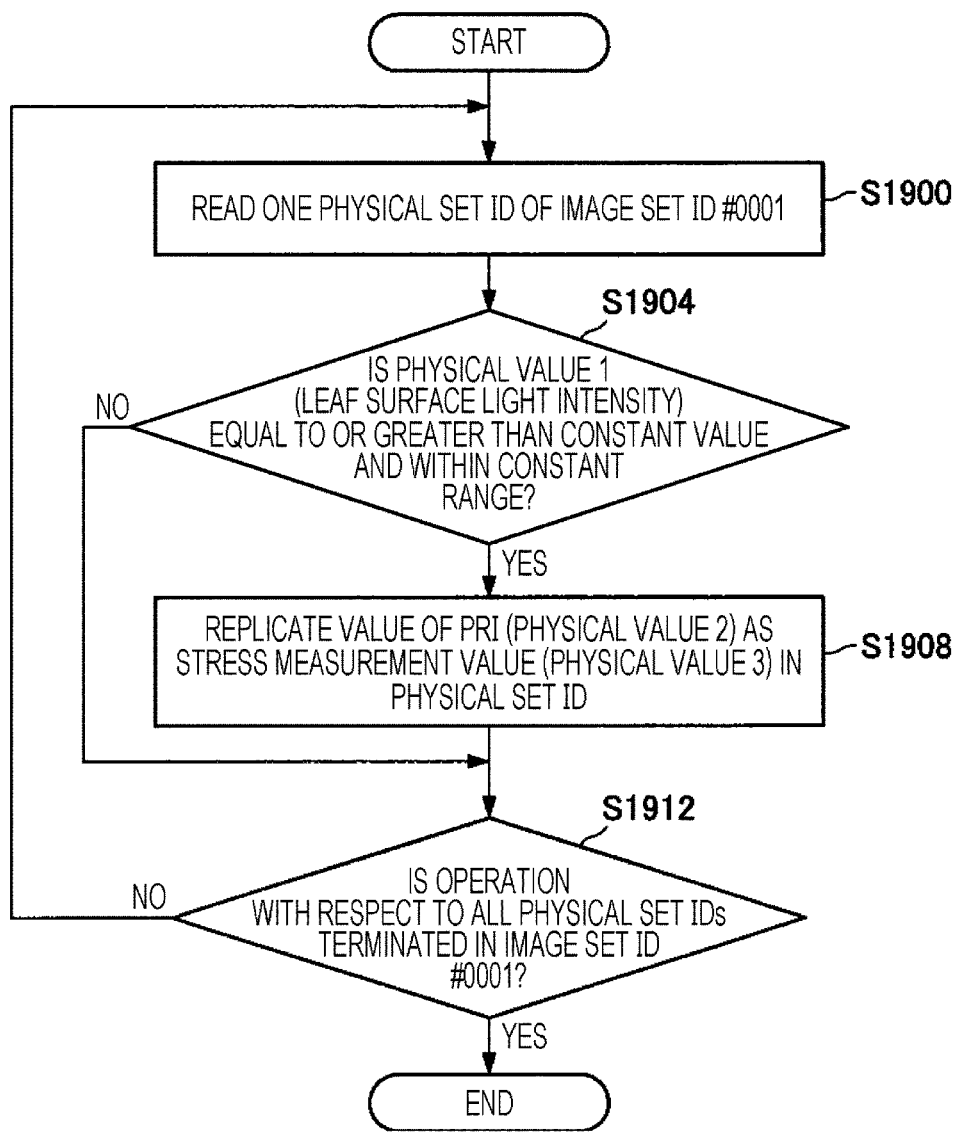
FIG. 21 is a flowchart illustrating an example of a flow of an analysis operation.

Next, an example of a flow of the analysis operation will be described with reference to FIG. 21. FIG. 21 illustrates an example of a flow of the analysis operation in a case where the analysis operation unit 151 extracts a physical value when the intensity of light with which a leaf is irradiated is equal to or greater than a constant value and within a constant range as a value corresponding to the environment stress of the plant.

In step S1900, the analysis operation unit 151 reads one physical set ID of an image set ID (for example, #0001) that is a target. In step S1904, the analysis operation unit 151 confirms whether or not a physical value 1 (leaf surface light intensity (PAR)) of the physical set ID is equal to or greater than a constant value and within a constant range. In a case where the physical value 1 (leaf surface light intensity (PAR)) is equal to or greater than a constant value and within a constant range (step S1904/Yes), in step S1908, the analysis operation unit 151 replicates a value of PRI (physical value 2 (second physical value)) as a stress measurement value (physical value 3 (third physical value)) in the physical set ID. Furthermore, in a case where the physical value 1 (leaf surface light intensity (PAR)) is lower than a constant value or is not within a constant range (step S1904/No), the processing in step S1908 is not performed. When the operation in step S1900 to step S1908 is performed with respect to all physical set IDs in the image set ID that becomes a target (refer to step S1912), a series of analysis operations are terminated.

Figure 22:
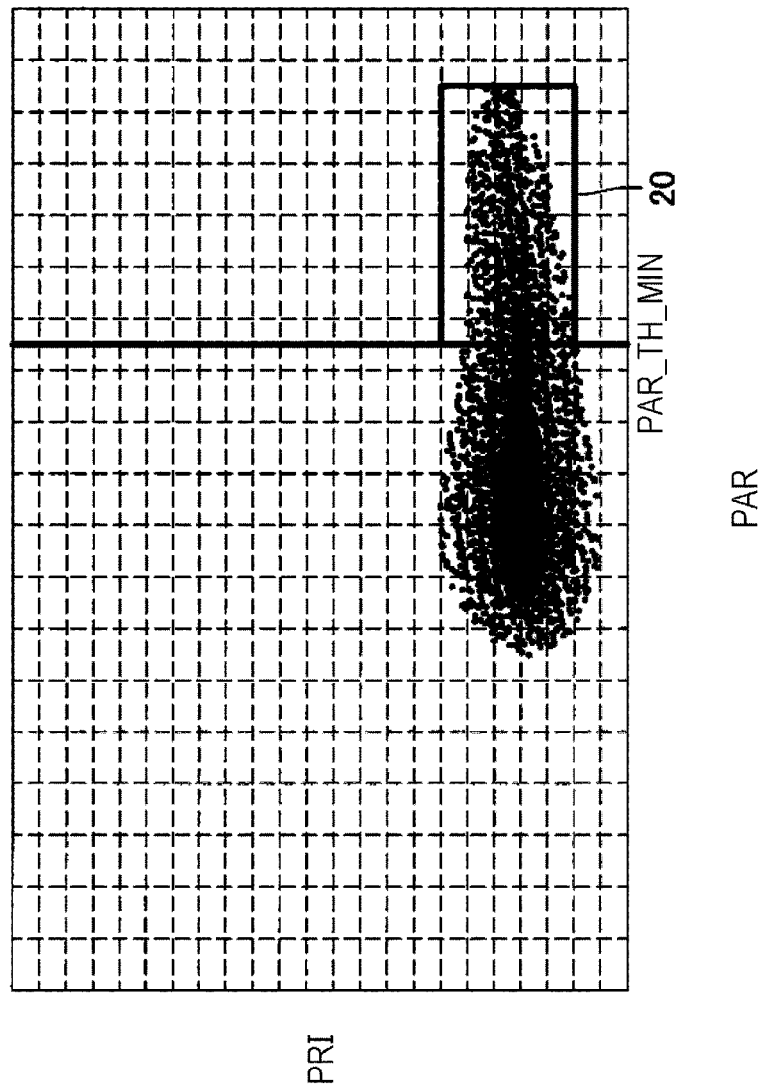
FIG. 22 is a view illustrating a relationship between a condition of the intensity (PAR) of light with which a leaf is irradiated and a PRI.
Figure 23:
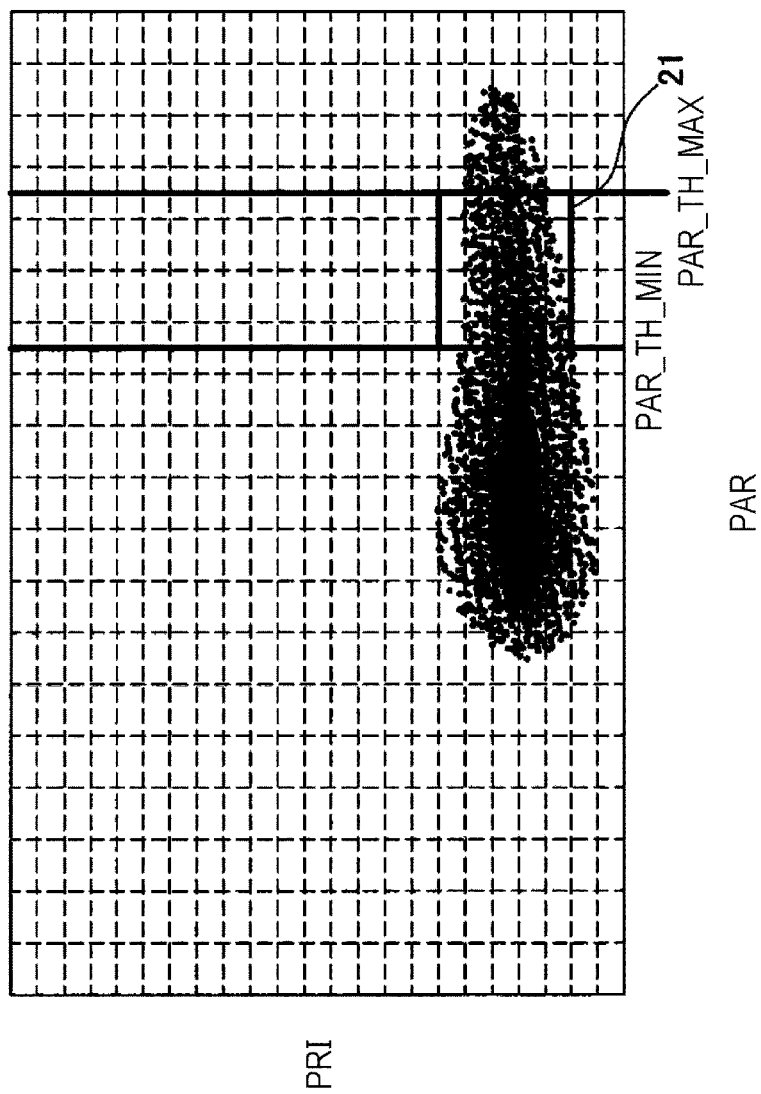
FIG. 23 is a view illustrating the relationship between the condition of the intensity (PAR) of light with which a leaf is irradiated and the PRI.

Here, description will be given of a relationship between a condition of the intensity (PAR) of light with which a leaf is irradiated and the PRI with reference to FIG. 22 to FIG. 24. FIG. 22 illustrates a PRI group 20 that is replicated when the intensity (PAR) of light with which a leaf is irradiated is equal to or greater than a constant value (in the drawing, equal to or greater than PAR_TH_MIN). In addition, FIG. 23 illustrates a PRI group 21 that is replicated when the intensity (PAR) of light with which a leaf is irradiated is equal to or greater than a constant value and within a constant range (in the drawing, PAR_TH_MIN to PAR_TH_MAX).

Figure 24:
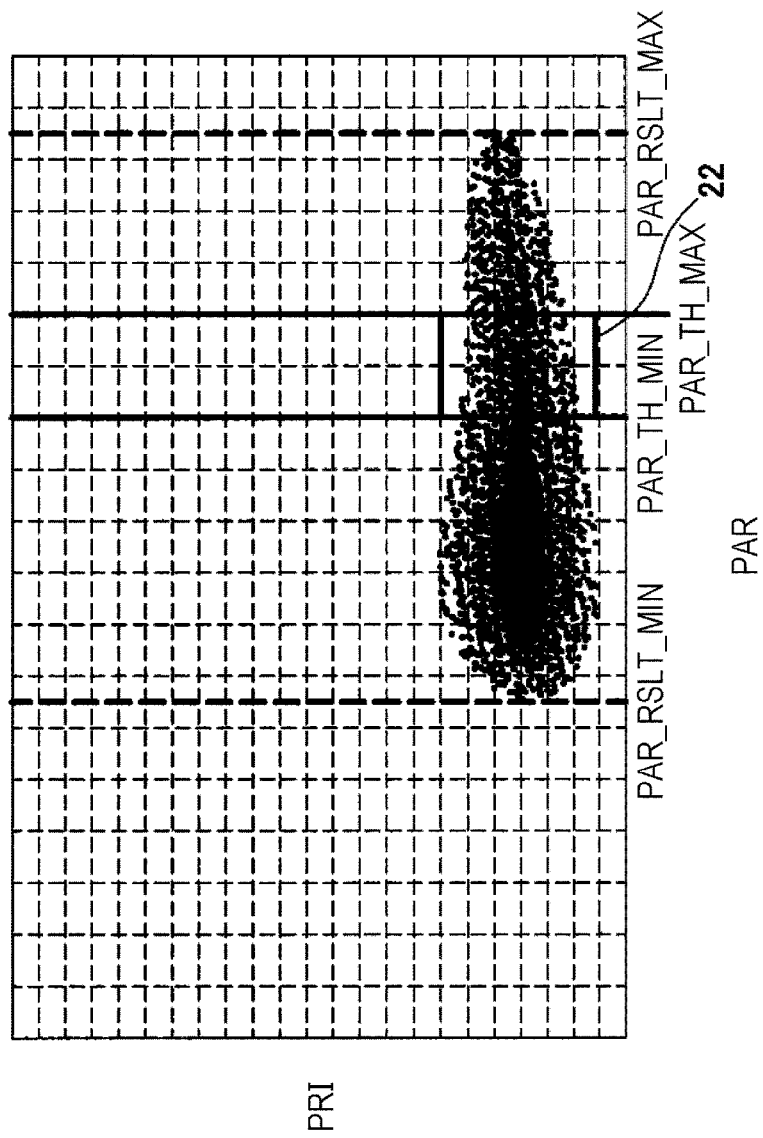
FIG. 24 is a view illustrating the relationship between the condition of the intensity (PAR) with which a leaf is irradiated and the PRI.

In addition, the analysis operation unit 151 may extract a minimum value (hereinafter, referred to as "PAR_RSLT_MIN") and a maximum value (hereinafter, referred to as "PAR_RSLT_MAX") of the PAR in data (refer to FIG. 16) in a stage in which the removal operation and the correction operation are terminated, and may input the values to Equation 4 and Equation 5 to be described below to set a constant range (range defined by PAR_TH_MIN and PAR_TH_MAX) as illustrated in FIG. 24. In addition, FIG. 24 illustrates a PRI group 22 that exists in the constant range set by Equation 4 and Equation 5. Furthermore, as can be seen from FIG. 22 to FIG. 24, in a case where the PAR is higher than PAR_TH_MIN, as the PAR becomes higher, the PRI tends to increase.

$$PAR\_TH\_MAX = PAR\_RSLT\_MAX - m(PAR\_RSLT\_MAX - PAR\_RSLT\_MIN) \quad \text{(Equation 4)}$$

m: predetermined coefficient (able to be designated by a user)

$$PAR\_TH\_MIN = PAR\_RSLT\_MIN + n(PRA\_RSLT\_MAX - PAR\_RSLT\_MIN) \quad \text{(Equation 5)}$$

n: predetermined coefficient (able to be designated by a user)

FIG. 25 illustrates a data state in a stage in which the analysis operation is terminated. In FIG. 25, the stress measurement value (third physical value) is added as the "physical value 3", and an ID (in this example, #2000) capable of identifying a stress measurement value is set to a "physical value ID3". In the example in FIG. 25, the analysis operation is performed with respect to a physical set ID #00000001, and as described above, a value of the PRI (physical value 2) is replicated as the stress measurement value (physical value 3).

Figure 26:
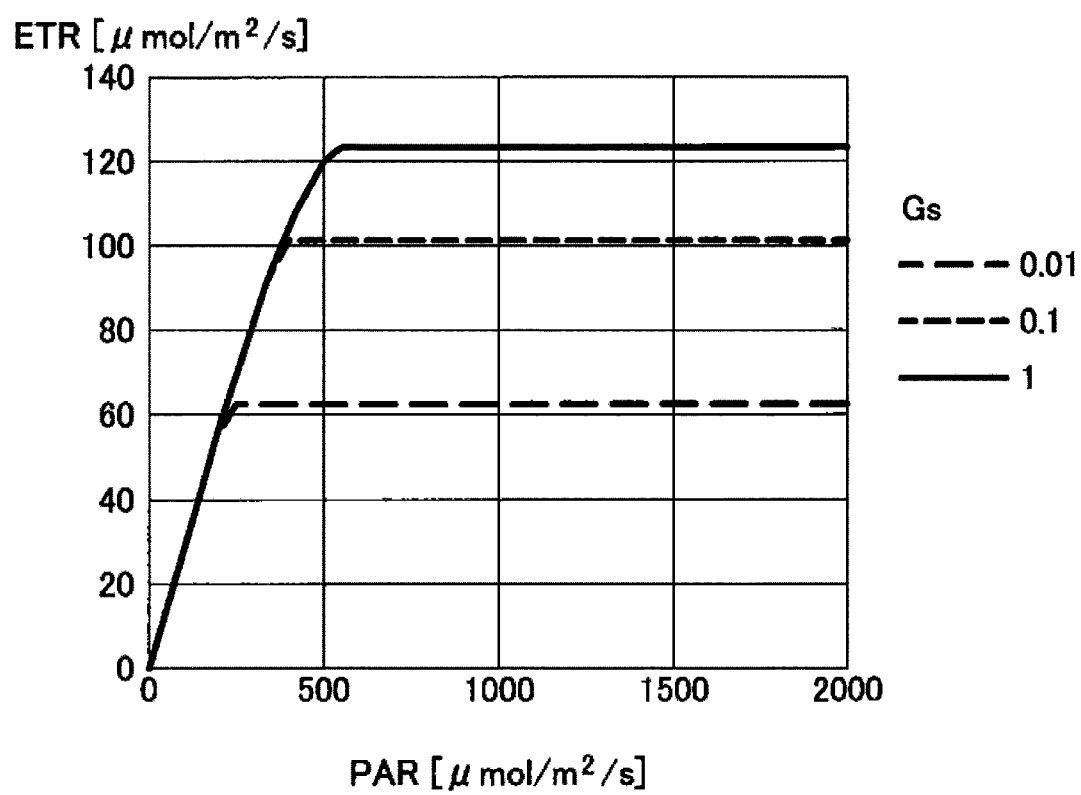
FIG. 26 is a view illustrating an example of the analysis operation.

In addition, FIG. 26 illustrates a result simulated by the analysis operation unit 151 of a relationship between the PAR and the ETR with Farquhar model for each value of pore conductance (Gs). It can be seen that the ETR is clipped in a high-PAR region in accordance with a decrease in Gs.

Figure 27:
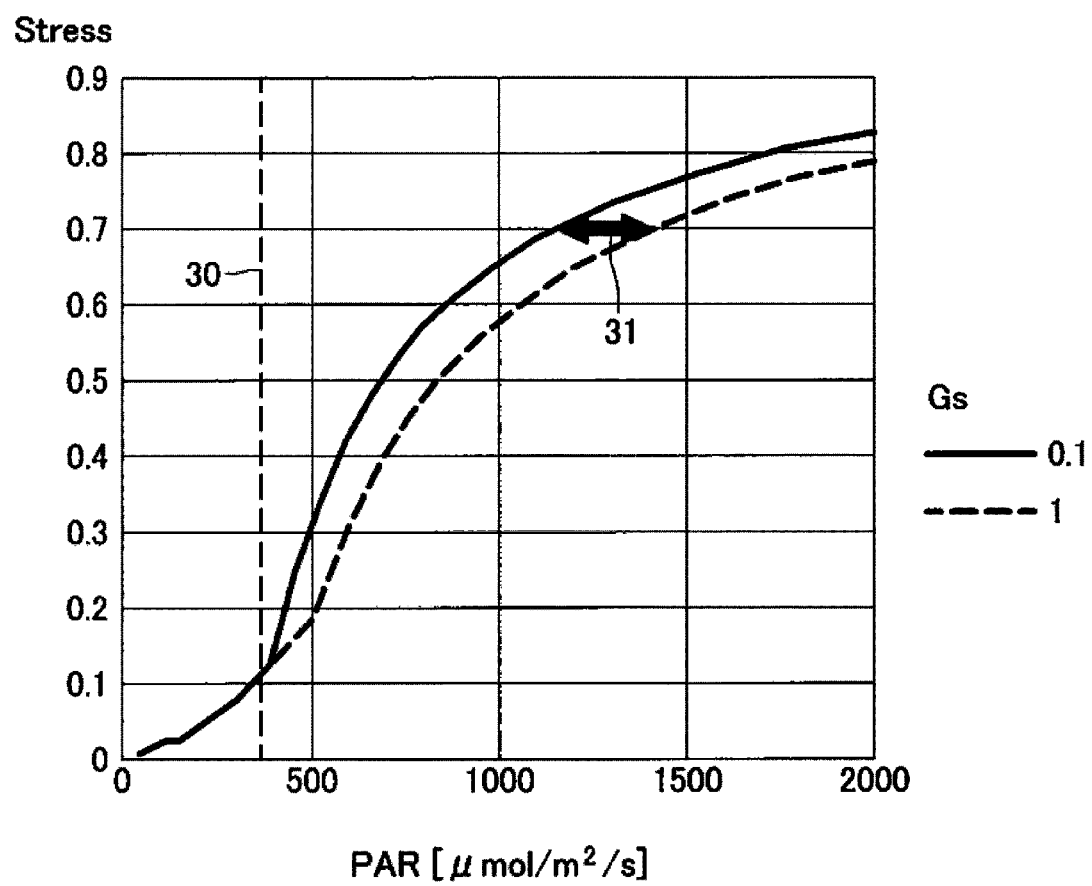
FIG. 27 is a view illustrating an example of the analysis operation.

In addition, FIG. 27 illustrates a simulation result of the amount of stress of a plant in a case where Gs is 0.1 or 1.0. Furthermore, it is assumed that the amount of stress (Stress) is defined by the following Equation 6 in a case where a photosynthesis initial gradient is set as φj.

[Math. 4]

$$\text{Stress} = \frac{\Phi_j \times PAR - ETR}{\Phi_j \times PAR} \quad \text{(Equation 6)}$$

A broken line 30 in FIG. 27 indicates a PAR at which a stress response does not occurs even in a case where Gs is 0.1 (pores are closed), and represents that it is difficult to evaluate the stress response by using the PAR even when a plant makes a stress response such as closing of the pores with respect to an environment stress such as dry of soil. On the other hand, an arrow 31 indicates a width of the PAR at which a stress response is the same between a case where Gs is 0.1 and a case where Gs is 1.0, and this represents that it is difficult to compare stress response values under a condition in which the PAR is different. When obtaining the PAR_TH_MAX and the PAR_TH_MIN, in addition to execution of the operations in Equation 4 and Equation 5, the analysis operation unit 151 may automatically calculate an optimal setting value by performing the simulation. Furthermore, the content of the analysis operation that is executed by the analysis operation unit 151 by using respective physical values is not limited to the above-described content. For example, a research of calculating the ETR by using two kinds of physical values of PRI and SIF has been conducted, but the analysis operation unit 151 may perform an operation of obtaining the ETR by obtaining the PRI and the SIF.

(Flow of Color Mapping)

Next, an example of a flow of the color mapping illustrated in step S1024 in FIG. 2 will be described with reference to FIG. 28 to FIG. 37. The color mapping unit 161 correlates at least any one of the first physical value, the second physical value, and the third physical value which are output at the previous stage to a color. The color mapping unit 161 may correlate all of the physical values (the first physical value, the second physical value, and the third physical value) to colors. In addition, hereinafter, a method in which the color mapping is performed for each classification ID will be described as an example (in this example, classification of captured image information into a left side (classification ID: #0) and a right side (classification ID: #1) is performed by the image structure analysis operation unit 133). For example, the color mapping unit 161 calculates an average value of a physical value for each classification ID and performs the color mapping in correspondence with the average value. Furthermore, the image structure analysis operation unit 133 may recognize objects (for example, plant portions or the like including leaves (an upper leaf, an intermediate leaf, a lower leaf, and the like), flowers, fruits, stems, and the like) included in the captured image information, and the classification ID may be allocated to each object. According to this, a physical value can be calculated for each object.

Figure 28:
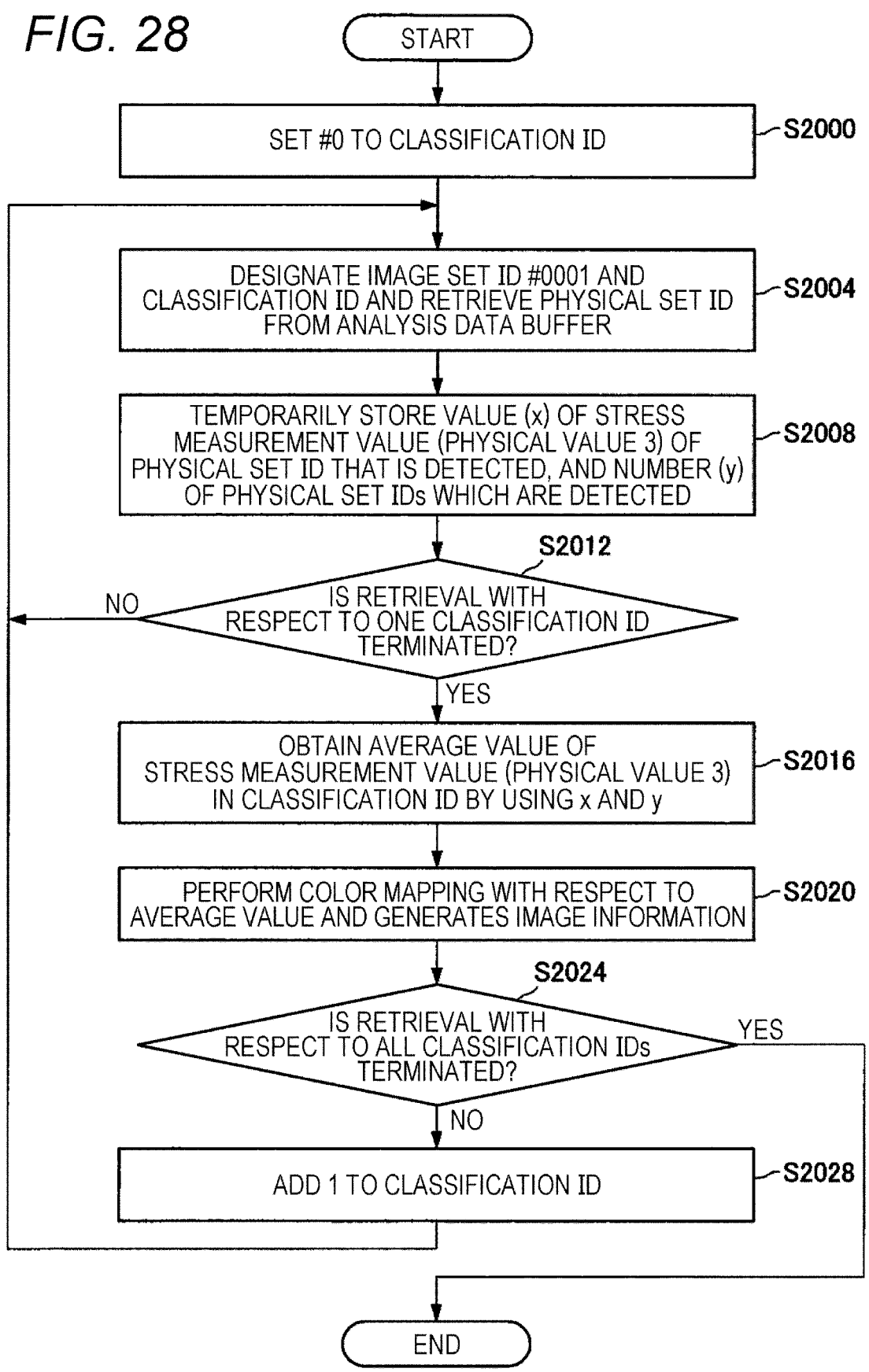
FIG. 28 is a flowchart illustrating an example of a flow of color mapping.

In step S2000 in FIG. 28, the color mapping unit 161 sets "#0 (left side)" to the classification ID. In step S2004, the color mapping unit 161 designates the image set ID #0001 and the classification ID, and retrieves the physical set ID from the analysis data buffer 153. In step S2008, the color mapping unit 161 temporarily stores a value (set as "x") of the stress measurement value (physical value 3 (third physical value)) of the physical set ID that is detected, and the number (set as "y") of physical set IDs which are detected. In addition, until retrieval with respect to one classification ID is terminated (step S2012/No), the color mapping unit 161 repetitively performs the processing in step S2004 and step S2008. In a case where retrieval with respect to one classification ID is terminated (step S2012/Yes), in step S2016, the color mapping unit 161 obtains an average value of the stress measurement value (physical value 3) in the classification ID by using x and y. More specifically, the color mapping unit 161 divides a total value of x by y to obtain an average value of the stress measurement value (physical value 3) (in other words, it can be said that the color mapping unit 161 outputs the third physical value for each classification (classified region)).

In step S2020, the color mapping unit 161 performs color mapping with respect to the average value and the image generation unit 162 generates image information on the basis of a color mapping result. Furthermore, with regard to the color mapping, a user may designate a minimum value and a maximum value (of a physical value) which correspond to each color, or a minimum value and a maximum value, which are determined in the above-described processing, of a physical value in the image set ID may be correlated to each color.

In addition, in a case where retrieval with respect to all classification IDs is not terminated (step S2024/No), in step S2028, the color mapping unit 161 adds "1" to the classification ID, and performs the processing in step S2004 to step S2024 again. In a case where retrieval with respect to all classification IDs is terminated (step S2024/Yes), a series of processing related to the color mapping is terminated.

Figure 29:
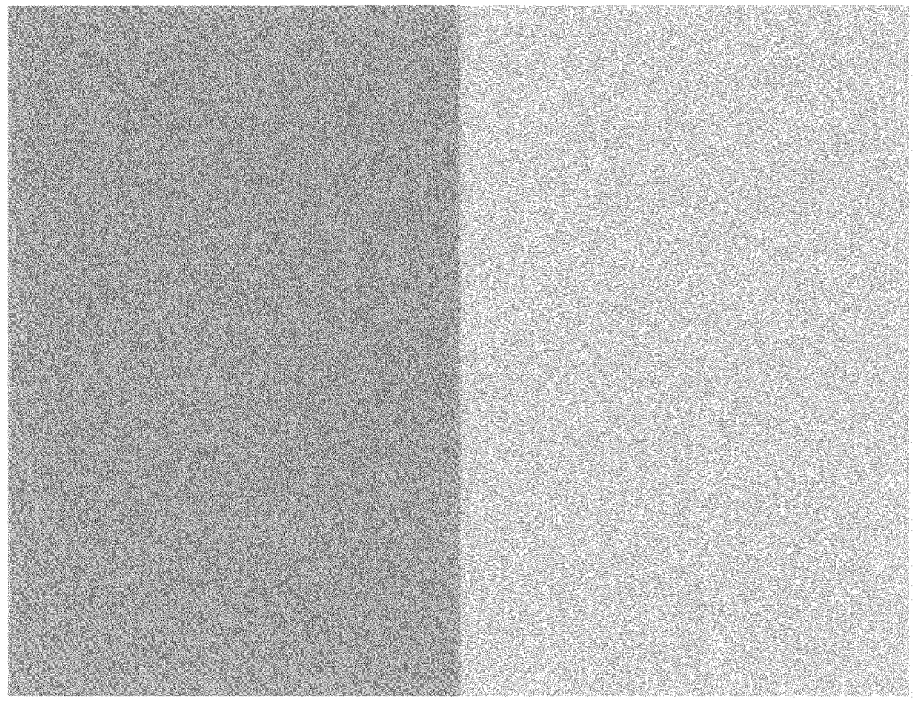
FIG. 29 is a view illustrating an example of image information that is displayed after the color mapping.

FIG. 29 to FIG. 37 illustrates an example of image information that is displayed after the color mapping. For example, FIG. 29 illustrates image information in a case where the color mapping unit 161 performs color mapping of the stress measurement value (physical value 3) to a region (a left region in screen information) corresponding to the classification ID #0 and a region (a right region in screen information) corresponding to the classification ID #1. In a case where rough accuracy and display are enough, a simplified display aspect as in FIG. 29 can be employed.

Figure 30:
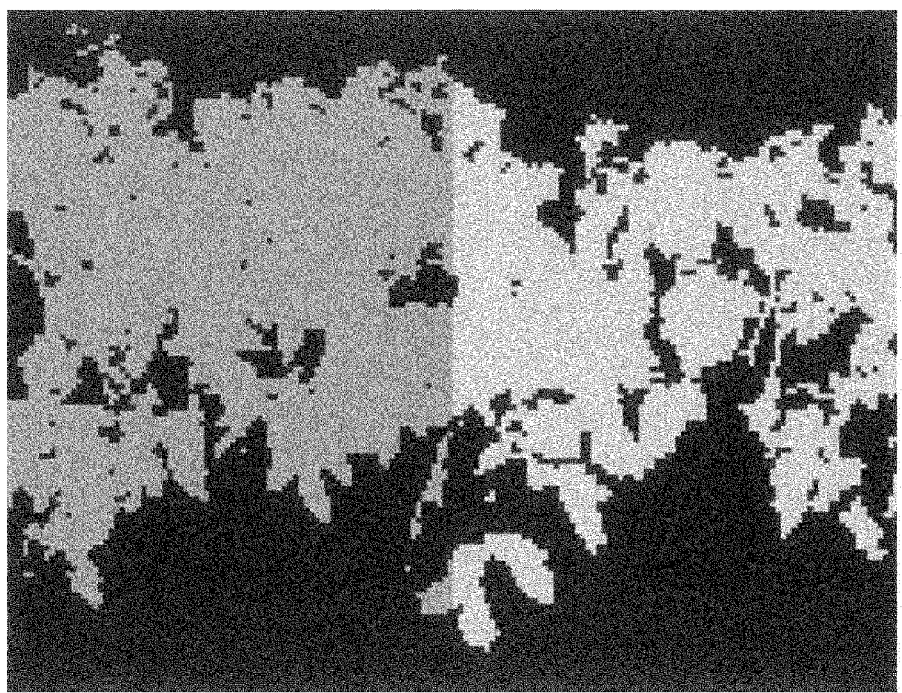
FIG. 30 is a view illustrating an example of image information that is displayed after the color mapping.

FIG. 30 illustrates image information in a case where the image generation unit 162 makes portions other than a plant be transparent and superimposes the color mapping result (the content in FIG. 29) on the resultant image. At this time, the image generation unit 162 can realize the display by reading out the NDVI image information (image ID: #002) from the structured image buffer 134, and making an image position at which the NDVI is lower than a constant value be transparent. According to this, more detailed display in comparison to FIG. 29 is realized.

Figure 31:
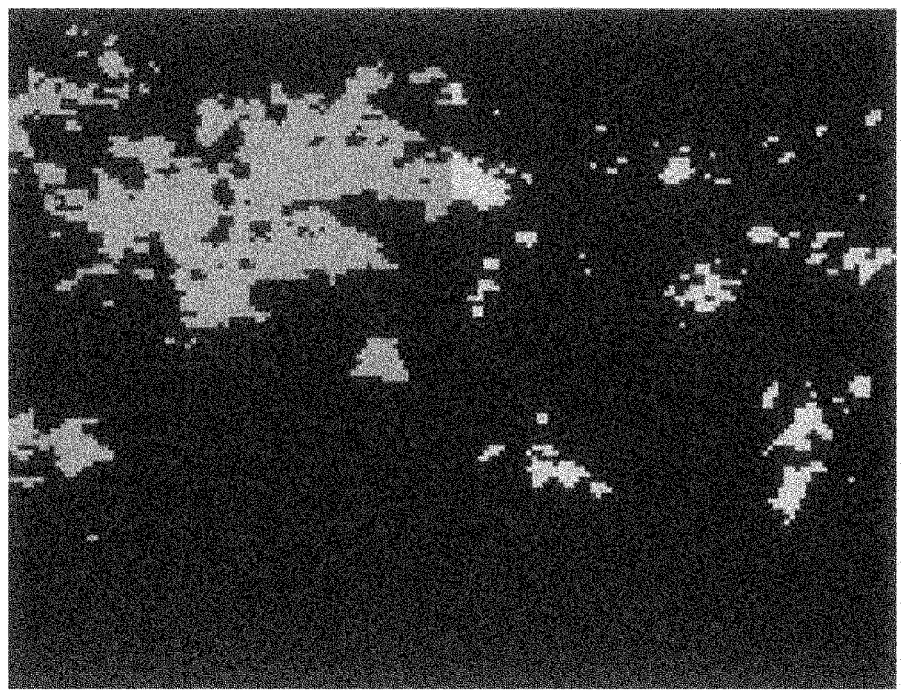
FIG. 31 is a view illustrating an example of image information that is displayed after the color mapping.

FIG. 31 illustrates image information in a case where the image generation unit 162 makes a region of an image position ID that is not detected in the retrieval processing in step S2004 in FIG. 28 (that is, a region to which the stress measurement value (physical value 3) is not set) be transparent, and superimposes the color mapping result (content in FIG. 29) on the resultant image. According to this, only a portion for which a stress reaction is evaluated (can be evaluated) is subjected to the color mapping, and thus a user can confirm the magnitude of the stress reaction that is expressed by the color in correlation with an image position (actual position).

Figure 32A:
FIG. 32A is a views illustrating an example of image information that is displayed after the color mapping.
Figure 32B:
FIG. 32B is a view illustrating an example of image information that is displayed after the color mapping.

FIG. 32A illustrates RGB image information (image ID: #001), and FIG. 32B illustrates image information obtained after the image generation unit 162 superimposes the image information in FIG. 31 on the RGB image information. According to this, the user can more easily recognize a portion of a plant in which the stress measurement value (physical value 3) is higher (or lower).

Figure 33A:
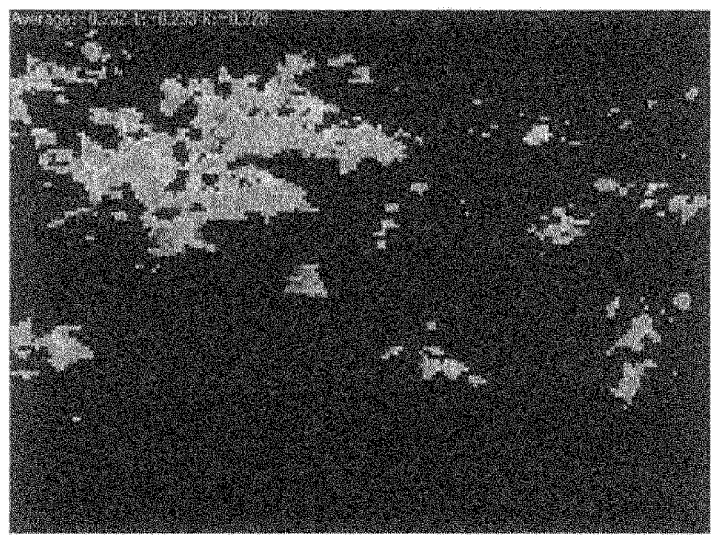
FIG. 33A is a view illustrating an example of image information that is displayed after the color mapping.
Figure 33B:
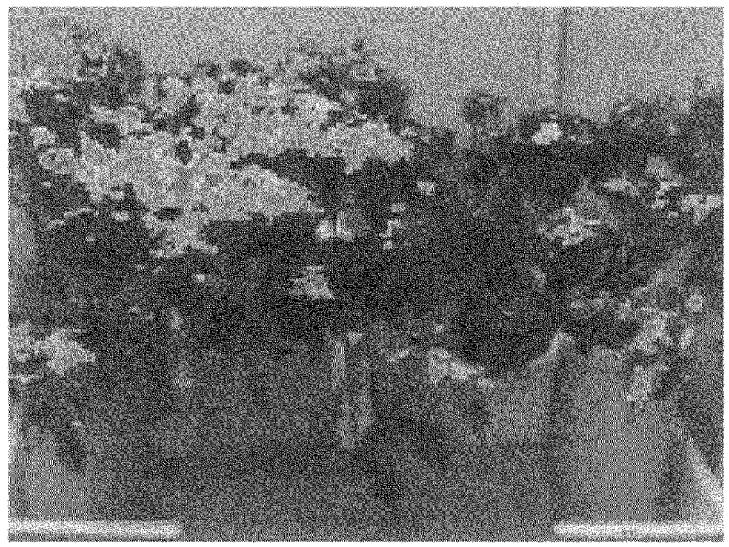
FIG. 33B is a view illustrating an example of image information that is displayed after the color mapping.

FIG. 33A illustrates image information in a case where the image position ID is actively utilized and in a case where the color mapping unit 161 performs the color mapping for each image position ID without calculating an average value of physical values for ever classification ID. In addition, FIG. 33B illustrates image information in a case where the image generation unit 162 superimposes the image information in FIG. 33A on the RGB image information.

Figure 34:
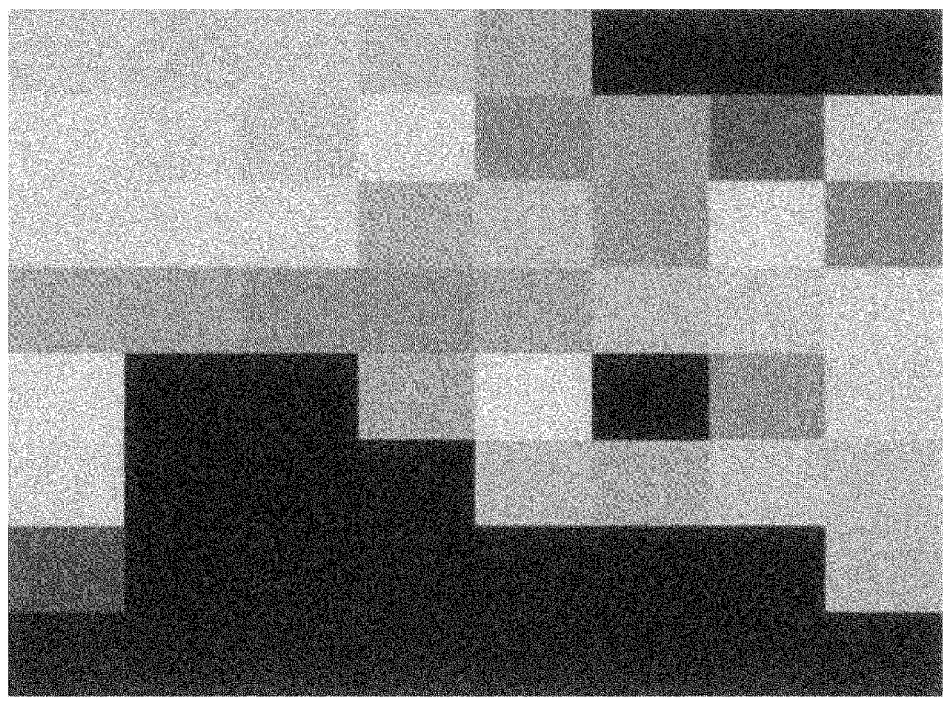
FIG. 34 is a view illustrating an example of image information that is displayed after the color mapping.

In addition, the color mapping unit 161 may calculate an average value of the stress measurement value (physical value 3) for each constant region (for example, a region that is classified in a unit of several pixels in a vertical direction and a horizontal direction in image information. Hereinafter, the region is referred to as "block") by using the image position ID without using the classification ID, and may perform the color mapping for each block. FIG. 34 illustrates an example of image information that is generated by the method. Description has been given of the gist of classifying the captured image information and allocating the classification ID by the image structure analysis operation unit 133, but the color mapping unit 161 may perform the color mapping for each block without using the classification ID (this is equivalent to a configuration in which the color mapping unit 161 classifies the captured image information for each block). The advantage of the configuration in which the color mapping unit 161 classifies the captured image information for each block is as follows. From a result of the removal operation or the analysis operation, when the number of pieces of data capable of being evaluated is very small, an image that is easy to be seen to a user may not be generated in some cases such as a case where a color mapping region is very small (for example, the color mapping region has a dot shape). In this case, when the color mapping unit 161 classifies the captured image information in an appropriate block unit in correspondence with display convenience (a unit including at least one physical value is preferable), generation of an image that is easy to be seen to a user can be realized. In the captured image information, in a case where measurement is performed with sampling, a particularly advantageous effect is obtained (there is no limitation to the case where measurement is performed with sampling).

Figure 35:
FIG. 35 is a view illustrating an example of image information that is displayed after the color mapping.

FIG. 35 illustrates image information in a case where the image generation unit 162 makes portions other than a plant be transparent, and superimposes a color mapping result (content in FIG. 34) on the resultant image. According to this, more detailed display in comparison to FIG. 34 is realized.

Figure 36:
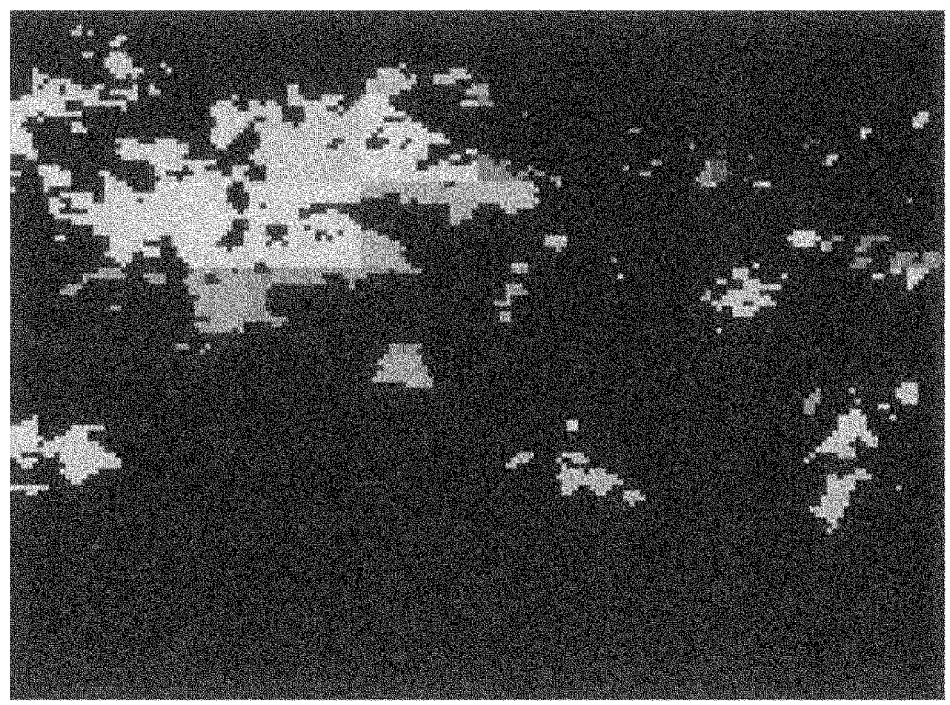
FIG. 36 is a view illustrating an example of image information that is displayed after the color mapping.

FIG. 36 illustrates image information in a case where the image generation unit 162 makes a region of an image position ID that is not detected in the retrieval processing in step S2004 in FIG. 28 (that is, a region to which the stress measurement value (physical value 3) is not set) be transparent, and superimposes the color mapping result (content in FIG. 34) on the resultant image. According to this, only a portion for which a stress reaction is evaluated (can be evaluated) is subjected to the color mapping, and thus a user can confirm the magnitude of the stress reaction that is expressed by the color in correlation with an image position (actual position).

Figure 37:
FIG. 37 is a view illustrating an example of image information that is displayed after the color mapping.

FIG. 37 illustrates image information in a case where the image generation unit 162 superimposes the color mapping result (content in FIG. 34) on the RGB image information. According to this, the user can more easily recognize a portion of a plant in which the stress measurement value (physical value 3) is higher (or lower).

With regard to the display aspects described with reference to FIG. 29 to FIG. 37, it can be said that the image generation unit 162 generates image information in which the third physical value (stress measurement value) is correlated with an original spatial position (for example, a position of a plant, and the like). Furthermore, the image generation unit 162 may generate image information in which not only the third physical value (stress measurement value) but also the first physical value or the second physical value are correlated with an original spatial position. In addition, the color mapping method and the image generation method (image synthesis method) can be flexibly combined with each other.

3. Second Embodiment

Description has been given of the first embodiment according to the present disclosure. Next, a second embodiment according to the present disclosure will be described.

An information processing apparatus 100 according to the second embodiment can perform various kinds of processing or can correct various pieces of data (for example, the leaf surface light intensity and the like) by using data acquired by various sensors or various measurement devices differently from the first embodiment. In addition, the information processing apparatus 100 according to the second embodiment performs the color mapping by using a physical value, and can also express the physical value with a graph.

(3.1. Functional Configuration Example)

First, a functional configuration example of the information processing apparatus 100 according to the second embodiment will be described with reference to FIG. 38. Furthermore, with regard to content that is redundant with the functional configuration example of the information processing apparatus 100 according to the first embodiment, description thereof will be omitted.

Figure 38:
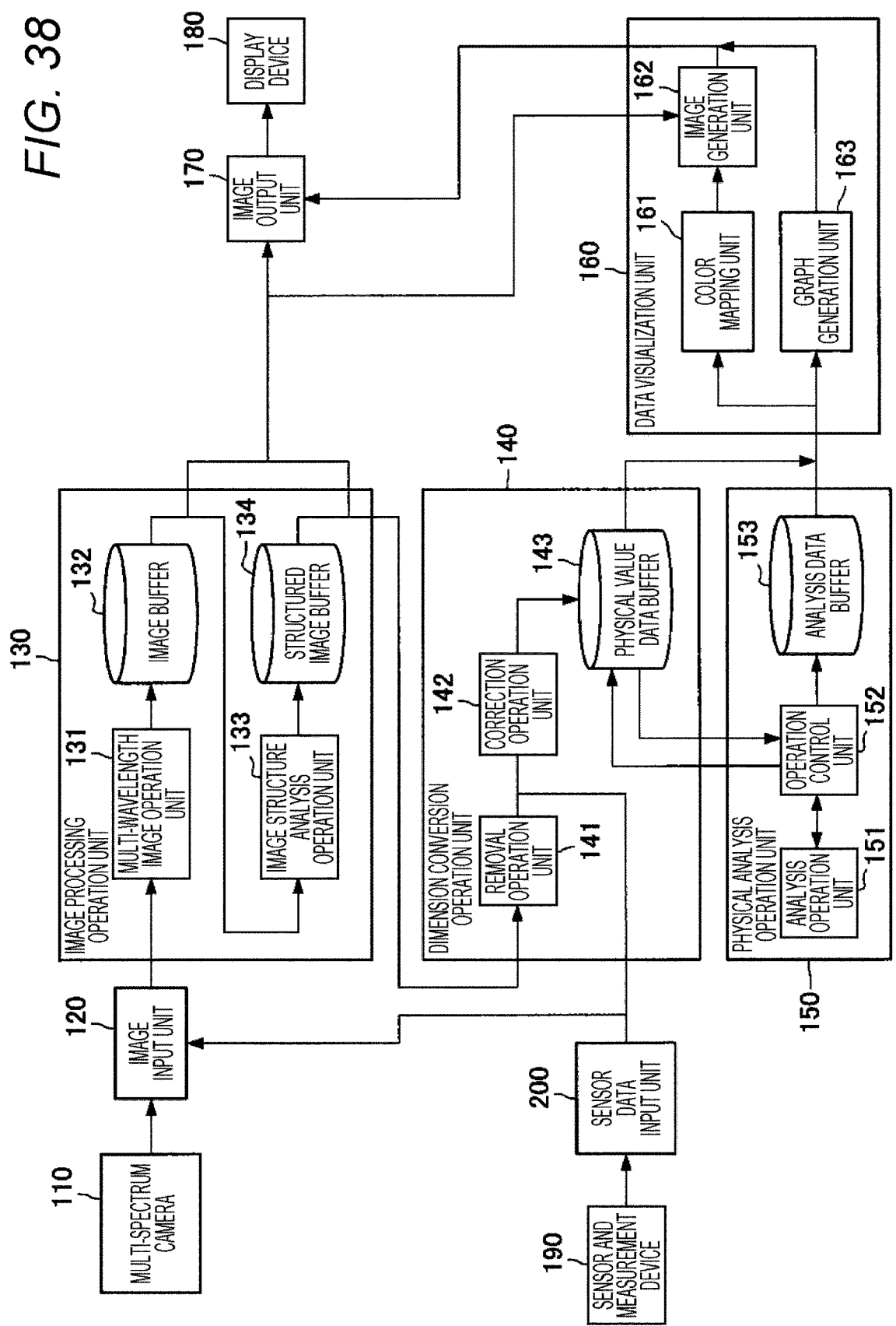
FIG. 38 is a block diagram illustrating a functional configuration example of an information processing apparatus 100 according to a second embodiment.

As illustrated in FIG. 38, the information processing apparatus 100 according to the second embodiment additionally includes a sensor and measurement device 190, a sensor data input unit 200, and a graph generation unit 163.

The sensor and measurement device 190 includes various sensors and various measurement devices and is configured to acquire various pieces of data (hereinafter, referred to as "sensor data") by using the various sensors and the various measurement devices. For example, the sensor and measurement device 190 includes an environment light sensor, a temperature sensor, a humidity sensor, a $CO_2$ concentration sensor, and the like, and acquires sensor data by using these sensors. Furthermore, the kind of the sensors and the measurement devices which are provided in the sensor and measurement device 190 is not particularly limited.

The sensor data input unit 200 is configured to function as an interface that acquires the sensor data from the sensor and measurement device 190. Furthermore, the sensor data input unit 200 may perform various kinds of processing such as filtering and conversion of the sensor data in addition to simple acquisition of the sensor data. Furthermore, the content of processing performed by the sensor data input unit 200 is not particularly limited.

A correction operation unit 142 according to the second embodiment corrects various pieces of data by using the sensor data that is input to the sensor data input unit 200. For example, the correction operation unit 142 corrects the physical value 1 (leaf surface light intensity (PAR)) by using the sensor data (sensor data relating to an environment) transmitted from an environment light sensor. According to this, accuracy of physical analysis and the like in a rear stage is improved. The correction processing of the physical value 1 (leaf surface light intensity (PAR)) will be described in detail in a rear stage.

The graph generation unit 163 is configured to visualize various physical values by using various graphs (in this embodiment, it is assumed that the graph generation unit 163 visualizes at least any one of the first physical value, the second physical value, and the third physical value by using a graph). According to this, a user can more easily understand a relationship between physical values, and the like. Furthermore, the kind of the graphs generated by the graph generation unit 163 is not particularly limited. For example, the graph generation unit 163 can generate a bent-line graph, a scatter view, and the like. Graph generation processing will be described in detail in a rear stage.

(3.2. Example of Processing Flow and Details of Processing)

Hereinbefore, the functional configuration example of the information processing apparatus 100 according to the second embodiment has been described. Next, an example of a flow of processing by respective functional configurations of the information processing apparatus 100 according to the second embodiment, and details of the processing will be described.

First, an example of a flow of the entirety of processing by the information processing apparatus 100 according to the second embodiment will be described with reference to FIG. 39. The second embodiment is different from the first embodiment in step S2116 and step S2124 in FIG. 39, and the other steps may be the same as in the first embodiment. Hereinafter, the difference between the first embodiment and the second embodiment will be described.

(Flow of Correction Operation)

Figure 39:
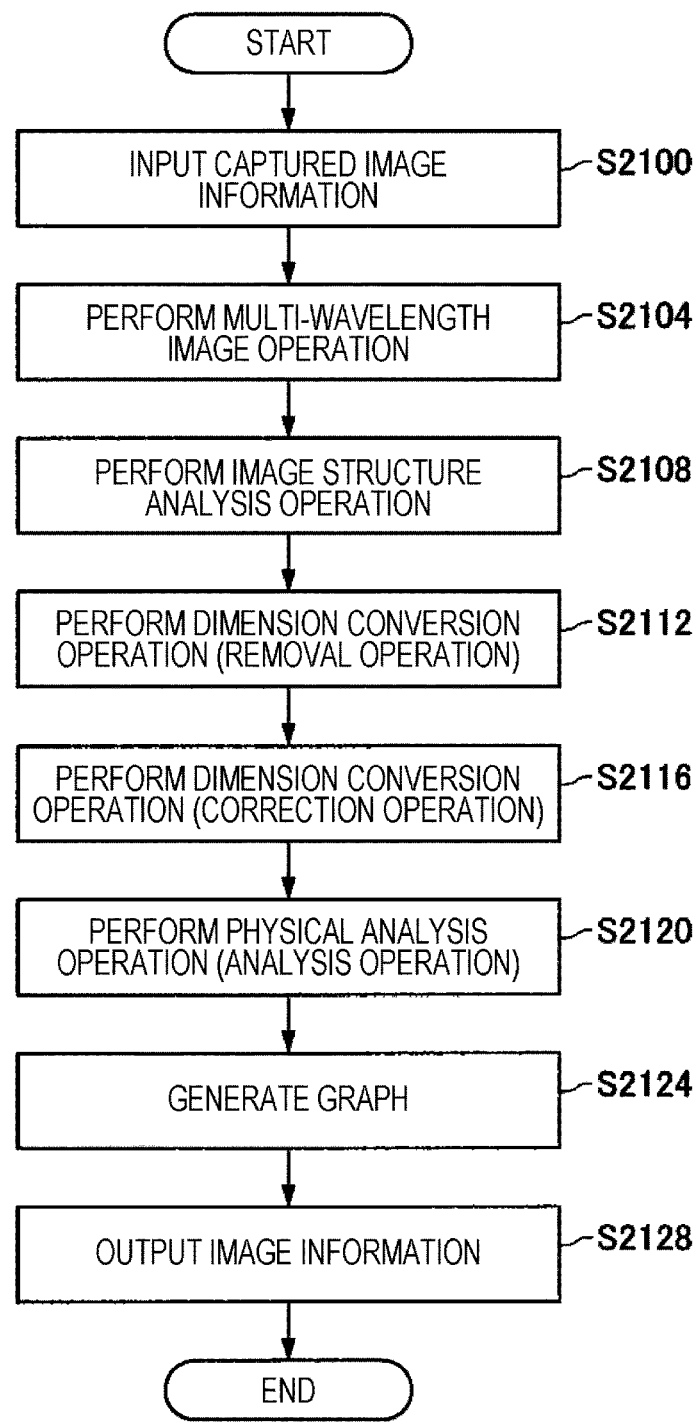
FIG. 39 is a flowchart illustrating an example of a flow of the entirety of processing by the information processing apparatus 100 according to the second embodiment.

In step S2116 in FIG. 39, the correction operation unit 142 converts the Nn value (pixel value) into the leaf surface light intensity (PAR) by using the sensor data transmitted from the environment light sensor. Here, a correction operation in a dimension conversion operation that is performed in step S2116 will be described with reference to FIG. 40.

Figure 40:
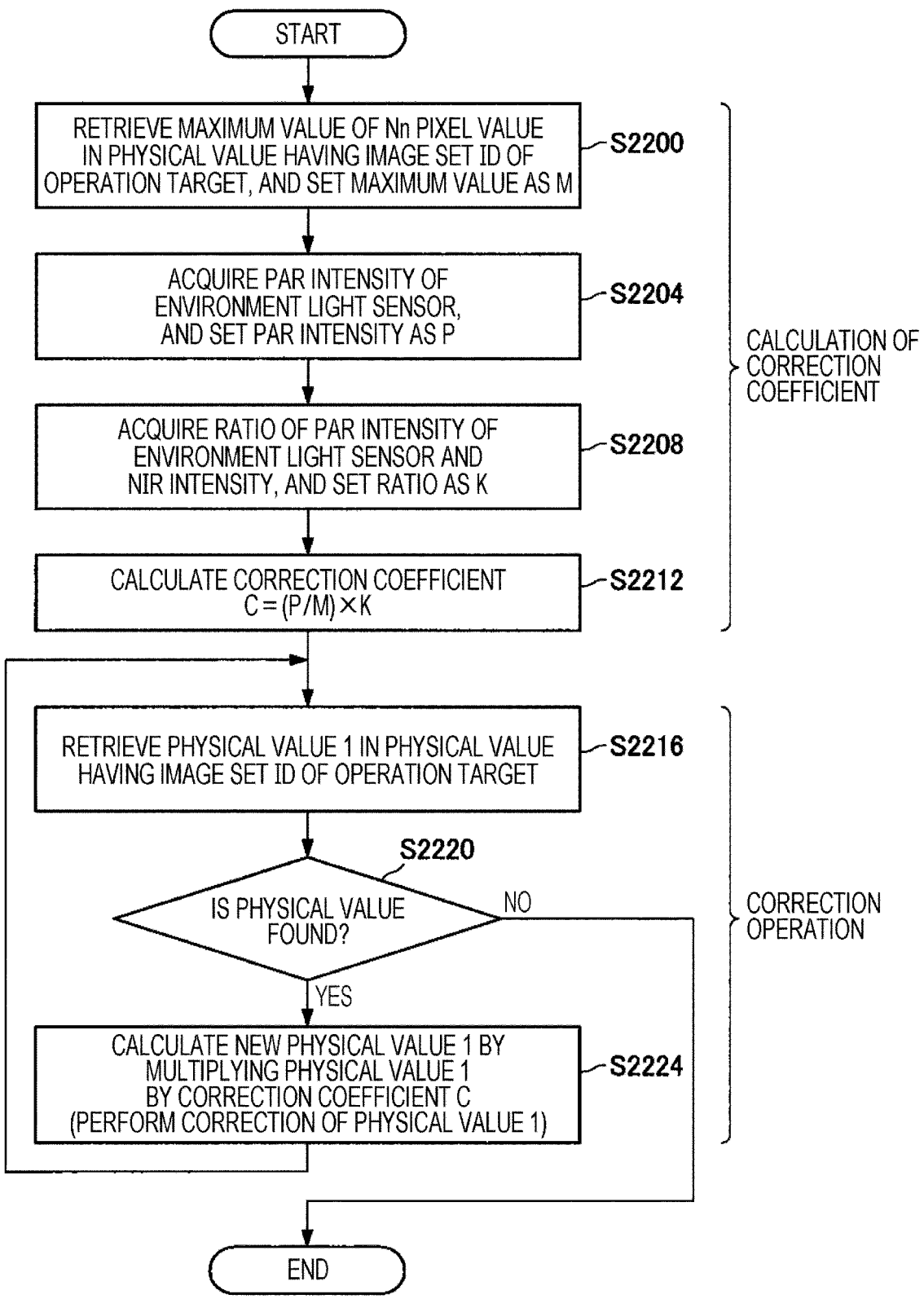
FIG. 40 is a flowchart illustrating an example of a flow of a correction operation according to the second embodiment.

In step S2200 in FIG. 40, the correction operation unit 142 retrieves a maximum value of an Nn pixel value in a physical value having an image set ID of an operation target, and sets the value as M. In step S2204, the correction operation unit 142 acquires the PAR intensity (sensor data related to an environment) of the environment sensor which is acquired by the sensor and measurement device 190 and is input to the sensor data input unit 200, and sets the value as P. In step S2208, the correction operation unit 142 acquires a ratio of the PAR intensity of the environment light sensor and the NIR intensity from the sensor and measurement device 190, or the like, and sets the value as K. In step S2212, the correction operation unit 142 calculates a correction coefficient C expressed by Equation 7.

[Math. 5]

$$C = \frac{P}{M} \times K \quad \text{(Equation 7)}$$

In step S2216, the correction operation unit 142 retrieves the physical value 1 in a physical value having an image set ID of an operation target. In addition, in a case where the physical value 1 is found (step S2220/Yes), in step S2224, the correction operation unit 142 multiplies the physical value 1 by the correction coefficient C to calculate a new physical value 1 (in other words, correction of the physical value 1 is performed by using the correction coefficient C). In a case where the physical value 1 is not found (step S2220/No), a series of correction operation is terminated.

Furthermore, although not illustrated in FIG. 40, the correction operation unit 142 may temporarily stores various pieces of sensor data in the physical value data buffer 143 for processing in a rear stage. For example, the correction operation unit 142 can temporarily store the sensor data (a kind of the first physical value) of the temperature sensor in the physical value data buffer 143. Details thereof will be described later.

FIG. 41 illustrates a data state in a stage in which the correction operation is terminated. As described above, the physical value 1 is corrected by the correction coefficient C. In addition, as described above, in FIG. 41, the sensor data (a kind of the first physical value. In this example, 20.2[° C.]) of the temperature sensor is added as the "physical value 3", and an ID (in this example, #1010) for identification of the sensor data of the temperature sensor is set to "physical ID3". Furthermore, in a case where measurement (image capturing) is performed with respect to the same target at timings at which temperature conditions are different from each other, sensor data (temperature) at the time of the measurement is reflected to the physical value 3 of each image set ID. For example, in a case where a temperature at the time of second measurement is 25.0[° C.], 25.0[° C.] is reflected to the physical value 3 of an image set ID (for example, #0002) at the time of the measurement.

(Details of Graph Generation Processing)

In step S2124 in FIG. 39, the graph generation unit 163 can generate various graphs (for example, a bent-line graph, a scatter view, and the like) by using various physical values (the first physical value, the second physical value, and the like). Furthermore, the content (kind and the like) of the graphs which are generated by the graph generation unit 163 is not particularly limited. In addition, the content (kind and the like) of the graphs which are generated by the graph generation unit 163 may be determined on the basis of an input from a user.

Figure 42:
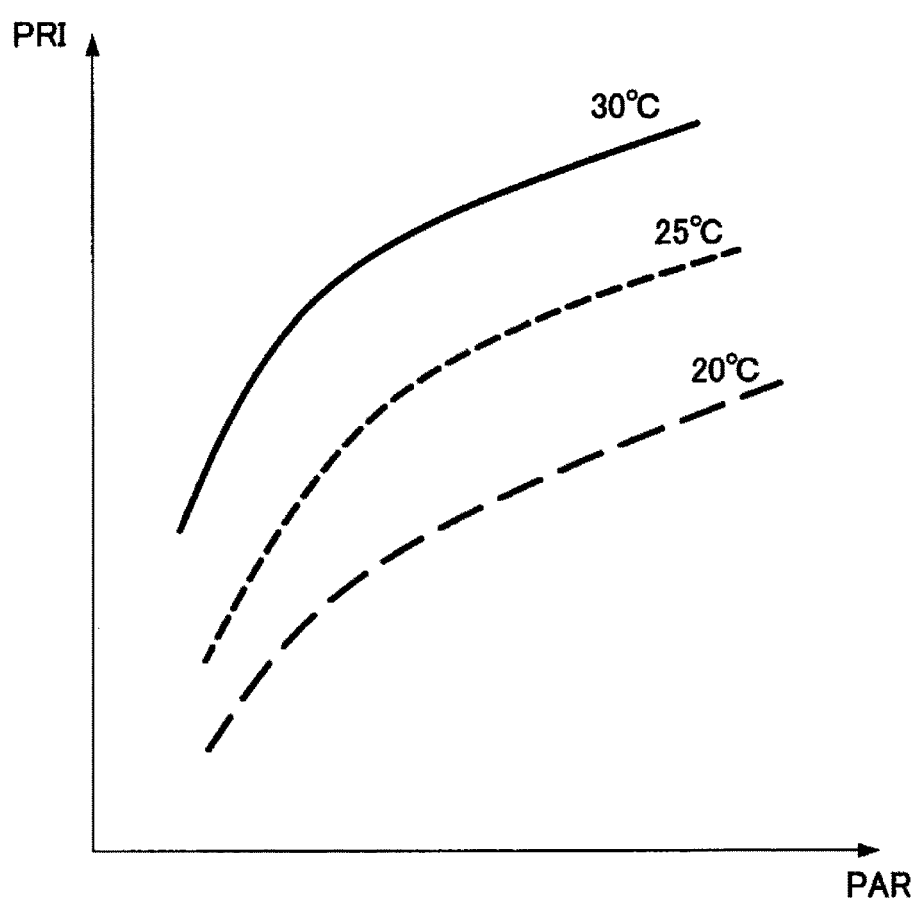
FIG. 42 is a view illustrating an example of a graph that is generated by a graph generation unit 163.

As an example of a graph that is generated by the graph generation unit 163, FIG. 42 shows a view in which physical values corresponding to a plurality of temperatures (furthermore, a kind of the first physical value because a temperature is a value corresponding to an environment, in this example, 20[° C.], 25[° C.], and 30[° C.]) are drawn as a scatter view in which the leaf surface light intensity (PAR) (the first physical value) is provided on the vertical axis and the PRI (the second physical value) is provided on the horizontal axis. Furthermore, in FIG. 42, an approximate curved line that is output on the basis of the scatter view is shown for convenience. In addition, in FIG. 42, an approximate curved line based on the PRI that is defined by Equation 2 is shown (in other words, as the stress reaction is higher, the PRI is drawn to be higher).

According to this, a user can quantitatively recognize an environment response of a plant in accordance with a temperature variation. Furthermore, in the second embodiment, the third physical value representing a state or a property of the plant may be the graph (or an approximately curved line) illustrated in FIG. 42, or the like, as an example. That is, the information processing apparatus 100 according to the second embodiment can output a graph (or an approximate curved line) (the third physical value) representing a state or a property of the plant by analyzing a relationship between the leaf surface light intensity (PAR) (the first physical value) on the vertical axis, and the PRI (second physical value).

4. Third Embodiment

Hereinbefore, the second embodiment according to the present disclosure has been described. Next, a third embodiment according to the present disclosure will be described.

An information processing apparatus 100 according to the third embodiment obtains a leaf surface light intensity (PAR)-photosynthesis rate (ETR) curve, and calculates Jmax (maximum electron transfer rate, the third physical value) by model fitting. In the related art, a gas exchange method or the like is used in measurement of the Jmax, and photosynthesis rate is measured by a physical measurement device, but in the third embodiment, the method is substituted with optical measurement.

In a case of finding a solution by the model fitting, a plurality of data sets ("environment (input)" and "response (output)") are necessary for an operation. In addition, for example, in a case where the model fitting of the data set is performed in a classification ID unit, a physical value is output for each classification ID as a result. At this time, in an experiment environment (chamber and the like), measurement is performed a plurality of times while changing an environment condition (for example, light intensity, a $CO_2$ concentration, and the like). However, in a case where image capturing by a camera is performed, the intensity of light with which a plant is irradiated for each portion is different due to an inclination of a leaf, a shadow, and the like, and thus a plurality of environments (physical values corresponding to the environments) are included in one image set. At this time, as in the first embodiment and the second embodiment, one appropriate environment (physical value corresponding to the environment) is extracted in the image set, and thus correct measurement can be realized. Hereinafter, a configuration in which a user performs measurement a plurality of times while changing an environment condition as described above is referred to as "first idea".

Figure 43:
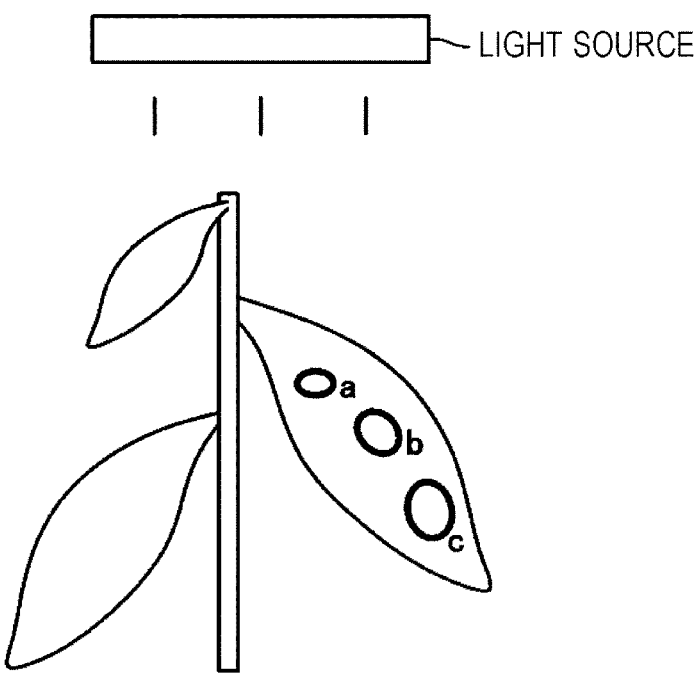
FIG. 43 is a view illustrating a third embodiment.

On the other hand, as an additional idea (hereinafter, referred to as "second idea"), in a case where image capturing by a camera is performed, the intensity of light with which a plant is irradiated for each portion is different due to an inclination of a leaf, a shadow, and the like, and thus a plurality of environments (physical values corresponding to the environments) are included in one image set. However, it is also possible to utilize this circumstance. For example, in a point a, a point b, and a point c in FIG. 43, in a case where a light beam that is emitted from a light source is set as a parallel light beam, the leaf surface light intensity (PAR) is different for each point due to a difference in an inclination of a leaf. When using the three points, it is possible to acquire a physical value set of a different environment condition even not changing the intensity of the light source.

Furthermore, an environment response of a different position is used, but it is considered that there is present a constant local homogeneity with regard to a state of a plant. The information processing apparatus 100 according to an aspect of the present disclosure includes a function of classifying the captured image information in a specific unit or into specific portions by the image structure analysis operation unit 133, and thus there is a consideration for security of the local homogeneity.

Hereinafter, the second idea, that is, a method of performing the model fitting by acquiring a plurality of environment conditions without controlling an environment condition will be described in detail as the third embodiment. In addition, the first idea may be executed.

(4.1. Functional Configuration Example)

First, a functional configuration example of the information processing apparatus 100 according to the third embodiment will be described with reference to FIG. 44. Furthermore, with regard to content that is redundant with the functional configuration example of the information processing apparatus 100 according to the first embodiment or the second embodiment, description thereof will be omitted.

Figure 44:
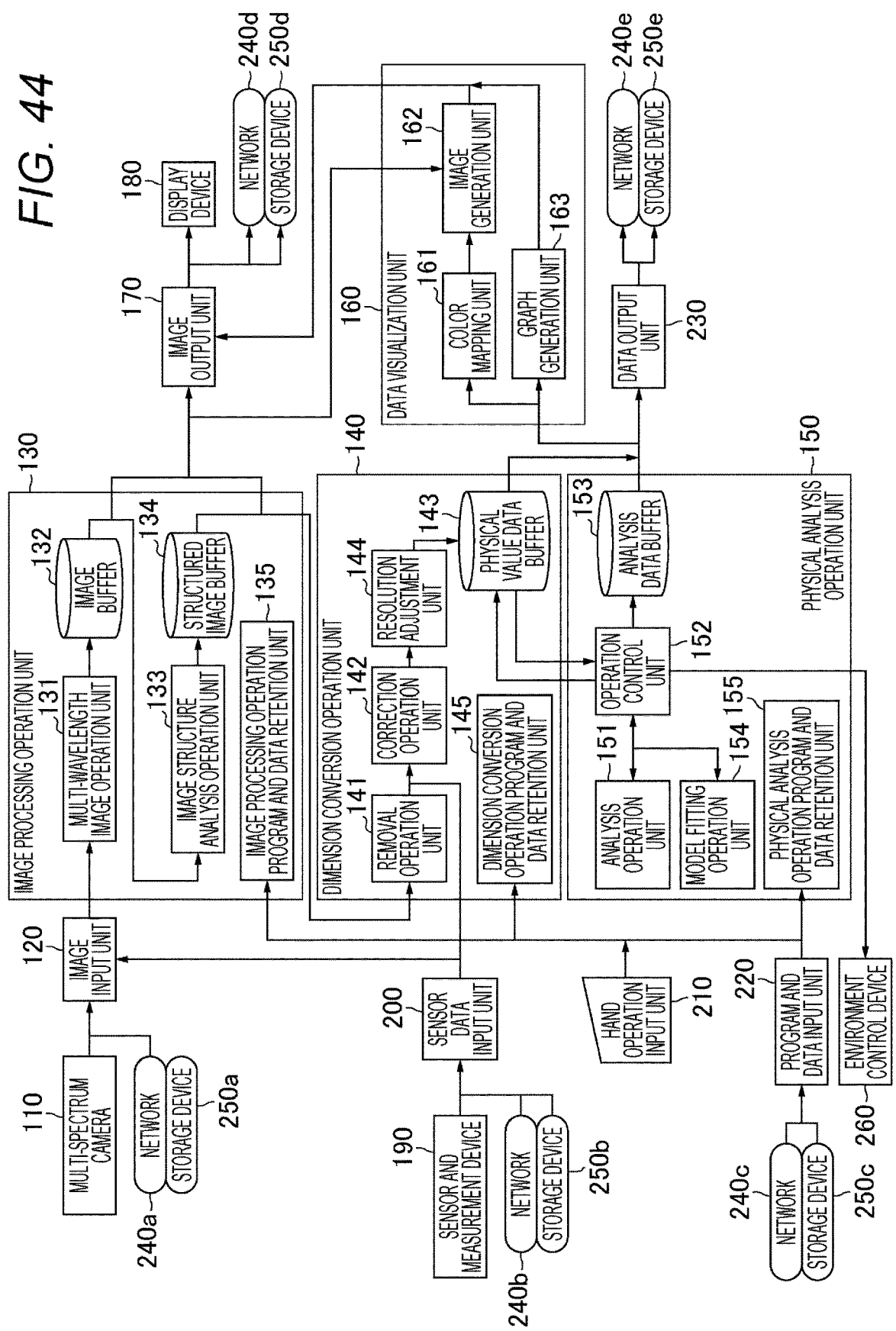
FIG. 44 is a block diagram illustrating a functional configuration example of an information processing apparatus 100 according to the third embodiment.

As illustrated in FIG. 44, the information processing apparatus 100 according to the third embodiment additionally includes a hand operation input unit 210, a program and data input unit 220, respective program and data retention units (in the drawing, an image processing operation program and data retention unit 135, a dimension conversion operation program and data retention unit 145, and a physical analysis operation program and data retention unit 155), a resolution adjustment unit 144, a model fitting operation unit 154, a data output unit 230, networks 240 (in the drawing, a network 240a to a network 240e), storage devices 250 (in the drawing, a storage device 250a to a storage device 250e), and an environment control device 260.

The hand operation input unit 210 is configured to receive an input of a program, data, and the like on the basis of a user's operation. More specifically, the hand operation input unit 210 can receive an input of various programs (including scripts), a selection wavelength band of the captured image information generated by the multi-wavelength image operation unit 131, various setting values including definition of various IDs, and the like, a physical model that is used in various operations, a parameter that constitutes the physical model, and the like on the basis of the user's operation.

The program and data input unit 220 is configured to receive an input of a program, data, and the like from an external device and the like. The content of the data that is input to the program and data input unit 220 may be similar as in the hand operation input unit 210.

The respective program and data retention units (in the drawing, the image processing operation program and data retention unit 135, the dimension conversion operation program and data retention unit 145, and the physical analysis operation program and data retention unit 155) are configured to temporarily store a program, data, and the like which are input from the hand operation input unit 210 or the program and data input unit 220.

The resolution adjustment unit 144 is configured to adjust resolution of a physical value to an appropriate value. More specifically, the resolution adjustment unit 144 can reduce the resolution of the physical value by performing calculation of an average value of a plurality of physical values included in an arbitrary range, or the like. Details of the resolution adjustment will be described later.

The model fitting operation unit 154 is configured to perform model fitting by a predetermined method. For example, the model fitting operation unit 154 calculates various parameters (for example, the third physical values and the like) by fitting a set of a plurality of physical values (for example, the first physical value, the second physical value, and the like) by a Farquhar model or the like. Details of the model fitting will be described later.

The data output unit 230 has a configuration capable of being used in a case where data is output without being imaged. The data output unit 230 outputs data stored in the analysis data buffer 153 to an external device that is connected thereto through a network 240e, or the storage device 250e.

The networks 240 are electric communication lines which connect respective configurations of the information processing apparatus 100 and an external device. In addition, the storage devices 250 are storage media which are connected to the respective configurations of the information processing apparatus 100. The various pieces of data (for example, the captured image information, the sensor data, and the like) which are used in various kinds of processing described above, programs, and the like may be provided from an external device through the networks 240, or may be provided from the storage devices 250. In addition, various pieces of data which are output by various kinds of processing may be output to external devices which are connected through the networks 240, or the storage devices 250. Furthermore, the kind of the networks 240 and the storage device 250 is not particularly limited.

The environment control device 260 is configured to control a variation of an environment condition (for example, light intensity or a $CO_2$ concentration). The environment control device 260 can cause the environment condition to vary by a user's operation, and the like. Furthermore, the environment control device 260 is used in the first idea (a case where a user performs measurement a plurality of times while changing the environment condition), but is not used in the second idea that is realized by this embodiment.

(4.2. Example of Processing Flow and Details of Processing)

Description has been given of the functional configuration example of the information processing apparatus 100 according to the third embodiment. Next, description will be given of an example of a flow of processing by respective functional configurations of the information processing apparatus 100 according to the third embodiment, or details of the processing.

First, an example of a flow of the entirety of processing by the information processing apparatus 100 according to the third embodiment will be described with reference to FIG. 45. The second embodiment is different from the third embodiment in step S2320, step S2324, and step S2336 in FIG. 45, and the other steps may be the same as in the second embodiment. Hereinafter, the difference between the second embodiment and the third embodiment will be described.

(Flow of Resolution Adjustment and Details of Processing)

Figure 45:
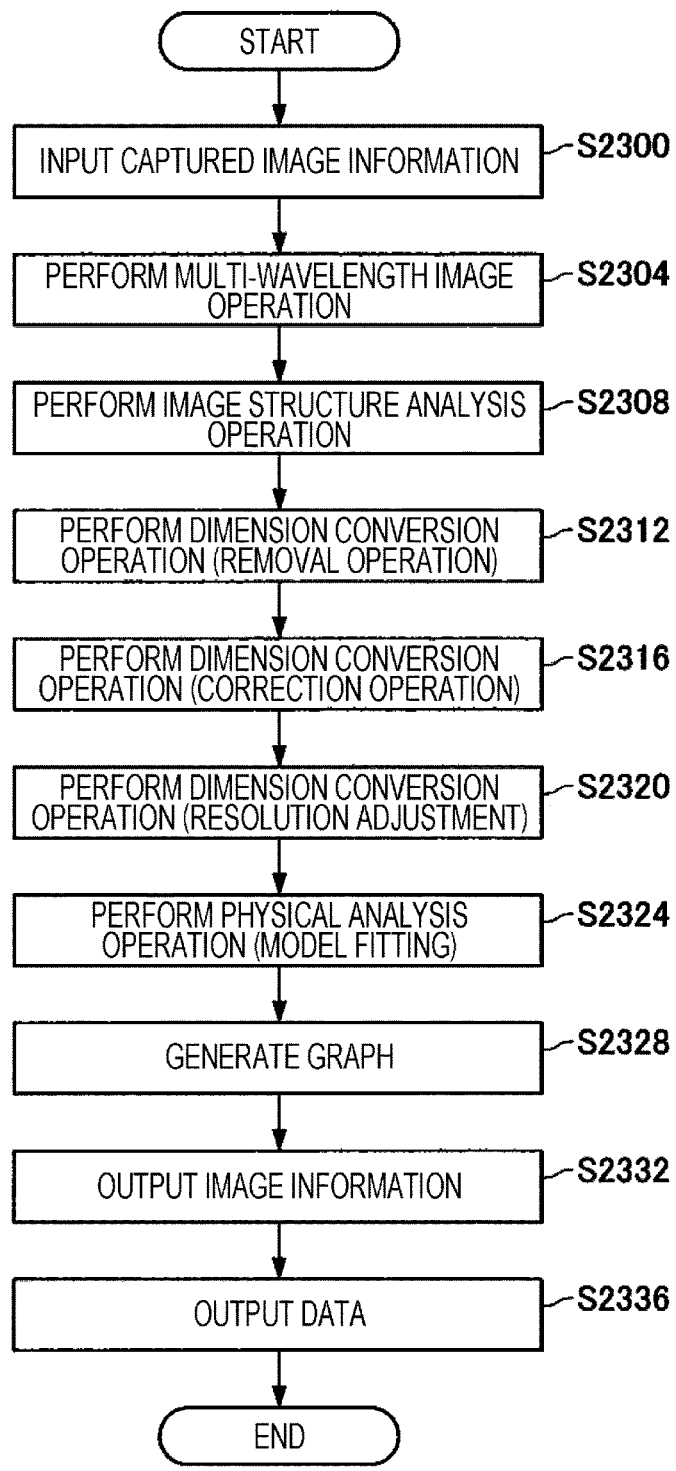
FIG. 45 is a flow chart illustrating an example of a flow of the entirety of processing by the information processing apparatus 100 according to the third embodiment.

The resolution adjustment unit 144 of the information processing apparatus 100 according to the third embodiment adjusts resolution of physical values to a more appropriate value in step S2320 in FIG. 45. Typically, multi-point data is obtained from the captured image information, and resolution is adjusted from the viewpoint of spatial resolution (for example, in image capturing processing, intentional focus blurring, or the like. A case where spatial separation is not provided between adjacent pixels is excluded), but resolution of a physical value generated through conversion of the captured image information is not appropriately adjusted.

For example, in a case where the information processing apparatus 100 calculates a physical value called the leaf surface light intensity (PAR) by using the captured image information of Nn, partial pieces of data are removed in the removal operation and the like, but a data size may be still great in some cases. For example, FIG. 46 illustrates partial pieces of data which are output to the physical value data buffer 143 in a stage in which the removal operation and the correction operation are terminated, and in the example of FIG. 46, it can be seen that the number of physical set IDs is greater than 1,700,000.

However, when considering measurement accuracy, for example, in a measurement result of the physical value 1 (leaf surface light intensity (PAR)), a different of approximately ±50 may be within a range of a measurement error, and thus it is not principally effective to handle the physical value 1 through discrimination up to a first decimal position as illustrated in FIG. 46. In addition, in a case where a data size that is handled is great, an operation amount of model fitting or the like, or storage capacity or communication capacity which is capable of being used in model fitting or data storage is tight, and thus a problem occurs. In consideration of such circumstances, the resolution adjustment unit 144 of the information processing apparatus 100 according to the third embodiment adjusts resolution of physical values to a more appropriate value.

Figure 47:
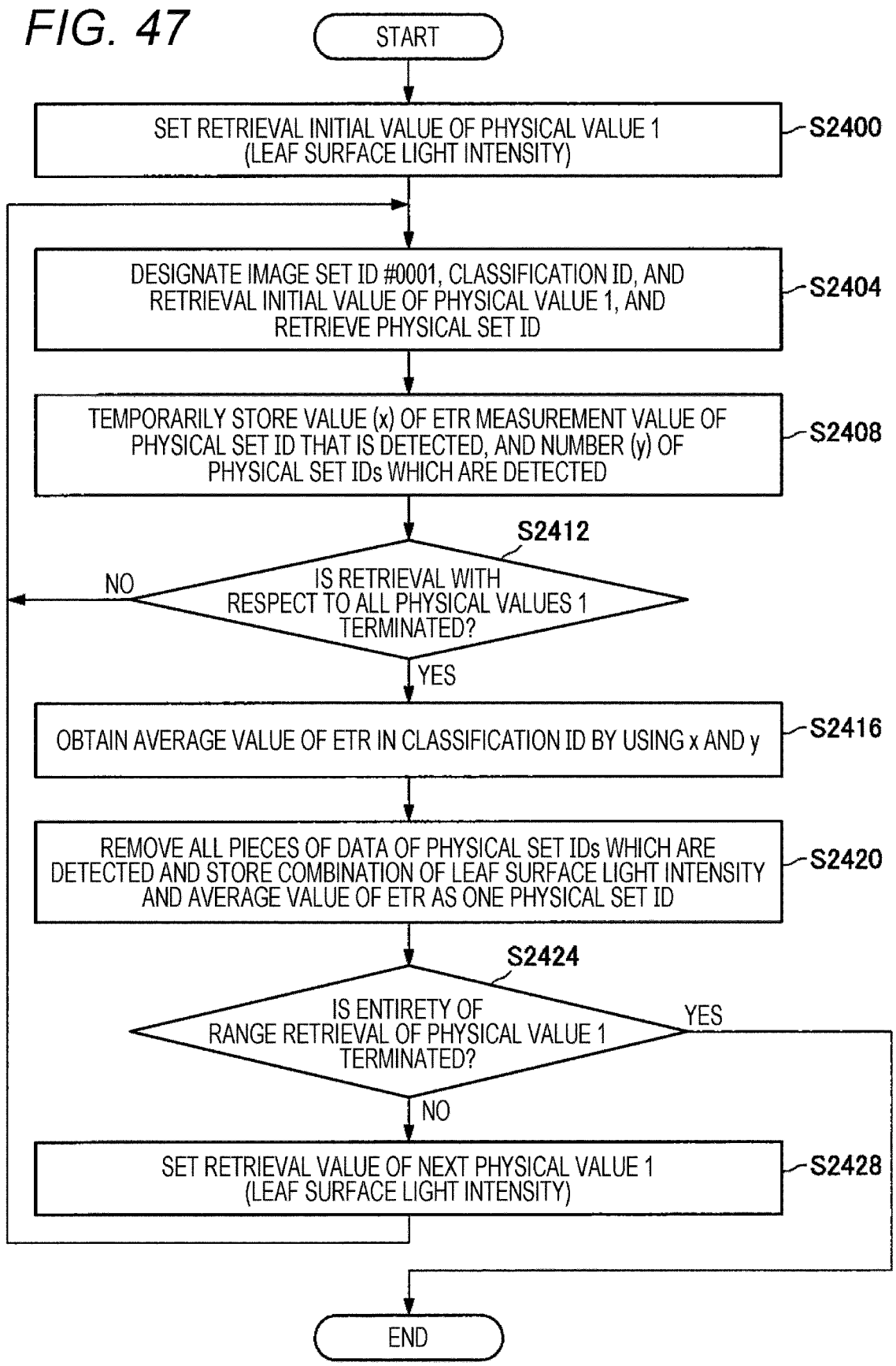
FIG. 47 is a flowchart illustrating an example of a flow of resolution adjustment.

Resolution adjustment in a dimension conversion operation that is performed in step S2320 in FIG. 45 will be described with reference to FIG. 47. FIG. 47 is a flowchart illustrating a flow of the resolution adjustment in a case where resolution of the physical value 1 (leaf surface light intensity (PAR)) is 100 [mol/m$^2$/s].

In step S2400 in FIG. 47, the resolution adjustment unit 144 sets a retrieval initial value (for example, 150 to 250) of the physical value 1 (leaf surface light intensity (PAR)). In step S2404, the resolution adjustment unit 144 designates the image set ID #0001, the classification ID, and retrieval initial value of the physical value 1, and retrieves the physical set ID.

In step S2408, a measurement value (set as x) of the ETR (physical amount corresponding to photosynthesis rate) of physical set IDs which are detected and the number (set as y) of the physical set IDs which are detected are temporarily stored. In addition, until retrieval with respect to all of a plurality of the physical values 1 is terminated (step S2412/No), the resolution adjustment unit 144 repetitively performs the processing in step S2404 and step S2408. In a case where retrieval with respect to all physical values 1 is terminated (step S2412/Yes), in step S2416, the resolution adjustment unit 144 obtains an average value of the ETR in the classification ID by using x and y. More specifically, the resolution adjustment unit 144 divides a total value of x by y to obtain the average value of the ETR.

In step S2420, the resolution adjustment unit 144 removes all pieces of data of physical set IDs which are detected, and stores a combination of the leaf surface light intensity and the average value of the ETR in the physical value data buffer 143 as one physical set ID. In addition, in a case where the entirety of range retrieval of the physical value 1 is not terminated (step S2424/No), in step S2428, the resolution adjustment unit 144 sets a retrieval value (for example, 250 to 350) of a next physical value 1 (leaf surface light intensity (PAR)), and performs the processing in step S2404 to step S2424 again. In a case where the entirety of range retrieval of the physical value 1 is terminated (step S2424/Yes), a series processing related to the resolution adjustment is terminated.

Figure 48:
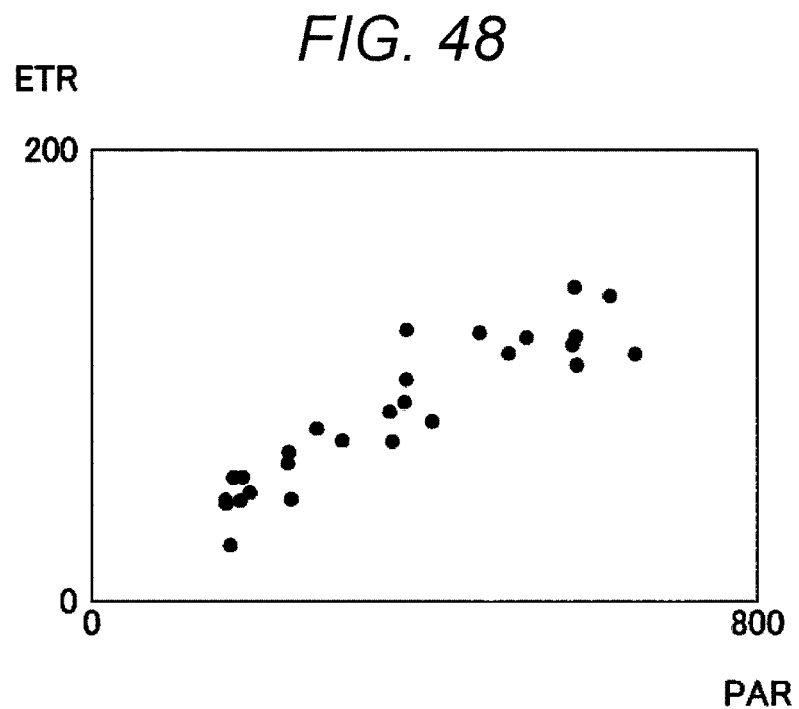
FIG. 48 is a view illustrating the resolution adjustment.
Figure 49:
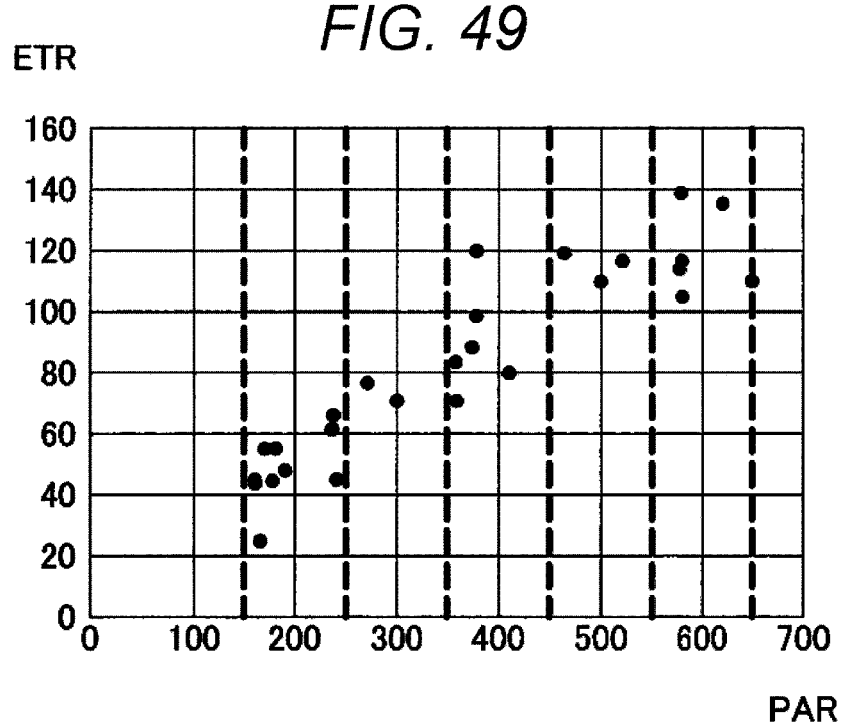
FIG. 49 is a view illustrating the resolution adjustment.
Figures 50, 51:
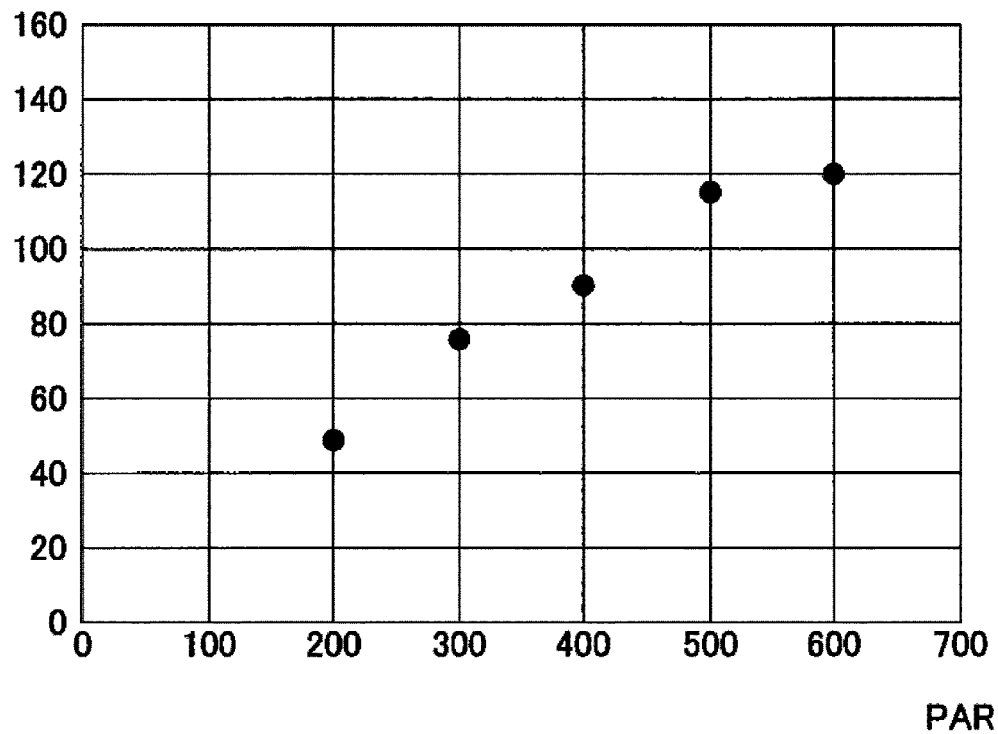
FIG. 50 is a view illustrating the resolution adjustment.
FIG. 51 is a view illustrating the resolution adjustment.

FIG. 48 illustrates a graph in which data (measurement value of the leaf surface light intensity (PAR) and the ETR) before the resolution adjustment is displayed. FIG. 49 illustrates a case where 150 to 250, 250 to 350, 350 to 450, 450 to 550, and 550 to 650 are set as a retrieval value on the basis of the resolution of the leaf surface light intensity (PAR) (100 [mol/m$^2$/s]). In addition, FIG. 50 illustrates the average value of the ETR that is calculated by the resolution adjustment unit 144 for each retrieval value. In addition, FIG. 51 illustrates a state of data that is stored in the physical value data buffer 143 after resolution adjustment (furthermore, FIG. 51 illustrates only partial pieces of data stored in the physical value data buffer 143).

With regard to the resolution adjustment described above, it can be said that the resolution adjustment unit 144 adjusts the resolution of the first physical value (PAR) and the second physical value (ETR) on the basis of the resolution (100 [mol/m$^2$/s]) of the first physical value (PAR). Furthermore, the resolution adjustment unit 144 may adjust the resolution of the first physical value and the second physical value on the basis of the resolution of the second physical value. In addition, in the above-described embodiments, as in data illustrated in FIG. 16, the color mapping unit 161 can perform color mapping on the basis of the image position ID, but in a case where the resolution adjustment is performed in this embodiment, information of the image position ID is lost. Here, in this embodiment, a management table that manages the classification ID and an image position corresponding to each classification ID in correlation with each other. According to this, in a case where the resolution adjustment of the physical values is performed, the color mapping unit 161 can specify an image position corresponding to each of the physical value on the basis of the classification ID, and thus it is possible to appropriately perform the color mapping. Here, as a format of defining a region of the classification ID, "raster (bit map)", "vector", or the like can be employed.

(Details of Model Fitting Processing)

Figure 52:
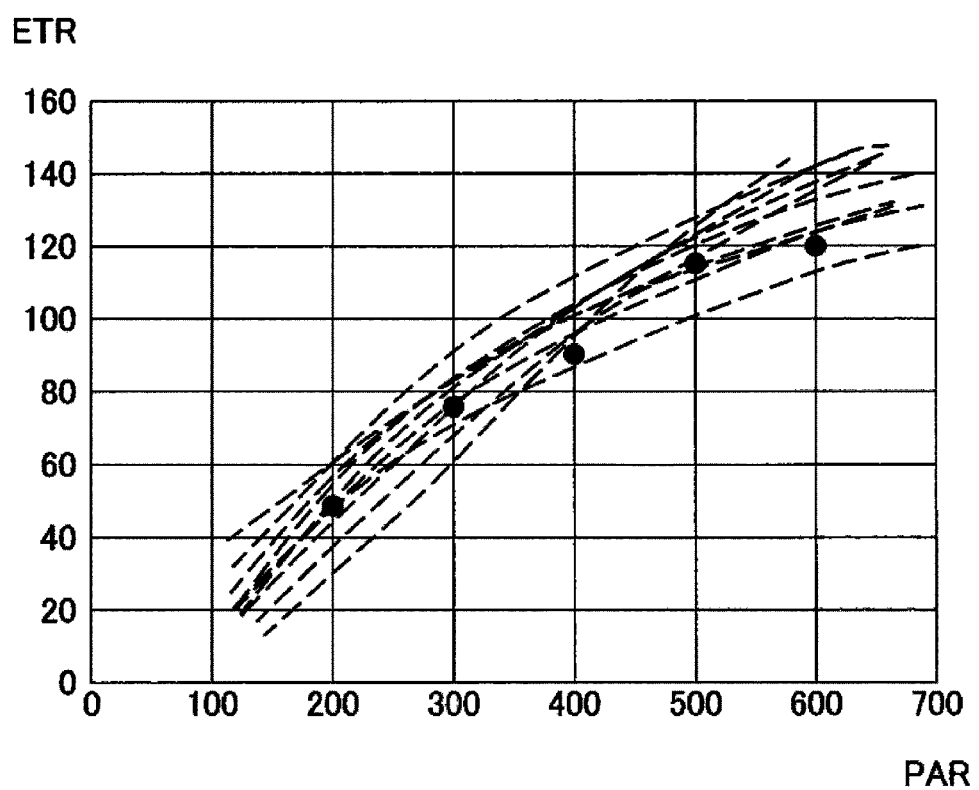
FIG. 52 is a view illustrating model fitting.

In step S2324 in FIG. 45, the model fitting operation unit 154 performs model fitting by using physical values (for example, the first physical value, the second physical value, and the like) subjected to the resolution adjustment, and outputs the third physical value. For example, the model fitting operation unit 154 fits a physical set ID #00000001 to a physical set ID #00000005 illustrated in FIG. 51 by Farquhar model to acquire φj, Jmax (maximum electron delivery rate), and θj. FIG. 52 illustrates an image of an operation in which the model fitting operation unit 154 performs a simulation of the Farquhar model expressed by the following Equation 8 while changing φj, Jmax, and θj by using a graph in which a leaf surface light intensity (PAR)-photosynthesis rate (ETR) curve is shown, and performs fitting with actual measurement data (the physical set ID #00000001 to the physical set ID #00000005). The model fitting operation unit 154 performs the model fitting by using a least square method a maximum likelihood estimation method, or the like. Furthermore, the model fitting method is not limited to the methods.

[Math. 6]

$$ETR = \frac{\Phi_j \cdot PAR + J_{max} - \sqrt{(\Phi_j \cdot PAR + J_{max})^2 - 4\Phi_j \cdot PAR \cdot J_{max} \cdot \theta_j}}{2\theta_j}$$

(Equation 8)

The Jmax calculated as described above is output from the data output unit 230, a graph showing the leaf surface light intensity (PAR)-photosynthesis rate (ETR) curve is generated by the graph generation unit 163, and the graph is output to the image output unit 170. FIG. 52 illustrates an example of a case where the model fitting of a data set is performed in a unit of the classification ID, and in this case, the physical value is calculated for each classification ID.

5. Fourth Embodiment

Description has been given of the third embodiment according to the present disclosure. Next, a fourth embodiment according to the present disclosure will be described.

The fourth embodiment according to the present disclosure, and a fifth embodiment to be described in a rear stage provide a combination of an appropriate apparatus in a case where measurement according to an aspect of the present disclosure is performed by using a UAV (a drone or the like), and the fourth embodiment relates to an information processing apparatus that is mounted on the UAV (description related to an information processing apparatus (for example, a PC, a server, and the like) provided on an outer side of the UAV will be described in the fifth embodiment).

Typically, a data size of the multi-wavelength image information generated by the multi-spectrum camera 110 is greater than that of RGB image information, and data storage capacity or communication capacity is likely to be tight. In addition, a data size of an operation result of a stress or a photosynthesis rate of a plant is small. However, when only the operation result is stored, and the original data that is used in an operation is deleted, it is difficult to subsequently perform another analysis, and thus it is lack in flexibility.

The fourth embodiment (and the fifth embodiment) has been made in consideration of such circumstances. An information processing apparatus 100 that is mounted on the UAV according to this embodiment provides a mechanism capable of realizing another analysis by subsequent processing while greatly reducing a data size by recording data in an appropriate format.

Figure 53:
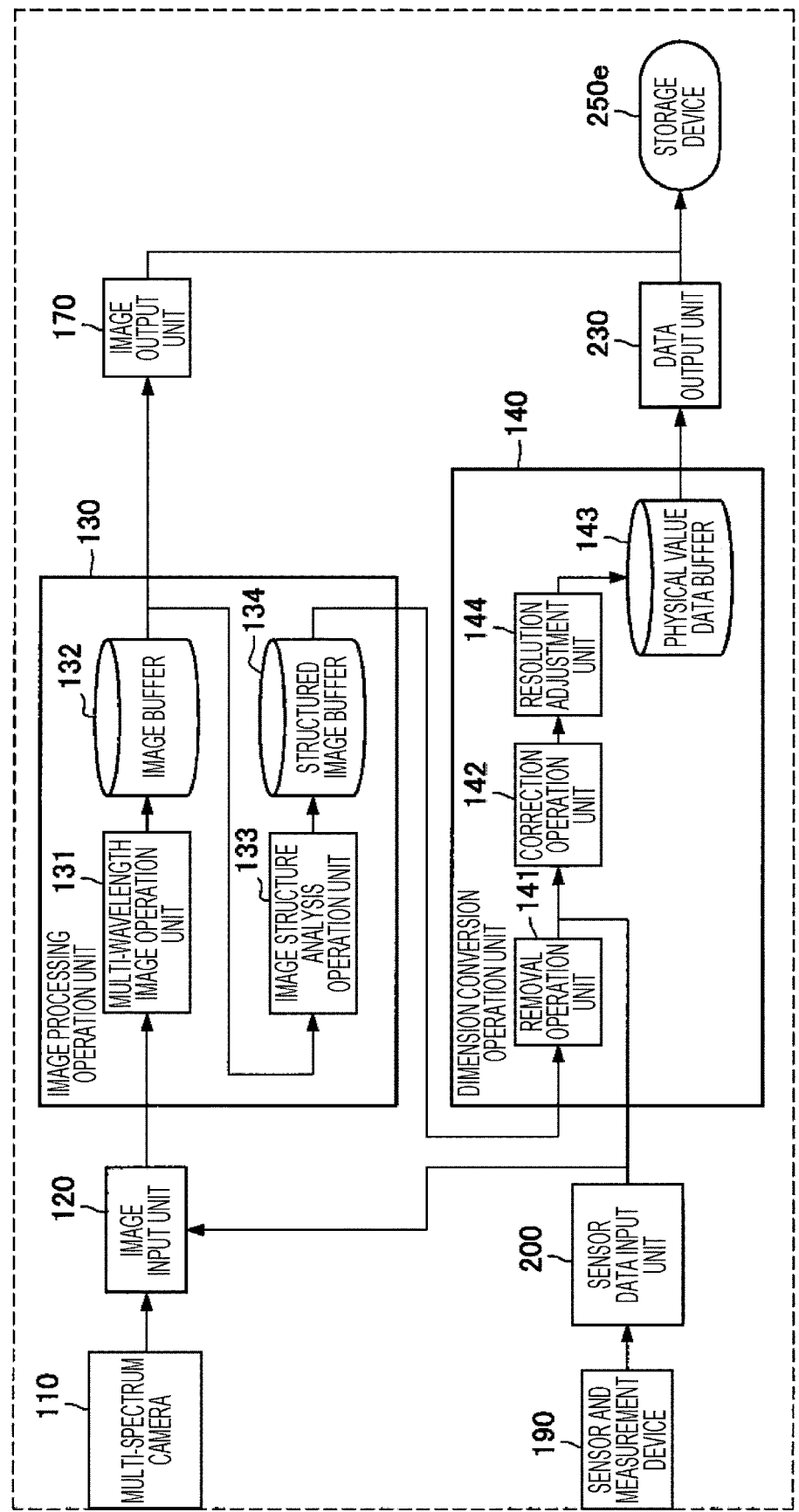
FIG. 53 is a block diagram illustrating a functional configuration example of an information processing apparatus 100 according to a fourth embodiment.

Here, a functional configuration example of the information processing apparatus 100 according to the fourth embodiment will be described with reference to FIG. 53. As illustrated in FIG. 53, the information processing apparatus 100 does not include partial configurations which are located in a rear stage in comparison to the dimension conversion operation unit 140 (for example, the physical analysis operation unit 150, the data visualization unit 160, the display device 180, and the like). Data stored in the physical value data buffer 143 is output to a storage device 250e through a data output unit 230. Then, the data output to the storage device 250e is provided to an information processing apparatus (for example, a PC, a server, and the like), and is used in processing such as a physical analysis operation and color mapping by the apparatus.

FIG. 54 is a view illustrating an example of data that is stored in the physical value data buffer 143 (in this example, the same data as in FIG. 16 is illustrated). In this manner, a physical value (the first physical value) corresponding to an environment and a physical value (the second physical value) corresponding to a response remain. Accordingly, when these pieces of data are provided, in processing by an information processing apparatus (for example, a PC, a server, and the like) in a rear stage, calculation of the third physical value indicating a state or a property of a plant, and the like can be performed.

In addition, various pieces of image information (for example, RGB image information, NDVI image information, and the like) stored in the image buffer 132 may be output to the storage device 250*e* through the image output unit 170. According to this, in processing by the information processing apparatus (for example, a PC, a server, and the like) in a rear stage, for example, output of image information obtained by synthesizing the third physical value (stress measurement value and the like) and the RGB image information, and the like can be performed.

Furthermore, functions of respective configurations of the information processing apparatus 100 according to the fourth embodiment and a processing flow may be similar to the above-described functions and processing flow, and thus detailed description thereof will be omitted. In addition, the functional configuration of the information processing apparatus 100 that is mounted on the UAV is not limited to the example illustrated in FIG. 53. For example, the information processing apparatus 100 may include a communication unit and may provide various pieces of data (for example, data illustrated in FIG. 54, various pieces of image information, and the like) to another information processing apparatus (for example, a PC, a server, and the like) in real time through communication (for example, wireless communication) that is performed through the communication unit. In addition, the information processing apparatus 100 may include a functional configuration (for example, the physical analysis operation unit 150, the data visualization unit 160, and the like) that performs rear stage processing of the dimension conversion operation, and may provide data after the physical analysis operation (the third physical value indicating a stress reaction (state) of a plant with respect to various stress factors, or the like), or generated image information to another information processing apparatus (for example, a PC, a server, and the like). In this manner, the functional configuration of the information processing apparatus 100 mounted in the UAV can be flexibly modified.

6. Fifth Embodiment

Description has been given of the fourth embodiment according to the present disclosure. Next, the fifth embodiment according to the present disclosure will be described. As described above, the fifth embodiment relates to an information processing apparatus (for example, a PC, a server, and the like) that performs processing by using data that is provided from the UAV (drone and the like) according to the fourth embodiment.

Figure 55:
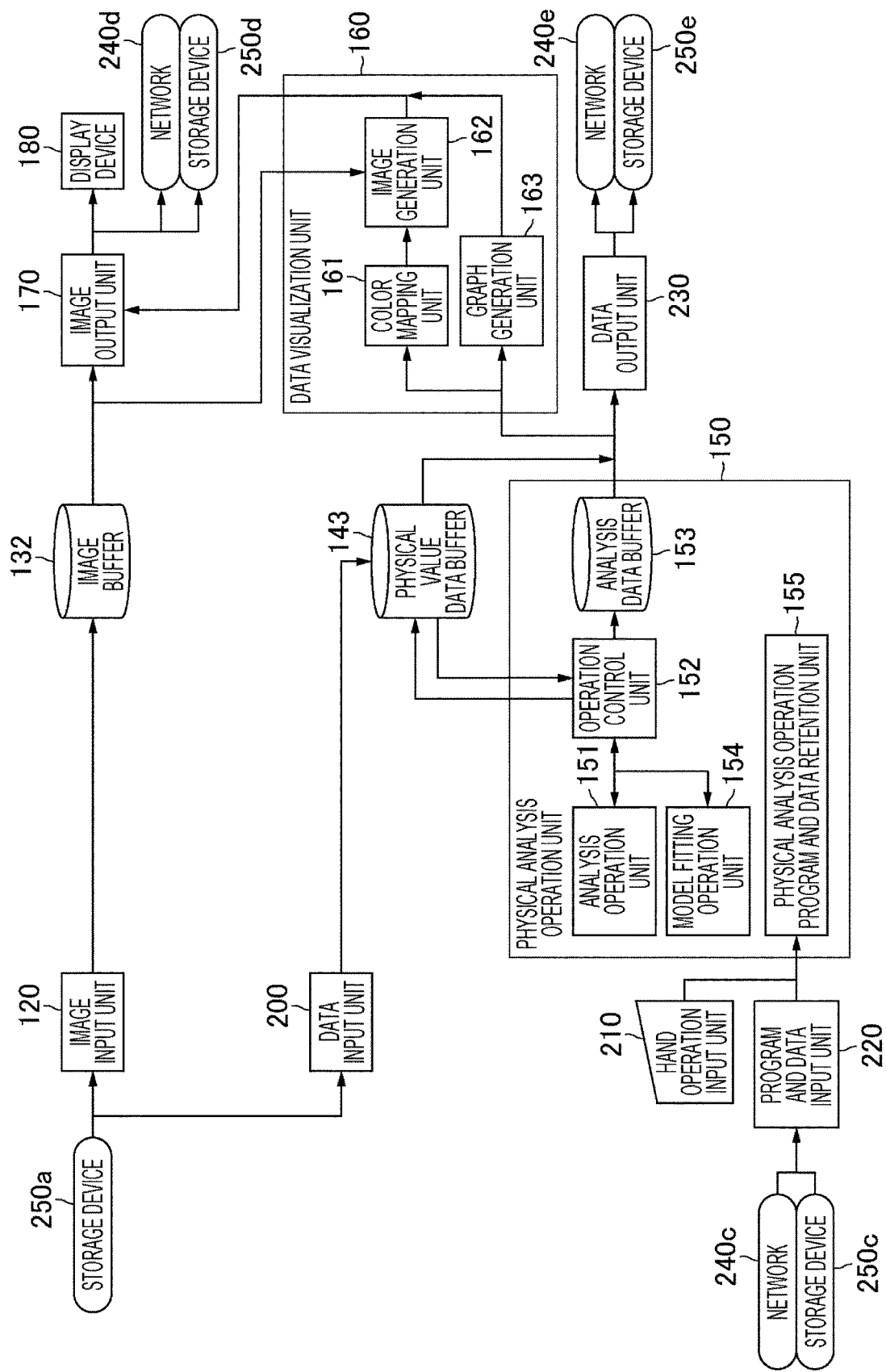
FIG. 55 is a block diagram illustrating a functional configuration example of an information processing apparatus 100 according to a fifth embodiment.

Here, a functional configuration example of an information processing apparatus 100 according to the fifth embodiment will be described with reference to FIG. 55. As illustrated in FIG. 55, the information processing apparatus 100 does not include partial configurations which are located in a front stage (for example, the multi-spectrum camera 110, a part of the image processing operation unit 130, a part of the dimension conversion operation unit 140, and the like). Data processed on the UAV side (data subjected up to the resolution adjustment, various pieces of image information (for example, RGB image information, NDVI image information, and the like), and the like) are stored in the storage device 250*a*, and are input to the information processing apparatus 100 through the image input unit 120 and the data input unit 200. Then, an analysis operation and model fitting by the physical analysis operation unit 150, color mapping or image information generation by the data visualization unit 160, image information output by the image output unit 170, and the like are performed.

Furthermore, the functional configuration of the information processing apparatus 100 (for example, a PC, a server, and the like) according to the fifth embodiment is not limited to the example illustrated in FIG. 55. For example, the information processing apparatus 100 may include a communication unit, and may receive various pieces of data from the UAV through the communication unit in real time. In addition, the information processing apparatus 100 may include a function configuration (for example, the image processing operation unit 130, the dimension conversion operation unit 140, and the like) which perform processing in a front stage of the physical analysis operation, and may perform various kinds of image processing, the dimension conversion operation, and the like (furthermore, in this case, the information processing apparatus 100 is supplied with data before the various kinds of image processing or the dimension conversion operation from the UAV). As described above, the functional configuration of the information processing apparatus 100 (for example, a PC, a server, and the like) may be flexibly modified.

7. Hardware Configuration Example

Description has been given of the fifth embodiment according to the present disclosure. Next, a hardware configuration example of the information processing apparatuses 100 according to the respective embodiments will be described with reference to FIG. 56.

Figure 56:
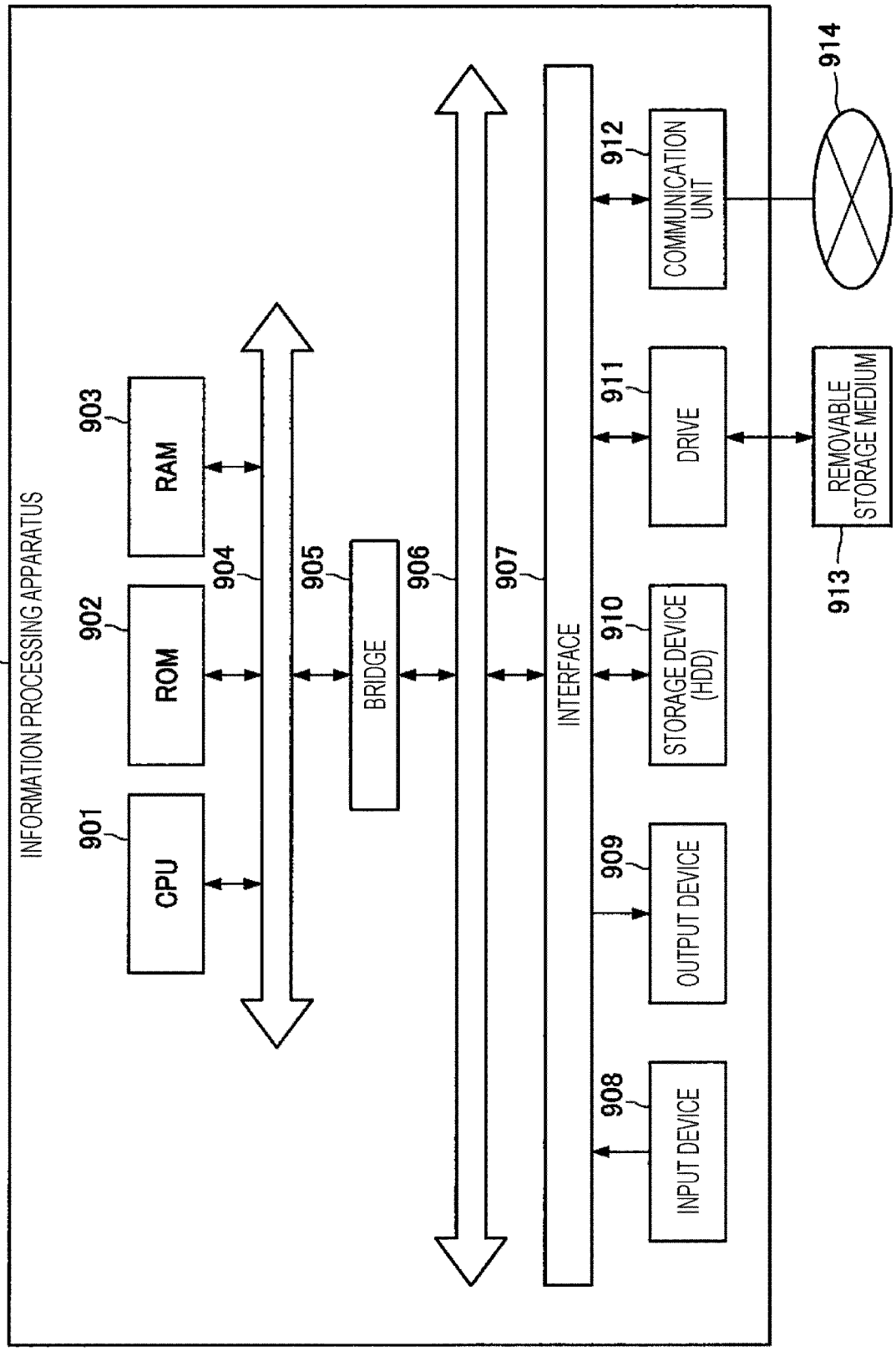
FIG. 56 is a block diagram illustrating a hardware configuration example of the information processing apparatus 100 according to each of the embodiments.

FIG. 56 is a view illustrating a hardware configuration of the information processing apparatuses 100. Each of the information processing apparatuses 100 includes a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communication device 912.

The CPU 901 functions as an operation processing device and a control device, and controls the entirety of operations in the information processing apparatus 100 in accordance with various programs. In addition, the CPU 901 may be a microprocessor. The ROM 902 stores a program and operation parameters which are used by the CPU 901, and the like. The RAM 903 temporarily stores programs in execution of the CPU 901, parameters which appropriately vary in the execution, and the like. The constituent elements are connected to each other by the host bus 904 that is constituted by a CPU bus or the like. Parts of the image processing operation unit 130, the dimension conversion operation unit 140, the physical analysis operation unit 150, and the data visualization unit 160, and the like can be embodied by cooperation of the CPU 901, the ROM 902, and the RAM 903. Furthermore, the configuration capable of embodied by the cooperation of the CPU 901, the ROM 902, and the RAM 903 is not limited thereto.

The host bus 904 is connected to the external bus 906 such as a peripheral component interconnect/interface (PCI) bus through the bridge 905. Furthermore, it is not necessary to construct the host bus 904, the bridge 905, and the external bus 906 in a separated state, and functions thereof may be embedded in one bus.

The input device 908 includes an input unit such as a mouse, a keyboard, a touch panel, a button, a microphone, a switch, and a lever which are used by a user to input information, an input control circuit that generates an input signal on the basis of an input by the user and outputs the input signal to the CPU 901, and the like. The user can input various pieces of information or can make an instruction for a processing operation by operating the input device 908. Furthermore, with regard to the input device 908, it is not necessary for an input to be made by the user. The multispectrum camera 110, the image input unit 120, the sensor and measurement device 190, the sensor data input unit 200, the hand operation input unit 210, the program and data input unit 220, the environment control device 260, and the like can be embodied by the input device 908.

For example, the output device 909 includes a display device such as a cathode ray tube (CRT) display device, a liquid crystal display (LCD) device, an organic light emitting diode (OLED) device, and a lamp. In addition, the output device 909 includes a voice output device such as a speaker and headphone. The output device 909 performs display of image information and the like. On the other hand, the voice output device performs voice output of image information (numerical value), and the like. The image output unit 170, the display device 180, the data output unit 230, and the like can be embodied by the output device 909.

The storage device 910 is a device for data storage. The storage device 910 may include a storage medium, a recording device that records data on the storage medium, a read-out device that reads out data from the storage medium, a deletion device that deletes data recorded in the storage medium, and the like. For example, the storage device 910 is constituted by a hard disk drive (HDD). The storage device 910 drives a hard disk, and stores program executed by the CPU 901, and various pieces of data. The respective buffers (for example, the structured image buffer 134 and the like), the respective retention units (for example, the image processing operation program and data retention unit 135 and the like), the respective storage devices 250, and the like can be embodied by the storage device 910.

The drive 911 is a reader/writer for a storage medium, and is embedded in the information processing apparatus 100 or is externally mounted thereto. The drive 911 reads out information that is recorded on a removable storage medium 913 such as a magnetic disk, an optical disc, a magneto-optical disc, and a semiconductor memory which are mounted, and outputs the information to the RAM 903. In addition, the drive 911 can write information on the removable storage medium 913.

For example, the communication device 912 is a communication interface that is constituted by a communication device or the like which is connected to the communication network 914. Access to the respective networks 240 is realized by the communication device 912.

8. Summary

As described above, each of the information processing apparatuses 100 according to an aspect of the present disclosure analyzes captured image information of a plant that is a measurement target to acquire a first physical value corresponding to an environment in which the plant is left, and a second physical value corresponding to a response to the environment by the plant, and stores the first physical value and the second physical value in correlation with each other. In addition, the information processing apparatus 100 performs an analysis operation by using the first physical value and the second physical value, and outputs a third physical value that directly indicates a state or a property of the plant.

According to this, the information processing apparatus 100 can measure a variation of an operating function (response) of the plant which corresponds to a variation of an environment factor in real time, and thus it is possible to early detect a problem (for example, strong light, weak light, a low humidity, a low temperature, a high humidity, a high temperature, dry of soil, an excessive humidity of the soil (anaerobic stress), occurrence of disease and inspect pest, a variation of a soil component, agricultural chemicals having an adverse effect, and the like) for which a countermeasure is not taken in time by using a vegetation index such as NDVI. In the related art, a variation of the operating function (response) of a plant is measured by performing model fitting while changing an environment in which the plant is left, for example. In contrast, the information processing apparatus 100 can measure the variation of the operating function (response) of the plant by using the captured image information that is generated by image capturing processing performed once, and thus it is possible to greatly shorten time necessary for a measurement device side. That is, it should be understood that the "real time" represents a concept having an interval that approximately corresponds to a time necessary for analysis processing of the captured image information after the image capturing processing performed once. Aerial image capturing by the UAV demands significant effort or time, and thus it may be difficult to perform aerial image capturing at a desired timing (desired environment) depending on an influence such as weather, and thus it is not appropriate to perform the aerial image capturing many times. On the other hand, the information processing apparatus 100 can perform measurement in real time. Accordingly, for example, a person who performs the measurement can obtain a measurement result during flight of the UAV, and thus it is not necessary to perform the aerial image capturing many times.

From the different viewpoint, the information processing apparatus 100 can efficiently recognize a situation in which a problem does not occur through measurement in real time. More specifically, the photosynthesis rate becomes the maximum when all conditions (all conditions which have an effect on the photosynthesis rate) are simultaneously satisfied (AND condition). Accordingly, when the photosynthesis rate measured shows a normal value, the information processing apparatus 100 can recognizes that a problem for which a countermeasure is demanded does not occur. In other words, the photosynthesis rate has a sufficient condition with respect to nonoccurrence of a problem, and thus in a case where a measured photosynthesis rate is a normal value, it can be said that a problem does not occur. On the other hand, static information related to a plant called a structure and a component such as the NDVI is not a necessary condition with respect to non-occurrence of a problem, and thus it is difficult to perform the above-described analysis by the NDVI and the like.

In addition, from the different viewpoint, the information processing apparatus 100 can appropriately perform analysis for the cause of a problem through real-time measurement. More specifically, when the information processing apparatus 100 can recognize a state (symptom) of a plant in real time, there is a high possibility that the cause for occurrence of a problem also occurs during the recognition, and thus there is a high possibility that the cause is specified. In addition, a user can assume the cause for a problem (for example, a decrease in irrigation, and the like) on the basis of an output from the information processing apparatus 100, and can perform verification by immediately confirming whether or not a problem is solved through re-measurement after taking a countermeasure (for example, addition of irrigation and the like). In addition, in a case where the content of a problem or the degree thereof varies due to a variation of an environment that does not conform to an artificial countermeasure taken by the user (for example, a case where a problem of a low temperature is naturally resolved when a temperature rises, or the like), but even in this case, the user can estimate the cause for a problem on the basis of an output from the information processing apparatus 100. For example, when the information processing apparatus 100 performs measurement at a timing before or after variation of the content of the problem or the degree thereof, the user can estimate the cause for the problem on the basis of a variation of a measurement result, and a situation that occurs at a timing at which the variation occurs (for example, the user can perform estimation of the cause for the problem on the basis of a weather condition at a timing at which the variation of the measurement result occurs, and the like). On the other hand, in a case where cause analysis is performed by using NDVI and the like, a problem is detected after several days from a time at which the problem occurs, and thus it is difficult for the user to perform the above-described verification and the like in accordance with a variation of an environment condition such as a weather condition.

In addition, for example, in irrigation control of a large-sized farm field in the related art, a necessary irrigation amount is calculated by estimating an evaporation speed from a weather condition, a size of a plant, or the like, but sufficient accuracy is not realized in many cases due to the cause such as a difference in estimation accuracy of the evaporation speed, a difference in soil of farm field and a characteristic in each location. In addition, a countermeasure which measures the evaporation amount from a leaf is also taken by using a thermal imaging technology, but heat transfer is susceptible to a wind or a temperature, and thus measurement of the evaporation amount using the thermal imaging technology is not put into practical use yet. Here, using the information processing apparatus 100 as described above, in a case where a cycle of measurement of the operating function (response) of a plant, detection of a problem, a countermeasure (control), and verification of an effect with respect to the countermeasure can be repeated, automation of farm field management becomes possible, and thus the irrigation control of the farm field, and the like can be more effectively realized.

Hereinbefore, preferred embodiments of the present disclosure have been described in detail with reference to the accompanying drawings, but the technical range of the present disclosure is not limited to the examples. It is apparent that those skilled in the art of the present disclosure can conceive various modification examples or variation examples within a range of the technical sprit described in the appended claim, and thus it should be understood that the modification examples and the variation examples pertain to the technical range of the present disclosure.

In addition, the effects described in this specification are illustrative only, and are not limited. That is, the technology according to the present disclosure can obtain other effects which are apparent for those skilled in the art from description of this specification in combination of the above-described effect or instead of the effects.

Furthermore, the following configurations also pertain to the technical range of the present disclosure.

(1)
An information processing apparatus including:
an operation unit that analyzes captured image information of a measurement target to acquire a first physical value corresponding to an environment in which the measurement target is left, and a second physical value corresponding to a response to the environment by the measurement target; and
a storage unit that stores the first physical value and the second physical value in correlation with each other.

(2)
The information processing apparatus according to (1), in which the operation unit acquires the first physical value and the second physical value by performing analysis in a two-dimensional direction in a planar space of the captured image information.

(3)
The information processing apparatus according to (2), in which the operation unit removes a region, which is not suitable for an operation, in the captured image information from an operation target.

(4)
The information processing apparatus according to (3), in which the region that is not suitable for the operation includes a region in which an image of an object other than the measurement target is captured or a region in which an image of a shadow is captured in the captured image information.

(5)
The information processing apparatus according to any one of (2) to (4),
in which the captured image information is multi-wavelength image information including information of a plurality of wavelength bands, and the operation unit acquires the first physical value and the second physical value by analyzing information of a specific wavelength band in the multi-wavelength image information.

(6)
The information processing apparatus according to any one of (2) to (5),
in which the operation unit acquires sensor data related to the environment, and corrects the first physical value by using the sensor data.

(7)
The information processing apparatus according to any one of (2) to (6),
in which the operation unit adjusts resolution of the first physical value and the second physical value on the basis of resolution of at least any one of the first physical value and the second physical value.

(8)
The information processing apparatus according to any one of (2) to (7),
in which the measurement target is a plant, and the operation unit outputs a third physical value indicating a state or a property of the plant by using the first physical value and the second physical value.

(9)
The information processing apparatus according to (8), in which the operation unit outputs the third physical value by performing model fitting using the first physical value and the second physical value.

(10)
The information processing apparatus according to (8) or (9),
in which the third physical value includes at least any one of a value corresponding to a stress which the plant receives, and a value corresponding to a photosynthesis rate in the plant.

(11) The information processing apparatus according to (10),
in which the first physical value includes at least one of leaf surface light intensity and a temperature.

(12) The information processing apparatus according to (11),
in which the operation unit outputs the third physical value by using the second physical value in a case where the first physical value is equal to or greater than a constant value or within a constant range.

(13) The information processing apparatus according to any one of (8) to (12),
in which the operation unit classifies the captured image information into a plurality of regions, and outputs the third physical value for each region.

(14) The information processing apparatus according to any one of (8) to (13),
in which the operation unit further includes a data visualization unit that visualizes at least any one of the first physical value, the second physical value, and the third physical value.

(15) The information processing apparatus according to (14),
in which the data visualization unit correlates at least any one of the first physical value, the second physical value, and the third physical value with a color.

(16) The information processing apparatus according to (15),
in which the data visualization unit generates image information in which at least any one of the first physical value, the second physical value, and the third physical value, which is correlated with the color, is correlated with an original spatial position.

(17) The information processing apparatus according to (14),
in which the data visualization unit visualizes at least one of the first physical value, the second physical value, and the third physical value by using a graph.

(18) The information processing apparatus according to any one of (2) to (14),
in which the captured image information is information of an image captured from an unmanned aerial vehicle (UAV) in flight.

(19) An information processing method that is executed by a computer, the method including:
analyzing captured image information of a measurement target to acquire a first physical value corresponding to an environment in which the measurement target is left, and a second physical value corresponding to a response to the environment by the measurement target; and
storing the first physical value and the second physical value in correlation with each other.

(20) A program that causes a computer to execute: analyzing captured image information of a measurement target to acquire a first physical value corresponding to an environment in which the measurement target is left, and a second physical value corresponding to a response to the environment by the measurement target; and storing the first physical value and the second physical value in correlation with each other.

(21) An information processing apparatus comprising:
a storage circuitry; and
an operation circuitry configured to
acquire a first physical value by analyzing captured image information, the captured image information based on information from a plurality of pixels, and the first physical value being indicative of an environment of a measurement target associated with a first pixel of the plurality of pixels,
acquire a second physical value by analyzing the captured image information, the second physical value being indicative of a response of the measurement target with respect to the environment, and
control the storage circuitry to store the first physical value and the second physical value in correlation with each other.

(22) The information processing apparatus according to (21), wherein the operation circuitry is further configured to acquire the first physical value and the second physical value by performing the analysis in a two-dimensional direction in a planar space of the captured image information.

(23) The information processing apparatus according to (22), wherein the operation circuitry is further configured to
determine whether a region of the captured image information is not suitable for analysis,
determine whether the first physical value and the second physical value are derived from the region that is not suitable for analysis, and
control the storage circuitry to exclude or delete the first physical value and the second physical value in response to determining that the first physical value and the second physical value are derived from the region that is not suitable for analysis.

(24) The information processing apparatus according to (23), wherein, to determine whether the region of the captured image information is not suitable for analysis, the operation circuitry is further configured to
determine whether the region of the captured image information includes an object other than the measurement target, and
determine whether the region of the captured image information includes a shadow.

(25) The information processing apparatus according to any one of (22) to (24), wherein the captured image information is multi-wavelength image information including information of a plurality of wavelength bands, and
wherein the operation circuitry is further configured to acquire the first physical value and the second physical value by analyzing information of a specific wavelength band in the multi-wavelength image information.

(26)
The information processing apparatus according to any one of (22) to (25), wherein the operation circuitry is further configured to
acquire sensor data related to the environment, and correct the first physical value based on the sensor data.

(27)
The information processing apparatus according to any one of (22) to (26), wherein the operation circuitry is further configured to adjust a resolution of the first physical value and the second physical value based on a resolution of at least one of the first physical value or the second physical value.

(28)
The information processing apparatus according to any one of (22) to (27), wherein the measurement target is a portion of a plant, and
wherein the operation circuitry is further configured to output a third physical value indicative of a state or a property of the portion of the plant based on the first physical value and the second physical value.

(29)
The information processing apparatus according to (28), wherein, to output the third physical value indicative of the state or the property of the plant based on the first physical value and the second physical value, the operation circuitry is further configured to perform model fitting using the first physical value and the second physical value.

(30)
The information processing apparatus according to any one of (28) to (29), wherein the third physical value includes at least one of a value corresponding to a stress received by the plant or a value corresponding to a photosynthesis rate in the plant.

(31)
The information processing apparatus according to (30), wherein the first physical value includes at least one of a leaf surface light intensity or a temperature.

(32)
The information processing apparatus according to any one of (28) to (31), wherein the operation circuitry further includes a data visualization circuitry that is configured to generate a data visualization of at least one of the first physical value, the second physical value, or the third physical value.

(33)
The information processing apparatus according to (32), wherein, to generate the data visualization, the data visualization circuitry is further configured to correlate a color with the at least one of the first physical value, the second physical value, or the third physical value.

(34)
The information processing apparatus according to (33), wherein, to generate the data visualization, the data visualization circuitry is further configured to
correlate an original spatial position with the at least one of the first physical value, the second physical value, or the third physical value that is correlated with the color, and
generate image information based on the at least one of the first physical value, the second physical value, or the third physical value that is correlated with the color and the original spatial position.

(35)
The information processing apparatus according to any one of (32) to (34), wherein, to generate the data visualization, the data visualization circuitry is further configured to generate a graph that visualizes the at least one of the first physical value, the second physical value, or the third physical value.

(36)
The information processing apparatus according to any one of (22) to (35), wherein the measurement target is a portion of a plant,
wherein the first physical value includes at least one of a leaf surface light intensity or a temperature, and
wherein the operation circuitry is further configured to output a third physical value indicative of a state or a property of the portion of the plant based on the second physical value when the first physical value is equal to or greater than a constant value or within a constant range.

(37)
The information processing apparatus according to any one of (22) to (36), wherein the captured image information is information of an image captured from an unmanned aerial vehicle (UAV) in flight.

(38)
The information processing apparatus according to any one of (21) to (37), wherein the operation circuitry is further configured to
classify the captured image information into a plurality of regions,
acquire one or more fourth physical values for each region of the plurality of regions by analyzing the plurality of regions, the one or more fourth physical values being indicative of one or more environments of one or more measurement targets associated with one or more pixels of the plurality of pixels, and
acquire one or more fifth physical values for the each region of the plurality of regions by analyzing the plurality of regions, the one or more fifth physical values being indicative of one or more responses of the one or more measurement targets with respect to the one or more environments, and
output a sixth physical value for the each region of the plurality of regions based on the one or more fourth physical values for the each region and the one or more fifth physical values for the each region.

(39)
An information processing method, the method comprising:
acquiring, with an electronic processor, a first physical value by analyzing captured image information, the captured image information based on information from a plurality of pixels, and the first physical value being indicative of an environment of a measurement target associated with a first pixel of the plurality of pixels;
acquiring, with the electronic processor, a second physical value by analyzing the captured image information, the second physical value being indicative of a response of the measurement target with respect to the environment; and
controlling, with the electronic processor, a storage circuitry to store the first physical value and the second physical value in correlation with each other.

(40)
A non-transitory computer-readable medium comprising instructions that, when executed by an electronic processor, causes the electronic processor to perform a set of operations comprising:

acquiring a first physical value by analyzing captured image information, the captured image information based on information from a plurality of pixels, and the first physical value being indicative of an environment of a measurement target associated with a first pixel of the plurality of pixels;

acquiring a second physical value by analyzing the captured image information, the second physical value being indicative of a response of the measurement target with respect to the environment; and controlling a storage circuitry to store the first physical value and the second physical value in correlation with each other.

(41)

A storage device comprising:

a storage circuitry; and an interface circuitry configured to receive a first physical value indicative of an environment of a measurement target associated with a first pixel of the plurality of pixels, receive a second physical value indicative of a response of the measurement target with respect to the environment, receive a correlation indicator that indicates the first physical value is correlated to the second physical value, and output the first physical value and the second physical value to the storage circuitry based on the correlation indicator.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Information processing apparatus
110 Multi-spectrum camera
120 Image input unit
130 Image processing operation unit
131 Multi-wavelength image operation unit
132 Image buffer
133 Image structure analysis operation unit
134 Structured image buffer
135 Image processing operation program and data retention unit
140 Dimension conversion operation unit
141 Removal operation unit
142 Correction operation unit
143 Physical value data buffer
144 Resolution adjustment unit
145 Dimension conversion operation program and data retention unit
150 Physical analysis operation unit
151 Analysis operation unit
152 Operation control unit
153 Analysis data buffer
154 Model fitting operation unit
155 Physical analysis operation program and data retention unit
160 Data visualization unit
161 Color mapping unit
162 Image generation unit
163 Graph generation unit
170 Image output unit
180 Display device
190 Sensor and measurement device
200 Sensor data input unit
210 Hand operation input unit
220 Program and data input unit
230 Data output unit
240 Network
250 Storage device
260 Environment control device

The invention claimed is:

1. An information processing apparatus comprising:

a storage circuitry; and an operation circuitry configured to acquire a first physical value by analyzing captured image information, the captured image information based on information from a plurality of pixels, and the first physical value being indicative of an environment of a measurement target associated with a first pixel of the plurality of pixels, acquire a second physical value by analyzing the captured image information, the second physical value being indicative of a response of the measurement target with respect to the environment, determine whether a region of the captured image information is suitable for analysis, and control the storage circuitry to store the first physical value and the second physical value in correlation with each other based on the determination of whether the region of the captured image information is suitable for the analysis, wherein the captured image information is the same for acquiring the first physical value and acquiring the second physical value.

2. The information processing apparatus according to claim 1, wherein the operation circuitry is further configured to acquire the first physical value and the second physical value by performing the analysis in a two-dimensional direction in a planar space of the captured image information.

3. The information processing apparatus according to claim 2, wherein, to control the storage circuitry to store the first physical value and the second physical value in correlation with each other based on the determination of whether the region of the captured image information is suitable for the analysis, the operation circuitry is further configured to determine that the region of the captured image information is not suitable for analysis, determine whether the first physical value and the second physical value are derived from the region that is not suitable for analysis, and control the storage circuitry to exclude or delete the first physical value and the second physical value in response to determining that the first physical value and the second physical value are derived from the region that is not suitable for analysis.

4. The information processing apparatus according to claim 3, wherein, to determine whether the region of the captured image information is not suitable for analysis, the operation circuitry is further configured to determine whether the region of the captured image information includes an object other than the measurement target, and determine whether the region of the captured image information includes a shadow.

5. The information processing apparatus according to claim 2, wherein the captured image information is multi-wavelength image information including information of a plurality of wavelength bands, and
  wherein the operation circuitry is further configured to acquire the first physical value and the second physical value by analyzing information of a specific wavelength band in the multi-wavelength image information.

6. The information processing apparatus according to claim 2, wherein the operation circuitry is further configured to
  acquire sensor data related to the environment, and
  correct the first physical value based on the sensor data.

7. The information processing apparatus according to claim 2, wherein the operation circuitry is further configured to adjust a resolution of the first physical value and the second physical value based on a resolution of at least one of the first physical value or the second physical value.

8. The information processing apparatus according to claim 2, wherein the measurement target is a portion of a plant, and
  wherein the operation circuitry is further configured to output a third physical value indicative of a state or a property of the portion of the plant based on the first physical value and the second physical value.

9. The information processing apparatus according to claim 8, wherein, to output the third physical value indicative of the state or the property of the plant based on the first physical value and the second physical value, the operation circuitry is further configured to perform model fitting using the first physical value and the second physical value.

10. The information processing apparatus according to claim 8, wherein the third physical value includes at least one of a value corresponding to a stress received by the plant or a value corresponding to a photosynthesis rate in the plant.

11. The information processing apparatus according to claim 10, wherein the first physical value includes at least one of a leaf surface light intensity or a temperature.

12. The information processing apparatus according to claim 8, wherein the operation circuitry further includes a data visualization circuitry that is configured to generate a data visualization of at least one of the first physical value, the second physical value, or the third physical value.

13. The information processing apparatus according to claim 12, wherein, to generate the data visualization, the data visualization circuitry is further configured to correlate a color with the at least one of the first physical value, the second physical value, or the third physical value.

14. The information processing apparatus according to claim 13, wherein, to generate the data visualization, the data visualization circuitry is further configured to
  correlate an original spatial position with the at least one of the first physical value, the second physical value, or the third physical value that is correlated with the color, and
  generate image information based on the at least one of the first physical value, the second physical value, or the third physical value that is correlated with the color and the original spatial position.

15. The information processing apparatus according to claim 12, wherein, to generate the data visualization, the data visualization circuitry is further configured to generate a graph that visualizes the at least one of the first physical value, the second physical value, or the third physical value.

16. The information processing apparatus according to claim 2, wherein the measurement target is a portion of a plant,
  wherein the first physical value includes at least one of a leaf surface light intensity or a temperature, and
  wherein the operation circuitry is further configured to output a third physical value indicative of a state or a property of the portion of the plant based on the second physical value when the first physical value is equal to or greater than a constant value or within a constant range.

17. The information processing apparatus according to claim 2, wherein the captured image information is information of an image captured from an unmanned aerial vehicle (UAV) in flight.

18. The information processing apparatus according to claim 1, wherein the operation circuitry is further configured to
  classify the captured image information into a plurality of regions,
  acquire one or more fourth physical values for each region of the plurality of regions by analyzing the plurality of regions, the one or more fourth physical values being indicative of one or more environments of one or more measurement targets associated with one or more pixels of the plurality of pixels, and
  acquire one or more fifth physical values for the each region of the plurality of regions by analyzing the plurality of regions, the one or more fifth physical values being indicative of one or more responses of the one or more measurement targets with respect to the one or more environments, and
  output a sixth physical value for the each region of the plurality of regions based on the one or more fourth physical values for the each region and the one or more fifth physical values for the each region.

19. An information processing method, the method comprising:
  acquiring, with an electronic processor, a first physical value by analyzing captured image information, the captured image information based on information from a plurality of pixels, and the first physical value being indicative of an environment of a measurement target associated with a first pixel of the plurality of pixels;
  acquiring, with the electronic processor, a second physical value by analyzing the captured image information, the second physical value being indicative of a response of the measurement target with respect to the environment;
  determining, with the electronic processor, whether a region of the captured image information is suitable for analysis; and
  controlling, with the electronic processor, a storage circuitry to store the first physical value and the second physical value in correlation with each other based on the determination of whether the region of the captured image information is suitable for the analysis,
  wherein the captured image information is the same for acquiring the first physical value and acquiring the second physical value.

20. A non-transitory computer-readable medium comprising instructions that, when executed by an electronic processor, causes the electronic processor to perform a set of operations comprising:
  acquiring a first physical value by analyzing captured image information, the captured image information based on information from a plurality of pixels, and the first physical value being indicative of an environment of a measurement target associated with a first pixel of the plurality of pixels;

acquiring a second physical value by analyzing the captured image information, the second physical value being indicative of a response of the measurement target with respect to the environment;

determining whether a region of the captured image information is suitable for analysis; and controlling a storage circuitry to store the first physical value and the second physical value in correlation with each other based on the determination of whether the region of the captured image information is suitable for the analysis, wherein the captured image information is the same for acquiring the first physical value and acquiring the second physical value.

21. A storage device comprising:

a storage circuitry; and an interface circuitry configured to receive a first physical value indicative of an environment of a measurement target associated with a first pixel of the plurality of pixels, receive a second physical value indicative of a response of the measurement target with respect to the environment, receive a correlation indicator that indicates the first physical value is correlated to the second physical value, output the first physical value and the second physical value to the storage circuitry based on the correlation indicator, receive an instruction to exclude or delete the first physical value and the second physical value, and output the instruction to the storage circuitry, wherein the first physical value and the second physical value are acquired from a common captured image information.

* * * * *